US011657210B2

(12) United States Patent
Sanches et al.

(10) Patent No.: US 11,657,210 B2
(45) Date of Patent: May 23, 2023

(54) CACHED DATABASE AND SYNCHRONIZATION SYSTEM FOR PROVIDING DYNAMIC LINKED PANELS IN USER INTERFACE

(71) Applicant: Palantir Technologies Inc., Palo Alto, CA (US)

(72) Inventors: Jacob Sanches, Oakland, CA (US); Calvin Fernandez, Brooklyn, NY (US); Cihat Imamoglu, London (GB); Diogo Bonfim Moraes Morant De Holanda, London (GB); Geoffrey Cameron, New York, NY (US); Hannah Korus, Palo Alto, CA (US); Noah Chen, New York, NY (US); Rick Ducott, San Francisco, CA (US); Sixin Li, Jersey City, NJ (US); Stephanie Yu, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 59 days.

(21) Appl. No.: 16/879,337

(22) Filed: May 20, 2020

(65) Prior Publication Data
US 2020/0278774 A1 Sep. 3, 2020

Related U.S. Application Data

(63) Continuation of application No. 15/660,193, filed on Jul. 26, 2017, now Pat. No. 10,719,188, which is a
(Continued)

(51) Int. Cl.
*G06F 3/048* (2013.01)
*G06F 40/143* (2020.01)
(Continued)

(52) U.S. Cl.
CPC .......... *G06F 40/143* (2020.01); *G06F 3/0481* (2013.01); *G06F 16/172* (2019.01);
(Continued)

(58) Field of Classification Search
None
See application file for complete search history.

(56) References Cited

U.S. PATENT DOCUMENTS 8,849,823 B2 * 9/2014 Gotz ..................... G06T 11/206
705/3
9,785,317 B2 * 10/2017 Duffield ................ G06F 3/0484
(Continued)

OTHER PUBLICATIONS

U.S. Pat. No. 10,324,609, System for Providing Dynamic Linked Panels in User Interface, Jun. 18, 2019.
(Continued)

*Primary Examiner* — Maikhanh Nguyen
(74) *Attorney, Agent, or Firm* — Knobbe, Martens, Olson & Bear, LLP

(57) ABSTRACT

A system is configured to provide a dashboard creation system. Panels associated with queries for retrieving information from a database are shown in a user interface. Various other user interfaces show query code, panel display settings, function code, dependencies, etc. Queries in a first query format access a data source. Queries in a second query format access a cache database that is synchronized with the data source.

18 Claims, 46 Drawing Sheets

Related U.S. Application Data continuation-in-part of application No. 15/250,678, filed on Aug. 29, 2016, now Pat. No. 10,324,609.

(60) Provisional application No. 62/524,352, filed on Jun. 23, 2017, provisional application No. 62/365,169, filed on Jul. 21, 2016.

(51) Int. Cl.
  *G06F 3/0481* (2022.01)
  *G06F 16/242* (2019.01)
  *G06F 40/166* (2020.01)
  *G06F 40/186* (2020.01)
  *G06F 16/178* (2019.01)
  *G06F 16/172* (2019.01)
  *G09G 5/14* (2006.01)

(52) U.S. Cl.
  CPC ........ *G06F 16/178* (2019.01); *G06F 16/2425* (2019.01); *G06F 40/166* (2020.01); *G06F 40/186* (2020.01); *G09G 5/14* (2013.01)

(56) References Cited

U.S. PATENT DOCUMENTS

| | | | | |
|---|---|---|---|---|
| 9,836,502 | B2* | 12/2017 | Papale | G06Q 10/063 |
| 10,324,609 | B2 | 6/2019 | Sanches et al. | |
| 10,698,594 | B2 | 6/2020 | Sanches et al. | |
| 10,719,188 | B2 | 7/2020 | Jacob et al. | |
| 2004/0078451 | A1* | 4/2004 | Dietz | G06F 16/9562 |
| | | | | 709/217 |
| 2004/0181554 | A1* | 9/2004 | Heckerman | G06F 16/358 |
| 2005/0004911 | A1* | 1/2005 | Goldberg | G06F 16/2428 |
| 2005/0086207 | A1* | 4/2005 | Heuer | G06F 16/248 |
| 2008/0281784 | A1 | 11/2008 | Zane et al. | |
| 2013/0103719 | A1* | 4/2013 | Gotz | G06T 11/206 |
| | | | | 707/E17.011 |
| 2014/0344230 | A1* | 11/2014 | Krause | G06F 16/3322 |
| | | | | 707/693 |
| 2015/0089424 | A1* | 3/2015 | Duffield | G06F 3/0484 |
| | | | | 715/771 |
| 2015/0100897 | A1* | 4/2015 | Sun | G06Q 10/10 |
| | | | | 715/753 |
| 2015/0212663 | A1* | 7/2015 | Papale | G06F 16/248 |
| | | | | 715/762 |
| 2015/0278315 | A1* | 10/2015 | Baumgartner | G06F 16/248 |
| | | | | 715/763 |
| 2015/0302051 | A1* | 10/2015 | Baumgartner | G06F 3/04842 |
| | | | | 707/754 |
| 2016/0062555 | A1* | 3/2016 | Ward | G06F 40/151 |
| | | | | 715/778 |
| 2016/0370951 | A1* | 12/2016 | Ward | G06F 16/24575 |

OTHER PUBLICATIONS

U.S. Pat. No. 10,698,594, System for Providing Dynamic Linked Panels in User Interface, Jun. 30, 2020.

U.S. Pat. No. 10,719,188, Cached Database and Synchronization System for Providing Dynamic Linked Panels in User Interface, Jul. 21, 2020.

Tanu Malik et al., "Estimating Query Result Sizes for Proxy Caching in Scientific Database Federations", Supercomputing 2006, Proceedings of the ACM/IEEE SC 2006 Conference, Nov. 11, 2006, 14 pages.

Official Communication for European Patent Application No. 17182418.8 dated Mar. 1, 2021, 11 pages.

Official Communication for European Patent Application No. 17182418.8 dated Jun. 14, 2021, 10 pages.

Official Communication for European Patent Application No. 18179124.5 dated Oct. 5, 2020, 7 pages.

Official Communication for European Patent Application No. 18179124.5 dated Feb. 17, 2022, 9 pages.

\* cited by examiner

Document 1

Queries | Global Variables | Document CSS

PANELS p1
p2
p3 ...

COMPANY STOCK PRICE          $125,000

YOUR EQUITY VALUE:           $9 BILLION

COMPANY VALUATION:

| GLOBAL VARIABLES | DEFAULT VALUE |   |
|---|---|---|
| NAME |   | × |
| options | 100000 | × |
| strike | 4.75 | × |

COMPANY A
$23 BILLION

COMPANY D
$370 BILLION

FIG. 2C

Document 1

Queries | Global Variables | Document CSS

PANELS
p1
p2
p3
· · ·

COMPANY STOCK PRICE

YOUR EQUITY VALUE: $1...

COMPANY VALUATION: $9...

| COMPANY A | COMPANY B |
|---|---|
| $23 BILLION | $65 BILLION |

CO... $210...

100% ▶

DOCUMENT CSS — ✕

```
1  sl-markdown {
2    height: 100%;
3  }
4
5  #w2, #w5, #w7, #w8, #w11 {
6    text-align: center;
7  }
8
9  #w5 div, #w7 div, #w8 div, #w11 div {
10   height: 100%;
11   background: #87E587;
12   padding-top: 22px;
13 }
14
15 #w1 .irs-line {
16   background: #87E587
17 }
```

| QUERIES | FUNCTIONS | | | | |
|---|---|---|---|---|---|
| Query 1 | | NAME child | 1106 | SOURCE SQL Database 1 ▽ | ⚙ ▷Run ✓Updated |
| Query 2 | | | | 1110  1112 | 1114  1116 |
| Query 3 | | 1 select | | | |
| Query 4 | | 2  *, | | | |
| Query 5 | | 3  status_color{x.readiness} as color | | | |
| Query 6 | | 4 from (select unit.id, name, shortname, readiness | | | |
| Query 7 | | 5  from unit | | | |
| Query 8 | | 6  join unit_relationship on unit.id,unit_relationship.child | | | |
| Query 9 | | 7  join unit_value_cache on unit_relationship. | | | |
| | | 8  child=unit_value_cache.id | | | |
| | | 9  where unit_relationship.parent = {(param id)} : bigint | | | |
| | | and unit_value_cache.months={{param months}} : int | | | |
| | | 10 order by unit.id asc)as x limit 12; | | | |
| + New Query | | | | 1108 | |
| 1104 | | | | | |
| No Partials available | | | | Preview | |
| 1118 | | | | | |
| + New Partial | | | | | |

```
QUERIES | FUNCTIONS | DATA | DEPENDENCIES
○  NAME readinessCards    SOURCE   SQL Database 1
Function 1
Function 2
Function 3

1   /#return{
2   "title": ["TO 80% READINESS", "TO FULL READINESS"],
3   "VALUES" : [{{timeready.time80}}, {{timeready.timfull}}],
4   "cost" : [{{costready.cost80}}, {{costready.costfull}}]@
5   #}
6
7   return {
8   "one": ["TO 80% READINESS", {{timeready.time80}},
        {{costReady.cost80}}],
9   #/
10  "two": ["TO FULL READINESS", {{timeready.timefull}},
        {{costReady.costfull}}],
11
12  }
13

+ New Function

▷ Run  ∨ Updated

Preview
```

| STYLES | VARIABLES | _ × |
|---|---|---|
| NAME | DEFAULT VALUE | |
| id | 0 | × |
| months | 24 | × |
| th | 80 | × |
| lm | 50 | × |

1182
1184

1186

+Add New Variable

FIG. 11C

| QUERIES | FUNCTIONS | DATA | DEPENDENCIES | | 1610 | 1612 | 1614 | 1616 |
|---|---|---|---|---|---|---|---|---|
| "DWDBILOHFVY⊗ | | NAME UntitledData1 | | | + Column | + Row | ⊕ Upload | ⟳ Update |
| | | E_Type | E_Return_ID | Email | IP | E_Filling_Data | | +ash |
| 0 | | Data_file | 10000005388708S | abc@gmail.com | 192.168.1.0 | 2015-02-07T13:19:42-0500 | | 61778456258 |
| 1 | | Data_file | 10000007372643S | bcd@gmail.com | 192.168.1.1 | 2015-03-14T21:04:12-0400 | | c444825d5003 |
| 2 | | Data_file | 10000007372643S | cde@gmail.com | 192.168.1.2 | 2014-03-22T13:14:16-0400 | | 00cd2dac8984 |
| 3 | | Data_file | 1000001099009994 | def@gmail.com | 192.168.1.3 | 2015-03-02T19:42:43-0500 | | acdb17b46dcb |
| 4 | | Data_file | 10000016216716S | efg@gmail.com | 192.168.1.4 | 2015-01-27T15:16:56-0500 | | c0331d91642d |
| 5 | | Data_file | 1000001717738965 | fgh@gmail.com | 192.168.1.5 | 2014-01-27T15:16:56-0500 | | 98aZa410abcd |
| 6 | | Data_file | 1000001722223044 | ghi@gmail.com | 192.168.1.6 | 2015-02-03T17:16:16-0500 | | 8c8e0c090206 |
| 7 | | Data_file | 1000003220354545 | hij@gmail.com | 192.168.1.7 | 2015-03-29T21:22:01-0400 | | 675c5c616bca |
| 8 | | Data_file | 10000034325054S | ijk@gmail.com | 192.168.1.8 | 2015-03-29T19:34:56-0400 | | 4084c100a94s |
| 9 | | Data_file | 10000101257613S | jkl@gmail.com | 192.168.1.9 | 2015-02-28T17:49:33-0500 | | 71420a0ccb72 |
| 10 | | Data_file | 10001077130325 | klm@gmail.com | 192.168.1.10 | 2015-01-21T19:37:16-0500 | | 0ab653d24a1a |
| 11 | | Data_file | 100011034516685 | lmn@gmail.com | 192.168.1.11 | 2014-03-29T09:20:05-0400 | | 367ccc172db2 |
| 12 | | Data_file | 100011156230944 | mno@gmail.com | 192.168.1.12 | 2015-02-24T17:31:52-0500 | | d11036581364 |
| 13 | | Data_file | 100011811194665 | opq@gmail.com | 192.168.1.13 | 2015-02-24T22:14:30-0500 | | 0aa11749db29 |
| 14 | | Data_file | 100011879969905 | pqr@gmail.com | 192.168.1.14 | 2015-04-06T16:11:48-0400 | | b179aabd9854 |
| 15 | | Data_file | 10001198927740S | qrs@gmail.com | 192.168.1.15 | 2015-03-13T10:16:08-0400 | | 8b39c224b224 |
| 16 | | Data_file | 1000129812253S | rst@gmail.com | 192.168.1.16 | 2015-04-07T16:56:21-0400 | | c8371c076806 |
| 17 | | Data_file | 100013600852l4 | stu@gmail.com | 192.168.1.17 | 2015-06-17T12:23:42-0400 | | 8b39c226b22b |
| 18 | | Data_file | 100021579035l5 | tuv@gmail.com | 192.168.1.18 | 2015-04-18T14:16:20-0400 | | 6979aa51ac69 |
| 19 | | Data_file | 100022028l0984 | uvw@gmail.com | 192.168.1.19 | 2014-03-05T16:48:48-0500 | | c3911a1c481c |
| 20 | | Data_file | 1000220745039S | vwx@gmail.com | 192.168.1.20 | 2015-02-24T06:34:17-0500 | | 1717a7876la |
| 21 | | Data_file | 10002302284335 | wxy@gmail.com | 192.168.1.21 | 2015-03-05T22:33:36-0500 | | 1399a7874a71 |
| 22 | | Data_file | 100023107l1985 | xyz@gmail.com | 192.168.1.22 | 2015-04-14T17:51:28-0400 | | 64a713896429 |
| + New Data | | | | | | | | |

3302
SYNCING
Make this dataset available to the following destinations.

⚠ Cache1 — This dataset is unavailable in Cache1. Enable access?
⚠ Cache2 — Sync failed 45 minutes ago. Try again? — Sync Details
⚠ Cache3 — This dataset is unavailable in Cache3. Enable access?

3304

Enable Access ✕

Are you sure you want to grant Cache1 access to Dataset #12345?

Cancel  Enable Access

3306
SYNCING
Make this dataset available to the following destinations.

⟲ Cache1 — Syncing...This dataset will be unavailable shortly.
⚠ Cache2 — Sync failed 45 minutes ago. Try again? — Sync Details
⚠ Cache3 — This dataset is unavailable in Cache3. Enable access?

3308
SYNCING
Make this dataset available to the following destinations.

✓ Cache1 — Last Synced 4 hours ago. Sync now? — Sync Details
⚠ Cache2 — Sync failed 45 minutes ago. Try again? — Sync Details
⚠ Cache3 — This dataset is unavailable in Cache3. Enable access?

CACHED DATABASE AND SYNCHRONIZATION SYSTEM FOR PROVIDING DYNAMIC LINKED PANELS IN USER INTERFACE

INCORPORATION BY REFERENCE

This application is a continuation of U.S. patent application Ser. No. 15/660,193, filed on Jul. 26, 2017, now U.S. Pat. No. 10,719,188, which application claims the benefit of U.S. Provisional Patent Application No. 62/524,352, filed on Jun. 23, 2017, and is a continuation-in-part of U.S. patent application Ser. No. 15/250,678, filed on Aug. 29, 2016, now U.S. Pat. No. 10,324,609, which claims the benefit of U.S. Provisional Patent Application No. 62/365,169, filed on Jul. 21, 2016. The entire disclosures of these applications are hereby made a part of this specification as if set forth fully herein and incorporated by reference for all purposes, for all that they contain.

TECHNICAL FIELD

The present disclosure relates to systems and techniques for data integration, analysis, and visualization. More specifically, the present disclosure relates to dynamic linked panels associated with queries performed on data sources and visualization of results of the queries. The present disclosure also relates to systems and techniques for improving computer and network speeds. More specifically, the present disclosure relates to data cache techniques and network configurations.

BACKGROUND

Organizations and/or companies are producing increasingly large amounts of data. Such data may be queried and presented in a user interface.

SUMMARY

The systems, methods, and devices described herein each have several aspects, no single one of which is solely responsible for its desirable attributes. Without limiting the scope of this disclosure, several non-limiting features will now be discussed briefly.

Developing online documents can require collaboration by many designers who possess great deal of technical knowledge, including knowledge of markup languages such as HTML, database languages such as SQL, scripting languages such as JavaScript, graphic design skills, and other technical knowledge. One aspect features providing panels coded to query a database and display the queried data according to one or more display settings. Panels can be used to create online documents without needing the same depth of technical skill. Panels can display representations of data queried from a database and dynamically interact with other panels. Certain features address the varying amount of time that database queries and interactions can take. A dependency web shows dependencies, a timing table shows how long certain actions take to perform, and a timeout graphic shows up to indicate panels that take a long or abnormally long time to load. These help developers optimize and restructure code to speed up performance. Dependency information can be stored and used when rerunning documents to refresh dependent documents without needing to refresh independent elements. Using local applications and data allows offline simulations without disturbing databases in use. A diff tool shows not only code changes, but also document output changes affected by code changes.

In one embodiment, a computer system configured to display data from one or more data sources comprises: one or more hardware computer processors configured to execute code in order to cause the system to: generate user interface data configured to be rendered as a user interface, the user interface including at least a first display portion and a second display portion; receive an input indicating a relationship between the first panel of the plurality of panels and a second panel of the plurality of panels, wherein the relationship is indicated by associating a variable of the first panel with a query of the second panel; and in response to the input: updating a visual representation of data displayed in the second panel by executing the query of the second panel using a value of the variable of the first panel to retrieve updated data from the database; and updating the graphical visualization included in the second display to include an edge connecting a first node representing the first panel to a second node representing the second panel. The first display portion includes a plurality of panels comprising a first panel configured to generate a visual representation of data according to display settings for the first panel, wherein the data is retrievable from a database according to a query associated the first panel, wherein the first panel is associated with one or more variables, and the second display portion includes a graphical visualization of relationships among the plurality of panels, the graphical visualization including nodes and edges, at least some of the nodes representing respective ones of the plurality of panels, at least some of the nodes representing respective ones of the one or more variables, at least some of the edges representing relationships among respective pairs of the plurality of panels.

According to certain aspects, the first and second display portions are displayed simultaneously in the user interface. Additional display portions can include lists of queries, code associated with panels, queries, functions, variables. Additional elements can be represented in the graphical visualization. Selecting a panel can cause the corresponding nodes in the graphical visualization to be highlighted. Selecting a node can cause the corresponding panels to be highlighted.

In one embodiment, a computer system configured to display data from one or more data sources comprises one or more hardware computer processors configured to execute code in order to cause the system to: generate user interface data configured to be rendered as a user interface, the user interface including at least a first display portion and a second display portion, receive an input modifying a relationship between the first panel of the plurality of panels and a second panel of the plurality of panels, wherein the relationship is modified by associating a variable of the first panel with a query of the second panel; and in response to the input: updating the visualization of time to change the time that it takes to process the first panel and the time that it takes to process at least one dependency of the panel. The first display portion includes a plurality of panels comprising a first panel configured to generate a visual representation of data according to display settings for the panel, wherein the data is retrievable from a database according to a query associated the first panel, wherein the first panel is associated with one or more variables, and the second display portion includes a visualization of time that it takes to process the first panel and a time that it takes to process at least one dependency of the panel, wherein the dependency comprises at least one of the query, a function in the query, or a variable in the query that is defined by a second panel.

In one embodiment, a computer system configured to display data from one or more data sources comprises: one or more hardware computer processors configured to execute code in order to cause the system to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the code can be further configured to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The code may be further configured to: prior to running the query of the first panel, invoke one or more functions to determine whether a table, a row, or a column referenced in the query exists in the one or more data sources.

In another embodiment, a method of displaying data from one or more data sources comprises: using one or more hardware computer processors: generating a user interface configured to display a plurality of panels including a first panel and a second panel, each of the plurality of panels having respective display settings and queries including code for querying one more data sources; executing a first query associated with the first panel; displaying the first panel in the user interface based on first display settings of the first panel, the first panel displaying at least a portion of the result of the first query, the result of the first query being associated with a variable; executing a second query associated with the second panel, wherein the second query refers to the variable associated with the first query of the first panel; displaying the second panel in the user interface based on second display settings of the second panel, the second panel displaying at least a portion of the result of the second query; and in response to user input changing the displayed result in the first panel: re-executing the second query associated with the second panel; and updating the display of the second panel in the user interface based on results of the re-executed second query of the second panel.

According to certain aspects, the method may further comprise: receiving a third query from the first panel for writing data to the one or more data sources; processing one or more parameters in the third query by invoking a function; and performing the third query with the processed one or more parameters to write data to the one or more data sources. Said processing the one or more parameters in the third query can comprise: replacing the one or more parameters with respective placeholders; and storing respective values corresponding to the one or more parameters in an array. Said processing the one or more parameters in the third query can comprise changing respective values corresponding to the one or more parameters to string format. Each of the plurality of panels may be referenced as a template that is rendered by a template engine, and the function may be registered with the template engine. The method may further comprise: prior to running the query of the first panel, invoking one or more functions to determine whether a table, a row, or a column referenced in the query exists in the one or more data sources.

In some embodiments, a non-transitory compute readable medium comprises instructions for displaying data from one or more data sources that cause a computer processor to: generate a user interface configured to display a plurality of panels including a first panel and a second panel, each of the plurality of panels having respective display settings and queries including code for querying one more data sources; execute a first query associated with the first panel; display the first panel in the user interface based on first display settings of the first panel, the first panel displaying at least a portion of the result of the first query, the result of the first query being associated with a variable; execute a second query associated with the second panel, wherein the second query refers to the variable associated with the first query of the first panel; display the second panel in the user interface based on second display settings of the second panel, the second panel displaying at least a portion of the result of the second query; and in response to user input changing the displayed result in the first panel: re-execute the second query associated with the second panel; and update the display of the second panel in the user interface based on results of the re-executed second query of the second panel.

According to certain aspects, the instructions can be further configured to cause the computer processor to: receive a third query from the first panel for writing data to the one or more data sources; process one or more parameters in the third query by invoking a function; and perform the third query with the processed one or more parameters to write data to the one or more data sources. The processing of the one or more parameters in the third query may be performed at least in part by: replacing the one or more parameters with respective placeholders; and storing respective values corresponding to the one or more parameters in an array. The processing of the one or more parameters in the third query may be performed at least in part by changing respective values corresponding to the one or more parameters to string format. Each of the plurality of panels can be referenced as a template that is rendered by a template engine, and the function can be registered with the template engine. The instructions may be further configured to cause the computer processor to: prior to running the query of the first panel, invoke one or more functions to determine whether a table, a row, or a column referenced in the query exists in the one or more data sources.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 2A-2D illustrate one embodiment of a user interface of a dashboard creation system for creating a dynamic panel.

FIGS. 11A-11C illustrate embodiments of user interfaces of a dashboard creation system for creating a dynamic panel.

FIG. 16 illustrates one embodiment of a dataset shown in a user interface.

FIG. 22 illustrates one embodiment of a user interface comprising dynamic panels for displaying results of queries performed on one or more data sources.

FIG. 33 illustrates one example of a user interface for displaying the synchronization options for datasets.

FIG. 34 illustrates one example of a user interface for displaying datasets.

FIG. 35 illustrates one example of a user interface for displaying datasets.

DETAILED DESCRIPTION

Figure 1:
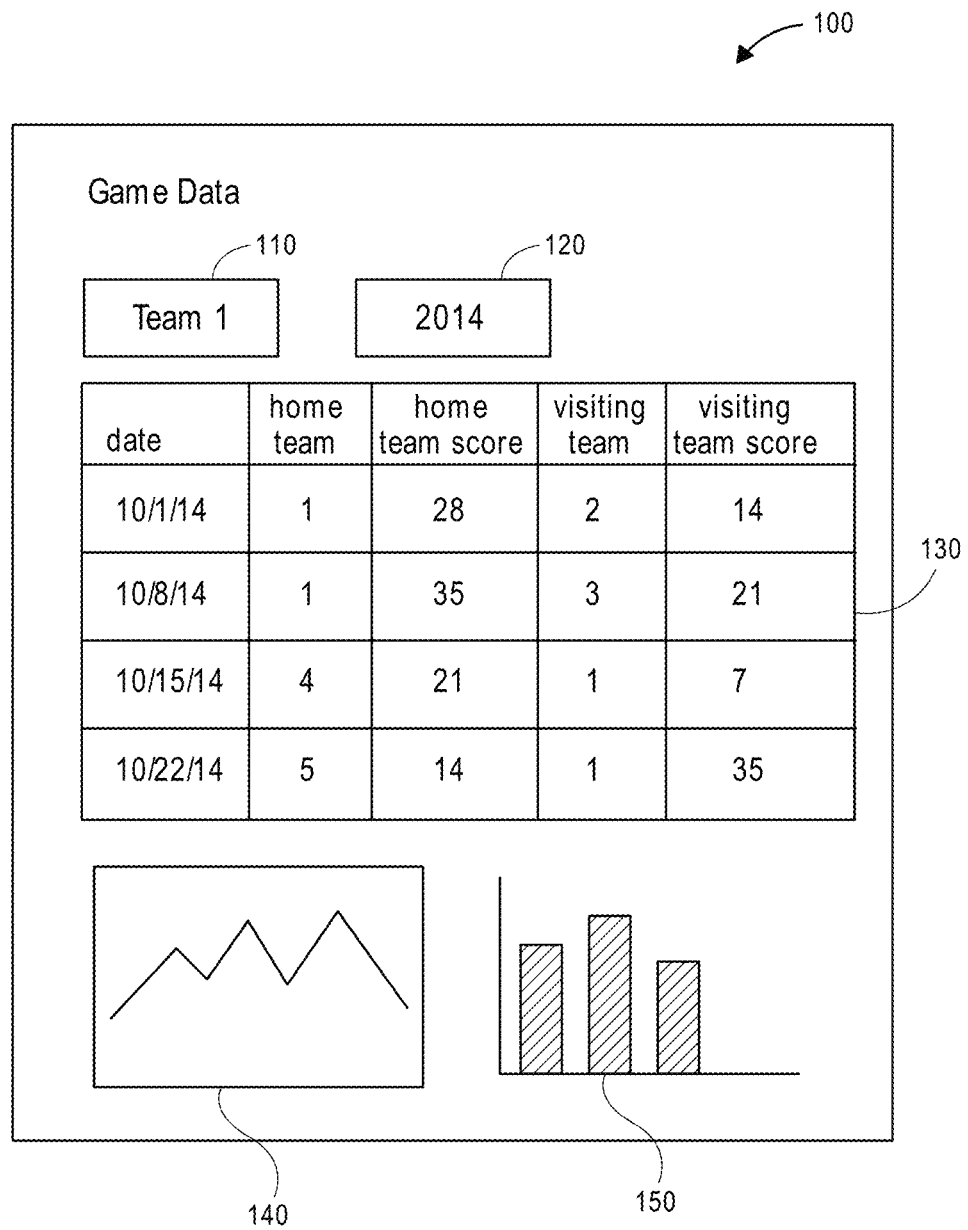
FIG. 1 illustrates one embodiment of a user interface comprising dynamic panels for displaying results of queries performed on one or more data sources.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide exemplary definitions.

Overview

Disclosed herein are various systems and methods for providing a plurality of dynamic panels in a user interface (UI). Examples of additional user interfaces are described in U.S. patent application Ser. No. 14/841,338 titled "SYSTEM FOR PROVIDING DYNAMIC LINKED PANELS IN USER INTERFACE," filed Aug. 31, 2015, and U.S. patent application Ser. No. 15/250,678 titled "SYSTEM FOR PROVIDING DYNAMIC LINKED PANELS IN USER INTERFACE," filed Aug. 29, 2016, both of which are made a part of this specification as if fully set forth herein and is hereby incorporated by reference in their entireties for all purposes, for all that they contain. The dynamic panels (or "panels") can display different pieces of data from one or more data sources. For example, a query can be run on one or more data sources, and different parts of the result from the query can be output using different dynamic panels. For instance, each dynamic panel can be associated with a variable to output. Different types of dynamic panels can be provided, such as charts (e.g., line chart, bar chart, etc.), controls (e.g., dropdown, multiselect box, search box, etc.), maps, tables, text boxes, etc. The panels can be data source agnostic. For example, the panels can be associated with data from different types of data sources, such as relational databases (e.g., SQL Server), Elasticsearch, etc. In some embodiments, individual panels may each be referred to as "widgets." In some embodiments, the user interface including multiple panels may be referred to as a "dashboard."

Developing online documents can require collaboration by many designers who possess great deal of technical knowledge, including knowledge of markup languages such as HTML, database languages such as SQL, scripting languages such as JavaScript, graphic design skills, and other technical knowledge. One aspect features providing panels coded to query a database and display the queried data according to one or more display settings. Panels can be used to create online documents without needing the same depth of technical skill. Panels can display representations of data queried from a database and dynamically interact with other panels. Certain features address the varying amount of time that database queries and interactions can take. A dependency web shows dependencies, a timing table shows how long certain actions take to perform, and a timeout graphic shows up to indicate panels that take a long or abnormally long time to load. These help developers optimize and restructure code to speed up performance. Dependency information can be stored and used when rerunning documents to refresh dependent documents without needing to refresh independent elements. The dependency information can include the elements (e.g., panels, variables, queries, functions) in a user interface and their relationships. The dependency information can include information used to generate the graphical visualization of dependencies. When updates occur (e.g., a user provides an input), the stored dependency information can be referenced to determine elements dependent on the update. Accordingly, dependent elements of the user interface can be executed (e.g., running queries, evaluating functions, re-determining variables, refreshing panels). Using local applications and data allows offline simulations without disturbing databases in use. A diff tool shows not only code changes, but also document output changes affected by code changes.

Figure 7A:
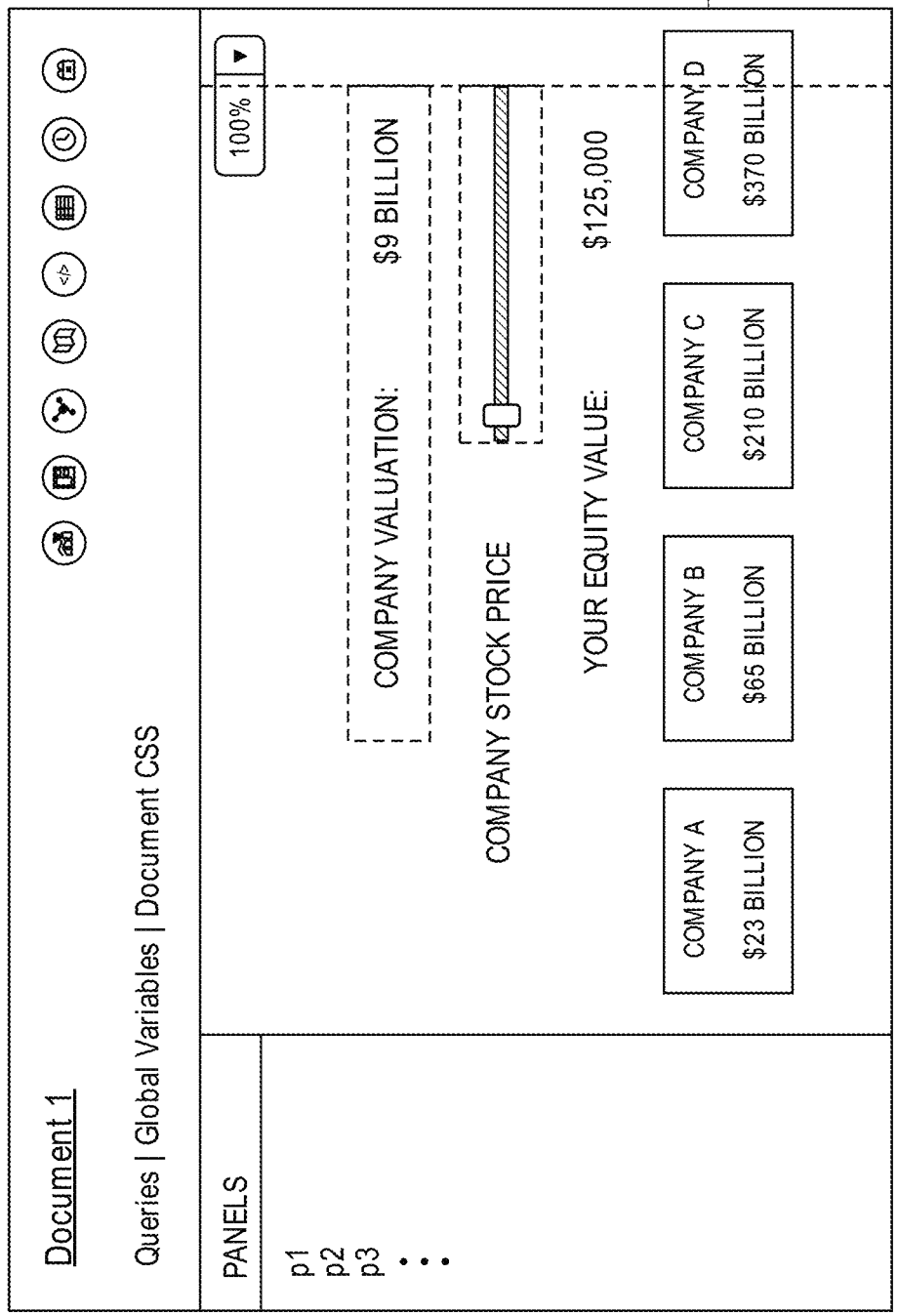
FIGS. 7A-7C illustrate various examples of panels and features provided by a dashboard creation system, according to certain embodiments.
Figure 7B:
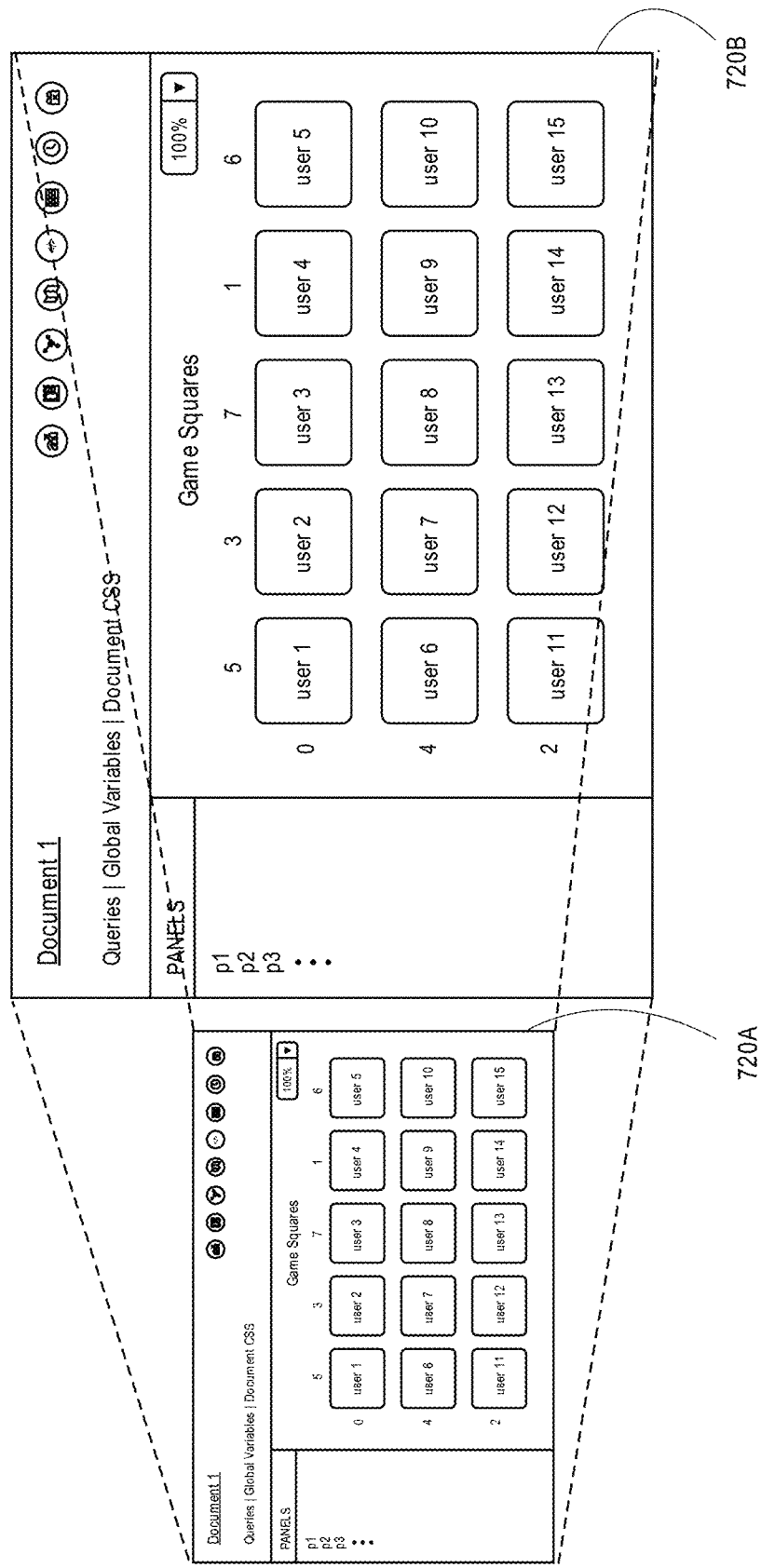
Figure 7C:
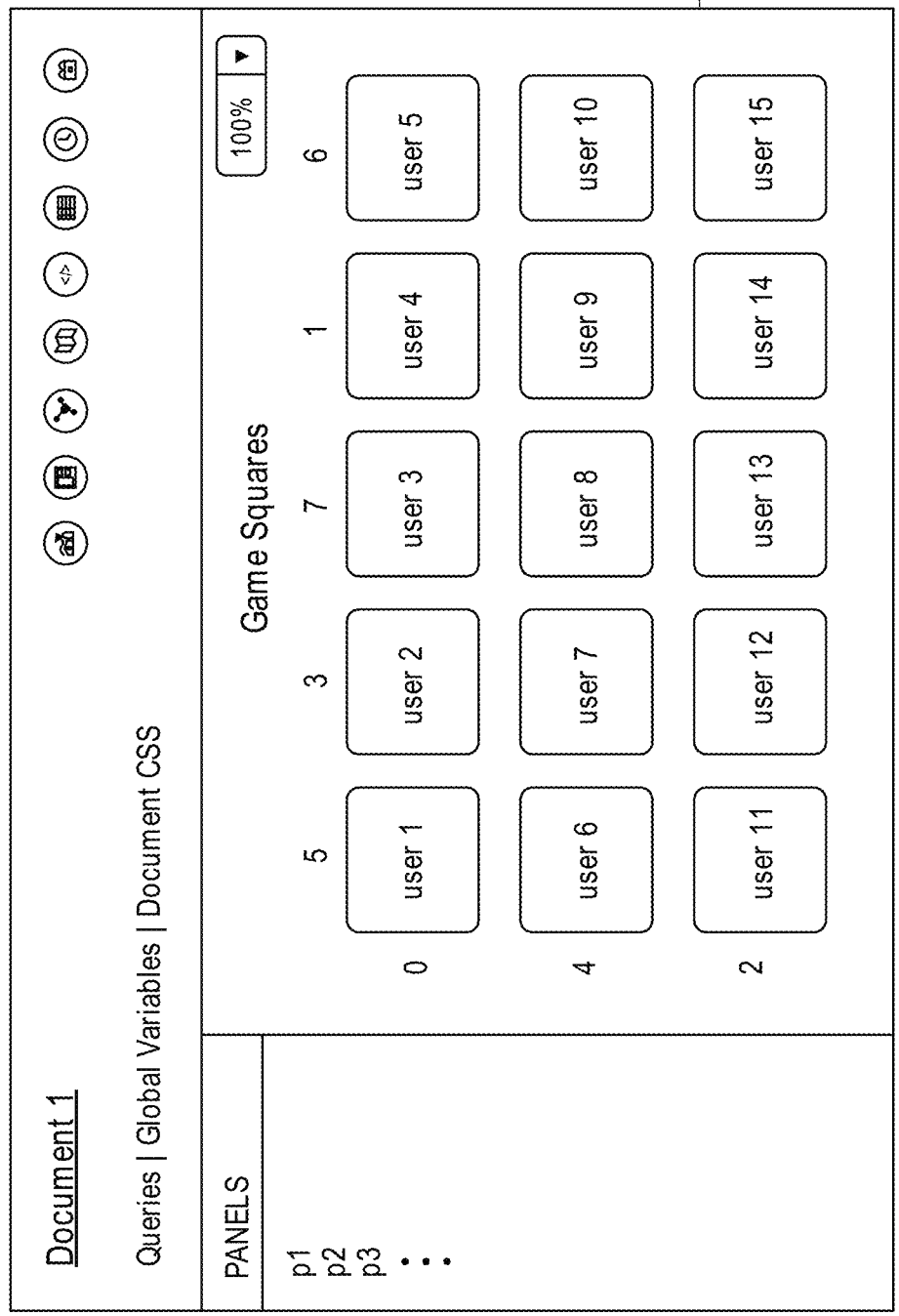

FIG. 1 illustrates one embodiment of a user interface 100 comprising dynamic panels for displaying results of queries performed on one or more data sources. Panels 110 through 150 are some examples of different types of panels that can be included in the user interface 100. Panel 110 and panel 120 are dropdown control panels; panel 130 is a table panel; panel 140 is a line chart panel; and panel 150 is a bar chart panel. Many different types of panels can be included in the user interface 100, depending on the embodiment. For instance, as explained above, types of panels can include charts, controls, graphs, maps, etc. Examples of chart panels may include a bar chart, line chart, pie chart, scatter plot, etc. Examples of control panels may include a date picker, dropdown control, button (e.g., export button, query button, etc.), input box, multiselect box, slider, text area, timeline, etc. Other examples of panels may include a card, image, link (e.g., hyperlink), list, text, graphs, maps, etc. FIGS. 7A-7C illustrate additional examples of types of panels.

A dynamic panel can be linked to one or more other dynamic panels. As mentioned above, the output of a panel can be used in another panel. When the data of a panel depends or relies on the data of another panel, if the data in the source panel changes, the data in the panel that relies on the source panel may also change or be refreshed. For example, in FIG. 1, an example query obtains data regarding National Football League teams from multiple data sources. Panel 110 can be a dropdown control that selects the team to view. Panel 120 can be a dropdown control that selects the season for which to display the games. Panel 130 can be a table that displays the games for the team selected in panel 110 for the season selected in panel 120. Changes to the selected team in panel 110 or the selected season in panel 120 can update the games displayed in panel 130. In some embodiments, panel 140 and panel 150 display statistics related to the games displayed in panel 130; when games displayed in panel 130 change, panel 140 and panel 150 update accordingly.

The query and the settings relating to the display of particular panels can be managed separately. For example, a user interface can provide a section for entering the query and another section for entering display related settings. Separate management of the query and the display settings can allow the panels to be easily updated within the user interface and allow reuse of queries. The page that contains the panels may be referred to as a "document."

In this manner, multiple panels can be used to display different aspects of the result from a query. One query can be run to obtain the needed information, and the result can be parsed and displayed using multiple panels. Display of information can be simplified by using multiple panels. Also, the query can be reused across panels since each panel can extract a portion of the result to display. In certain embodiments, each panel may have its own query and display the result of the query. The panels can also be linked together so that the data from one panel can be used to display the data in another panel.

Example User Interface of Dashboard Creation System

Figure 2A:
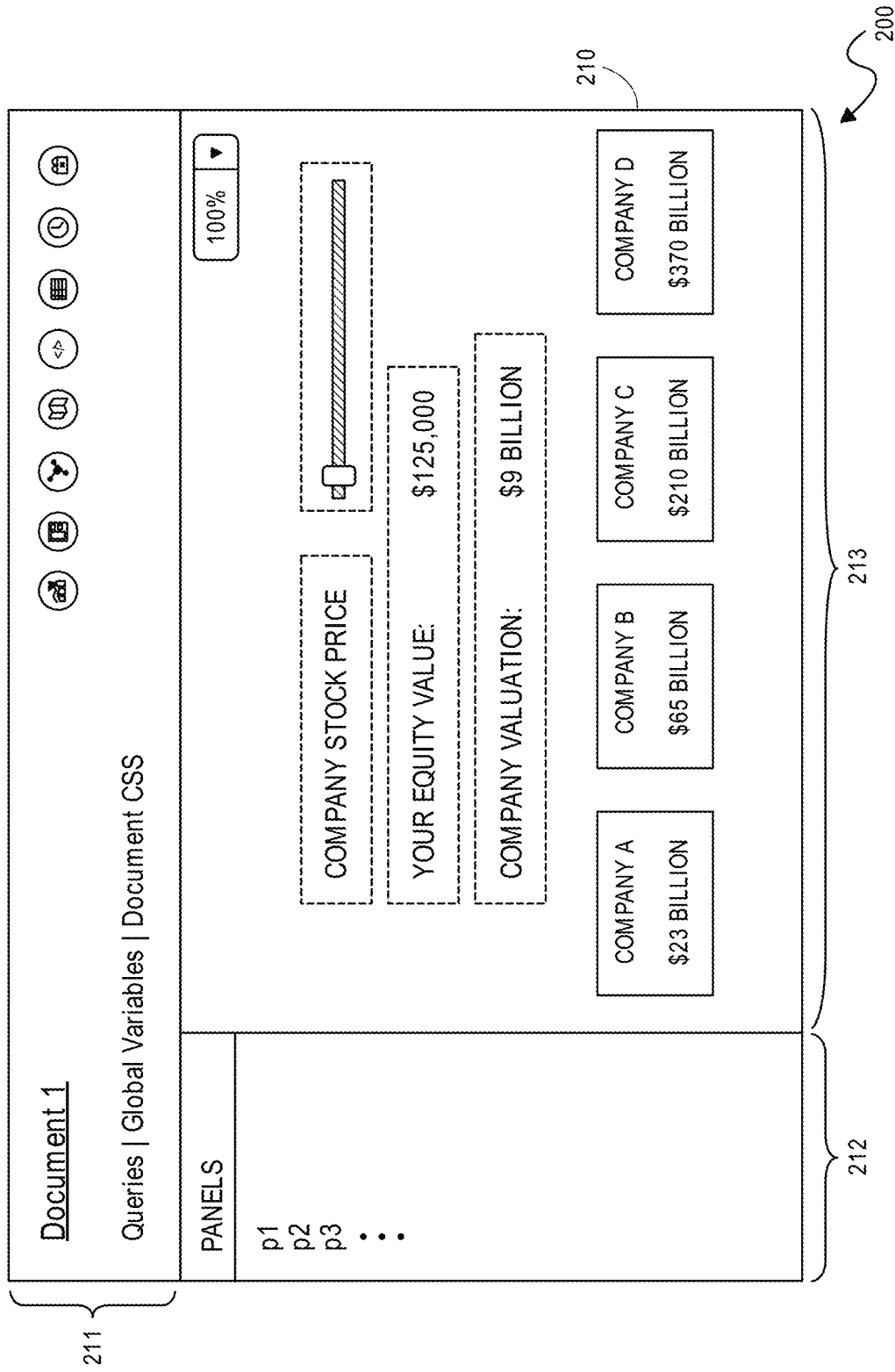
Figure 2B:
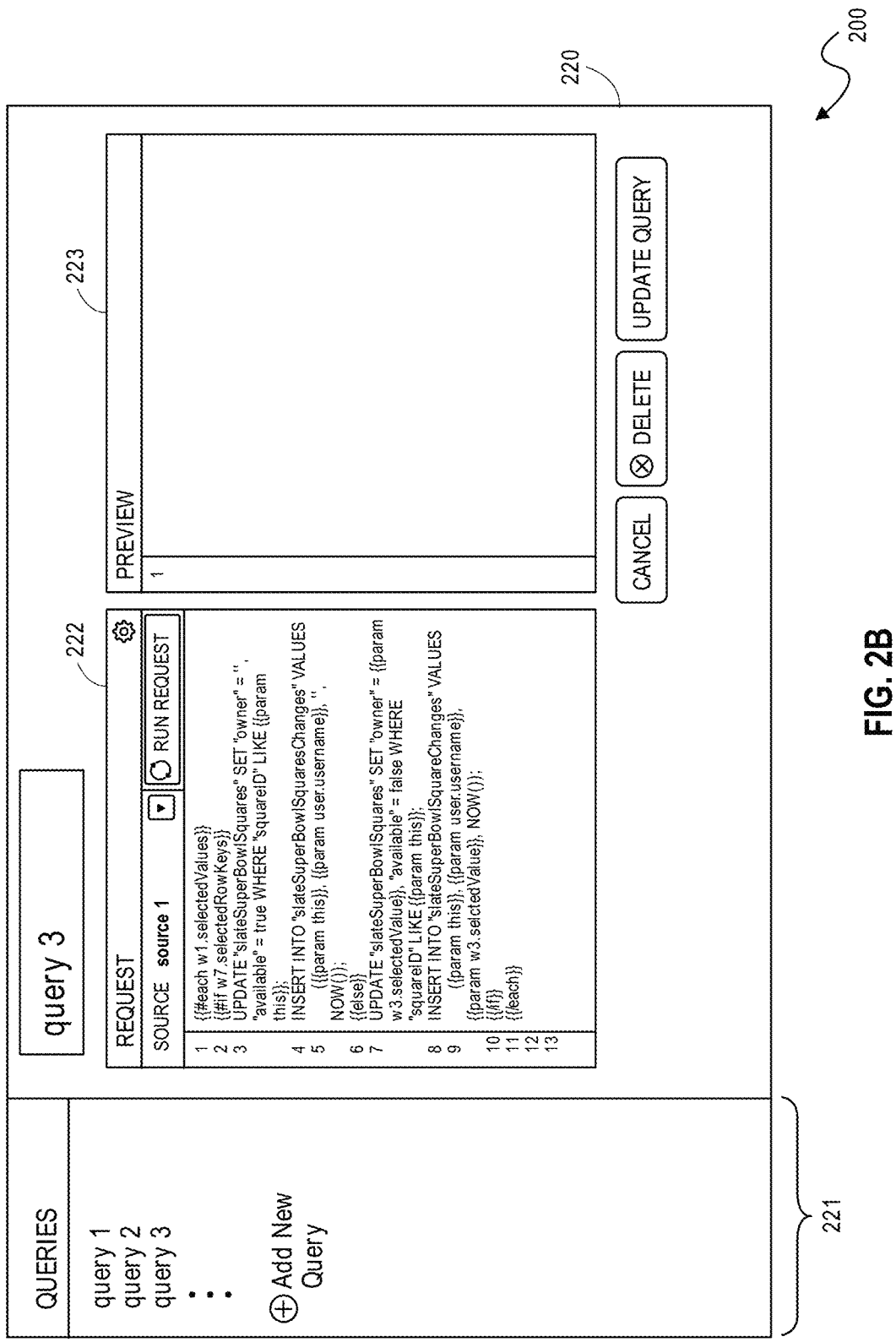

FIGS. 2A-2D illustrate one embodiment of a user interface 200 of a dashboard creation system for creating one or more dynamic panels for use in a dashboard. For example, the user interface 200 can provide functionalities for custom styling, query editing and/or previewing, defining query sub-properties, etc. of panels. FIG. 2A illustrates one embodiment of the main page 210 of the user interface 200. FIG. 2B illustrates one embodiment of the query page 220. FIG. 2C illustrates one embodiment of the global variables page 230. FIG. 2D illustrates one embodiment of the document Cascading Style Sheets (CSS) page 240.

Using the main page 210, the user can create, edit, delete, and manage one or more panels. In one embodiment, the main page 210 includes a top section 211 that displays the name of the document selected, if any; links to the query page 220 (FIG. 2B), the global variables page 230 (FIG. 2C), and the document CSS page 240 (FIG. 2D); and various icons for creating panels and for other features. The main page 210 also includes a panels section 212 that displays the list of panels included in the document. The main page 210 includes a design section 213 where the user can create, organize, and edit panels. In the example of FIG. 2A, the user creates Document 1, which contains panels p1, p2, p3, etc. A panel can be referred to by its name, and the name of the panel can be displayed when the cursor is over a particular panel. For illustrative purposes, certain items in design section 213 are marked with dashed lines to indicate that they are panels; for example, the slider in the top right corner of design section 213 is a panel. Four blocks at the bottom of design section 213 (listing company name and dollar value) are also examples of panels; these panels are shown in solid lines because they have borders.

Moving to FIG. 2B, the query page 220 allows the user to enter a query. For example, a query can be associated with a panel. The example query page 220 may appear when the user clicks on the link to the query page 220 on the main page 210 (FIG. 2A). The query page 220 can display a list of queries 221, for example, stored queries in a database (e.g., template storage 355, 455 in FIGS. 3 and 4). In some embodiments, a query may be reused in other documents. For example, the user can select a query from the list of queries or create a new query. In the example of FIG. 2B, the query page includes a button for adding a new query. The query page 220 can include a code section 222 for entering the query and a preview section 223 for previewing results of execution of the query in code section 222. The user may update or delete a query from the query page 220. The example query in FIG. 2B relates to the panel shown in FIG. 7C and updates the data source(s) to reflect availability of individual squares or cards and to add information relating to the squares or cards (e.g., insert username, time, etc.).

FIG. 2C illustrates the global variables page 230, which allows the user to define global variables associated with a document and/or a panel. The global variables can be referred to by the panels in the document. In addition, the user may also define variables associated with a panel. The variables can be used to link two or more panels together. For instance, the query for a panel may reference a variable in one or more other panels. The panels may be linked in the sense that when the data in a particular linked panel updates, the data in the panels that reference the particular panel also updates. The global variables page 230 can appear when the user clicks on the link to the global variables page 230 on the main page 210 (FIG. 2A). The global variables page 230 can be a pop-up window as illustrated in FIG. 2C or a separate page, for example, like the query page 220. In the example of FIG. 2C, the global variables page 230 shows two variables "options" and "strike." In some embodiments, a global variable is defined for a panel. The panel global variable may be referenced using the format "<panel name>.<global variable name>." For example, if "options" variable is associated with panel p1, and the user can refer to "options" variable as "p1.options." The panel global variables may also be used to link two or more panels together. In some embodiments, global variables may be used to link two or more panels. In one embodiment, global variables may be referred to in a uniform resource locator (URL). The global variables may be modified by changing the values associated with the global variables in the URL.

FIG. 2D illustrates the document CSS page 240 that allows the user to define the style for a document and the panels in the document. The document CSS page 240 can appear when the user clicks on the link to the document CSS page 240 on the main page 210 (FIG. 2A). The document CSS page 240 can be a pop-up window as illustrated in FIG. 2D or a separate page, for example, like the query page 220. Different styles can be applied at various levels of granularity; for example, a style can apply to individual elements within the document or the panel. The document CSS page 240 may also specify the dimensions of the document and the panels in the document. The same CSS may be applied to various panels by referring to a panel's number, title, or type (e.g., dropdown, text, etc.).

In some embodiments, the user interface 200, including the various pages illustrated in FIGS. 2A-2D, can be a web interface. The system may also provide different types or modes of user interfaces for authoring and editing documents and panels. For example, more advanced users can use an interface for directly entering the query, and beginner users can use a simpler interface that allows selection of values for various aspects of a panel (e.g., x value and y value of a chart). Users can share documents with other users and can give other users permission to edit, read only, etc. For example, the system can provide an edit mode (or "author mode"), in which the user can edit all aspects of a panel, e.g., the query for the panel, the display settings for the panel, etc. The system can also provide a read only mode (or "consumer mode"), in which the user can interact with the panels (e.g., select a value for a dropdown control), but may not edit other aspects of panels. In certain embodiments, users can edit panels within a web authoring environment. For example, users may use web technologies to edit the panels and may edit the panels within a web page or web interface.

In one embodiment, the user interface 200 can have two viewing modes: a WYSIWYG (What You See Is What You Get) editor mode and a corresponding read-only consumer mode. In editor mode, built-in panels like bar charts, scatter plots, time series plots, tables, dropdown menus, text boxes, etc. can be added and arranged on the canvas or page. The user can author and edit data queries via a rich editor UI, which can support quickly previewing results for quick debugging. Queries may natively support templating (e.g., via Handlebars) to link to panels, URL parameters, or data from other queries. Panels can also be templatized to link to data from the queries and coordinate with other panels. Additionally, the editor can customize styling for a particular page or document, or deployment. The read-only consumer mode may allow finished web pages to be shared to a set of users that can interact with a page but not edit its layout or setup.

Querying and Displaying Data in Data Sources Using Dynamic Panels

Figure 3:
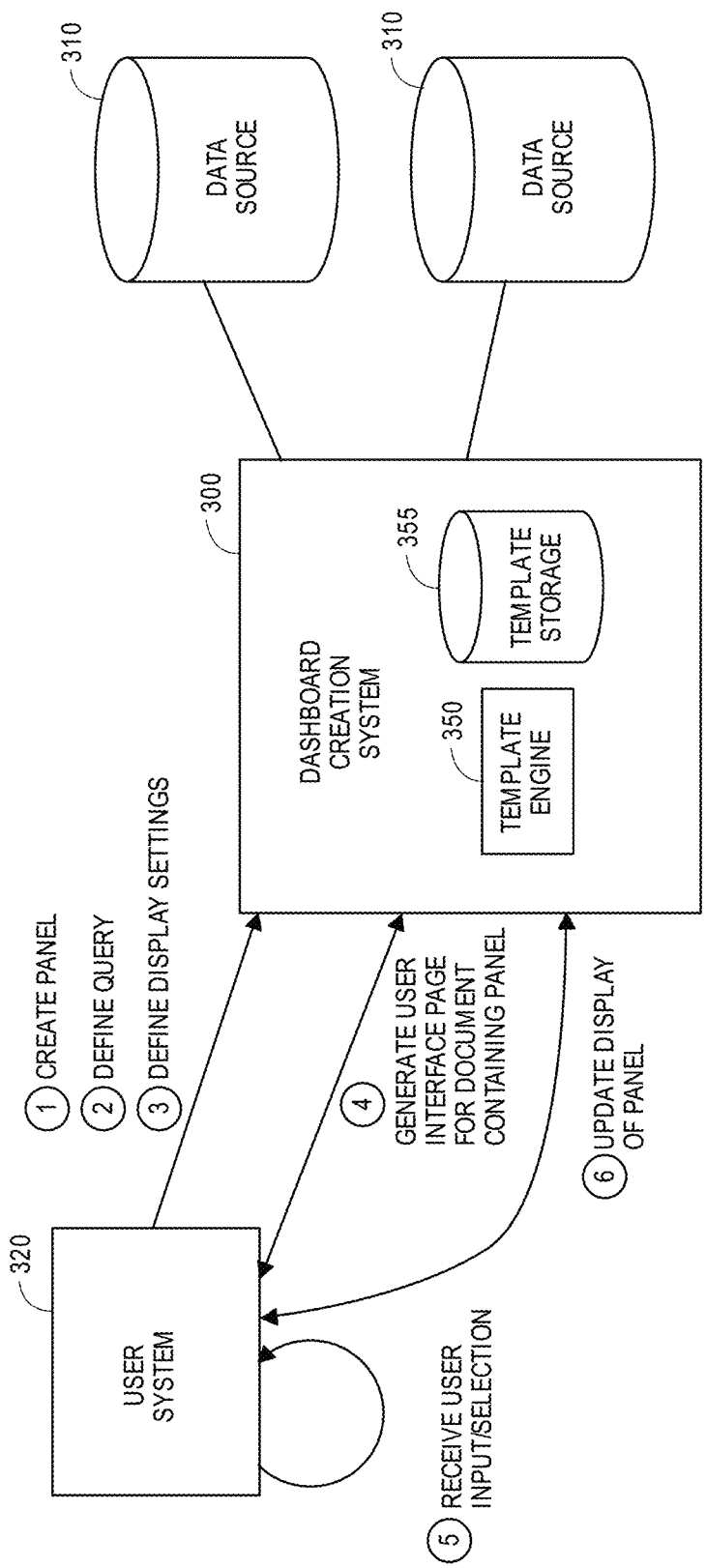
FIG. 3 is a data flow diagram illustrative of the interaction between the various components of a dashboard creation system configured to create and display dynamic panels, according to one embodiment.

FIG. 3 is a data flow diagram illustrative of the interaction between the various components of a dashboard creation system 300 configured to create and display dynamic panels, according to one embodiment. The system 300 can be connected to one or more data sources 310, such as databases. The system 300 may include a template engine 350 and template storage 355. A template system may allow creation of templates that can be used to generate user interface pages, such as web pages. A template system can combine templates and data from data sources to generate user interface pages. For example, a template engine or processor of the template system can render the templates and data from data sources into finished pages. The template engine 350 can render user interface pages based on the documents and/or data in data sources 310. In some embodiments, a template is any text that contains a template placeholder(s) (e.g., double curly brackets: "{{" and "}}"), and the template engine 350 processes the template text with a template context (e.g., an object) and renders the template text to provide the final output. The output can be incorporated into query backends or be used to drive other panels. The template storage 355 can store templates and related information. In certain embodiments, the template storage 355 can also store documents, panels included in documents, and related information. Some examples of template systems may include Handlebars, Mustache, etc. FIG. 3 shows the template engine 350 and the template storage 355 as a part of the system 300, but they may reside in a separate computing system or on separate computing devices from the system 300. For example, the template engine 350 can be external to the system 300. The system 300 may communicate with a user system 320, such as a desktop computer, laptop, mobile phone, tablet, mobile devices, etc. For example, the user system 320 displays user interface pages rendered by the template engine 350. The system 300 may include additional or different components, depending on the embodiment.

At data flow action 1, the user creates a panel. As explained above, a panel can have a query associated with it and display settings associated with it.

At data flow action 2, the user defines a query associated with the panel. As mentioned above, the panels can be data source agnostic and can be associated with data from different types of data sources, such as relational databases SQL, Elasticsearch, etc. The system 300 can connect to and query data from any data source that supports a text-based query language. The system 300 can support different types of query languages and/or tools, depending on the embodiment. In certain embodiments, Handlebars can be used for the queries. In some embodiments, JSON (JavaScript Object Notation) can be used for the queries. In other embodiments, the system 300 can include one adapter for SQL databases and another adapter for REST backends (e.g., Elasticsearch), which may be provided as default adapters. The system 300 can additionally allow the user to transform and selectively extract data out of query results. For example, the user can extract data from JSON query responses using JSONPath.

At data flow action 3, the user defines display settings associated with the panel. The user can define the display settings in the document CSS for the panel. The user can create additional panels and define the query and display settings for each panel. One or more panels may be added to a container. A container may function as a holder for panels. A container can act as a collection of panels that move as a unit. The user can define the layout of the panels within the container, and also define behavior for the container, which can apply to all the panels in the container as a group. The user may add tabs for a container. For example, a container may include multiple tabs, and the user can switch between tabs to view different content. Each tab can act as a separate content space and hold different panels.

At data flow action 4, the system 300 generates the user interface page for the document that contains the panel. When the system 300 receives a request from the user system 320 for a particular document, the system 300 can obtain the requested document, for example, from the template storage 350 and run the query associated with the panels in the documents. The template engine 350 may combine the document, the panels, and the query results in order to generate finished user interface pages. As explained above, one query can be used to obtain data, and different parts of the query can be associated with different panels. For instance, a query q returns columns c1, c2, c3, and c4, and the system 300 creates a text panel whose text is {{q.c1}}, a dropdown panel whose values is {{q.c2}}, and a chart panel whose x values and y values are {{q.c3}} and {{q.c4}}, respectively. Or each panel may have a query associated with it and the result of the query can be associated with the particular panel. The finished user interface pages can be then sent to the user system 320 to be displayed in a user interface.

At data flow action 5, the user system 320 receives user input/selection in the user interface. The user may change the displayed result in the user interface of the user system 320. For example, the user may select a particular value in a dropdown control. Or the user may select a particular panel or an item within a panel. The user input or selection is sent to the system 300.

At data flow action 6, the system 300 updates the display of the panel. For instance, the query may be rerun or the query result may be filtered based on the selected value in a dropdown control. Or actions may be associated with a panel or an item within a panel, and such actions may be performed. For example, selection of a panel or an item within a panel can display options or attributes related to the panel or the item. In one example, the selection of a table row in one panel is linked to another panel that contains more detailed information about the selected row. A table shows a list of games as in FIG. 1, and selecting a game in the table shows more detailed statistics on the selected game in a different panel. Certain details relating to FIG. 3 are further explained below in connection with FIG. 3A.

The system 300 can be highly extensible, and panels can be easily created, edited, and/or removed. In one embodiment, a new panel can be added by creating a web module (e.g., an AngularJS module). A simple web module may be easily created by a suitable module generator (e.g., via Yeoman generator). Similarly, data adapters for new types of data sources can be easily added (e.g., via a java jar).

Linking of Dynamic Panels

Figure 3A:
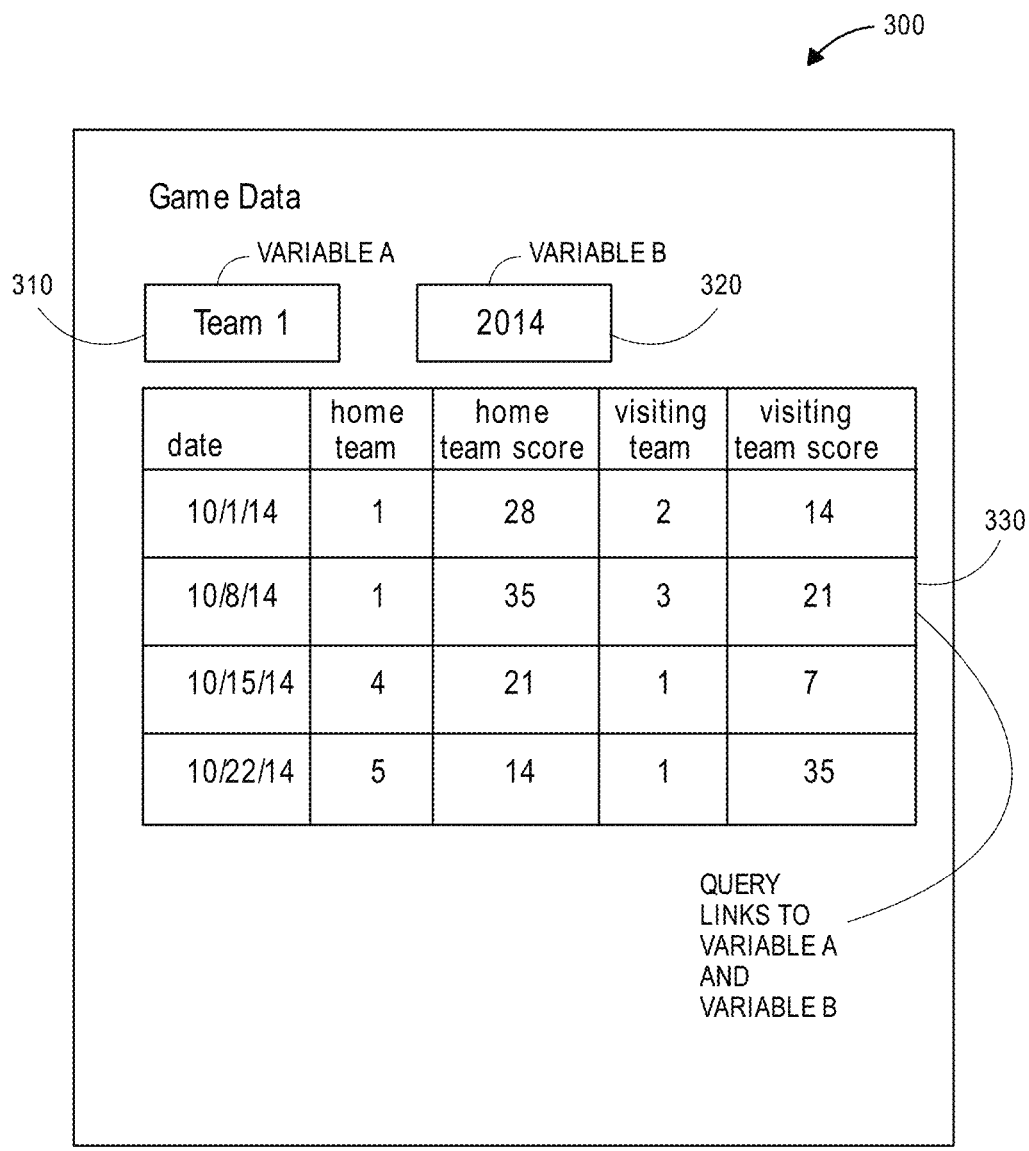
FIG. 3A illustrates one example of linking multiple dynamic panels.

FIG. 3A illustrates one example of linking multiple dynamic panels. In the example of FIG. 3, panels 310, 320, and 330 are similar to panels 110, 120, and 130 in FIG. 1. Panels 310, 320, and 330 may be named p1, p2, and p3, respectively. As mentioned in connection with FIG. 1, panel 310 can be a dropdown control that selects the team to view; panel 320 can be a dropdown control that selects the season for which to display the games; and panel 330 can be a table that displays the games for the team selected in panel 310 for the season selected in panel 320. For example, panels 310 and 320 can have a selected value variable associated with them since they are dropdown controls. The variables may be referenced as p1.selectedValue and p2.selectedValue. The query of panel 330 can reference p1.selectedValue and p2.selectedValue in the WHERE clause of a SELECT statement. For example, the query can be as follows: SELECT column FROM table WHERE team=p1.selectedValue AND season=p2.selectedValue. In the example of FIG. 3A, p1.selectedValue="Team 1" and p2.selectedValue="2014."

The query may refer to panels, variables of panels, and/or global variables as templates, and a template system or language can process the queries and replace any templates with corresponding values. For example, a template can be indicated by double curly brackets "{{" and "}}" in a template system or language, such as Handlebars and Mustache. In the example above, p1.selectedValue and p2.selectedValue may be enclosed in double curly brackets to indicate that they are templates. Therefore, the query for the example above can be written as: SELECT column FROM table WHERE team={{p1.selectedValue}} AND season={{p2.selectedValue}}. The template engine 350 can process and replace the templates with their corresponding values at the time of generating the finished user interface pages. In certain embodiments, the system 300 builds a graph of all the references from the templates and associates the references such that if any of the references change, the corresponding templates are regenerated or refreshed. Templates may also refer to objects other than panels, depending on the embodiment. Using double curly brackets to indicate templates is described above as an example, and any other syntax elements can be used to indicate templates.

In some embodiments, the user can define variables associated with the panels that can be referenced in a query. For example, the user can define variable A for panel 310 and variable B for panel 320, and the query for panel 330 can reference variable A and variable B in the query. For example, variable A and variable B can be associated with the selected value of panel 310 and panel 320, respectively. As explained above, in some embodiments, panels can have global variables associated with them.

Writing to Data Sources Using Dynamic Panels

Figure 4:
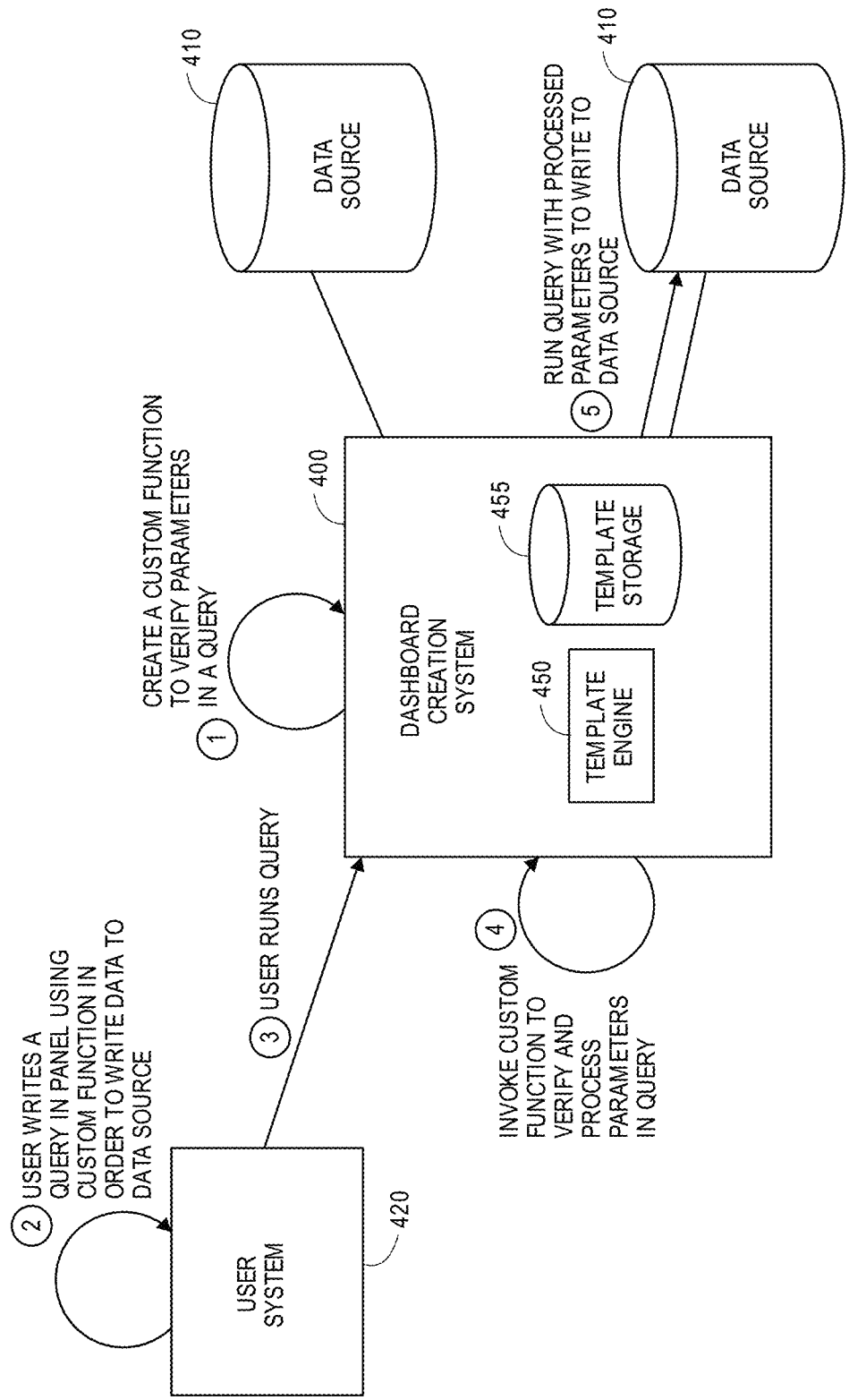
FIG. 4 is a data flow diagram illustrative of the interaction between the various components of a dashboard creation system configured to write to data sources using dynamic panels, according to one embodiment.

FIG. 4 is a data flow diagram illustrative of the interaction between the various components of a dashboard creation system 400 configured to write to data sources using dynamic panels, according to one embodiment. The system 400 and corresponding components of FIG. 4 may be similar to or the same as the system 300 and similarly named components of FIG. 3. The system 400 may include additional or different components, depending on the embodiment.

In some cases, it may be useful to allow users to write to or update the data sources through the panels. For example, the user may want to change the data in a panel and reflect the changes to the data source. The user could also save some selected rows from a table in one document for later use in other documents, or save notes from different users to a table for later reference. In certain cases, the user may also want to rename a portfolio in a database.

The system 400 can allow the users to update the data sources 410 through queries. For example, SQL queries or JSON queries can be used. SQL queries and JSON queries can refer to the panels as templates, and a template system or language like Handlebars or Mustache can process the queries and replace any templates with corresponding values. However, in certain cases, directly replacing the templates with the corresponding values can lead to unintended consequences. For instance, the user may specify an always true condition as the value to be replaced with a template in the WHERE clause of a SQL query, which can result in changing all data. In one example, the user creates a query as follows: UPDATE table SET text="newText" WHERE id={{p1.text}}. If the value of p1.text is "1=1," replacing the template {{p1.text}} with "1=1 would update every row in the table. Accordingly, the system 400 make the queries secure by using a custom function as explained below.

At data flow action 1, the system 400 creates a custom function to verify parameters in a query. For example, an administrator of the system 400 can create the custom function.

In some embodiments, the system 400 uses SQL queries and processes the SQL queries using Handlebars. The custom function can be a Handlebars helper. For example, the custom function can be named "param" and registered with Handlebars. Handlebars can invoke the custom function when processing the SQL queries. The user can use the custom function when using templates in SQL queries.

In one embodiment, the custom function prevents use of text values in templates and only allows parameter values in templates. For example, a variable of a panel used in a template should be a parameter value. Supposing that the variable of the panel referred to in a template is p1.property, the custom function checks whether p1.property is an array. If p1.property is not an array, the custom function replaces "{{param p1.property}}" with a "?" and saves the value of p1.property for reference, for example, in a reference array. If p1.property is an array with a length of n, the custom function replaces "{{param p1.property}}" with a string containing n question marks separated by commas and saves the value of each of element in the array for reference, for example, in a reference array. In this way, the custom function can help create parameterized queries, which contain placeholders such as "?" that can be inserted in query parameters. The SQL engine would escape and not evaluate these parameters, and therefore, parameterized queries can prevent SQL injection. For instance, the expression "1=1" would be escaped and would not be evaluated as a boolean expression; rather it is evaluated as a string.

For example, if p1.property is equal to 1, the custom function processes the SQL query UPDATE table SET text="newText" WHERE id={{param p1.property}} to UPDATE table SET text="newText" WHERE id=?, and stores 1 in the reference array. In another example, if p1.property is equal to an array [1, 2], the custom function processes the SQL query UPDATE table SET text="newText" WHERE id={{param p1.property}} to UPDATE table SET text="newText" WHERE id=(?, ?), and stores 1 and 2 in the reference array. The processed query and parameters can be prepared as a JDBC statement and run against one or more data sources 410. Types of parameters can be preserved (e.g., whether the parameter is a number or a string) by using additional Handlebars helpers.

In other embodiments, the system 400 uses JSON queries and processes the JSON queries using Handlebars and/or Mustache. A JSON query can include three parts: path, method, and body. The path and the body can use templates; since the method generally has a few options, templates may not be used with the method. In order to have different rules for the use of templates, the path, method, and body can be separated into different components of the query. For example, the path and method can be considered as metadata, and the body can be considered as the template.

The custom function can be used on the body of a JSON query. The custom function can be a Handlebars helper. For example, the custom function can be named "{{esc}}" and registered with Handlebars. Handlebars can invoke the custom function when processing JSON queries. The user can use the custom function when using templates in JSON queries. The custom function may verify that all values for templates are valid JSON values (e.g., string, number, object, array, boolean, null, etc.). The custom function can convert the value of templates to string format (e.g., using JSON stringify function). For example, {value: {{esc ptvalue}}} where p1.value is "a" (chars [a]) is evaluated to be {value: "a"}.

The system 400 can also create an additional custom function for string interpolation or for cases where the user wants to use another Handlebars helper (e.g., the join helper). The additional custom function can be a block helper; for example, it can be referred to as {{#esc}}{{/esc}} block helper. In one embodiment, the block helper can evaluate the templates within the block helper, take the result as one string, and convert the one string to string format. In other embodiments, Handlebars evaluates what is inside the block helper, and the helpers within the block helper can convert the result to string format. In certain embodiments, the block helper or helpers convert the result to string format (e.g., by calling JSON stringify function) for security. In one embodiment, JSON stringify function can be called on block helpers for security. Various embodiments described in this disclosure may be implemented separately or in combination as appropriate.

The system 400 may also define rules and features to be implemented in association with the custom function(s). In one example, for the path, the system 400 can require that values for templates are uniform resource identifier (URI) unreserved characters and are not periods. This can prevent the template value from going outside of the intended space in the path (e.g., intended directory). In some embodiments, the system 400 may not allow quotes around templates to avoid a string object from being closed accidentally. The system 400 may also require that all other non-block helpers are nested inside the {{esc}} helper or used inside the {{#esc}}{{/esc}} block helper.

At data flow action 2, the user writes a query in a panel using the custom function in order to write data to a data source 410. The system 400 can require users to use the custom functions when writing queries to write to a data source 410. For instance, the system 400 can return errors for queries that do not use the custom functions or do not use the custom functions properly.

At data flow action 3, the user runs the query. The user can associate the query with a query button panel. The user may run the query by clicking on the query button. The user system 420 can send the user query to the system 400.

At data flow action 4, the system 400 invokes the custom function to verify and process the parameters in the query. Upon receiving the user query from the user system 420, the system 400 can invoke the custom function on the query and format the query appropriately. If the processed query does not conform to the rules associated with the custom function, the system 400 can return an error.

At data flow action 5, the system 400 runs the query with the processed parameters to write to the data source 410. If the processed query is properly written and/or conforms to the rules associated with the custom function, the system 400 runs the query against the data source 410.

In certain embodiments, the system 400 also implements custom functions to verify parameters of queries for reading data. For example, the system 400 can create custom functions (e.g., Handlebars helpers) for verifying table names, column names, alias table names, alias column names, etc. In one embodiment, the system 400 creates Handlebars helpers "table," "column," and "alias" to make sure the table, column, or alias actually exists in the data sources 410. The system 400 can verify a table name or column name by checking that the table name or column name is within the schema of the database. The user can register the alias table name or column name, and the system 400 may verify an alias name by checking that it is registered.

Figure 5:
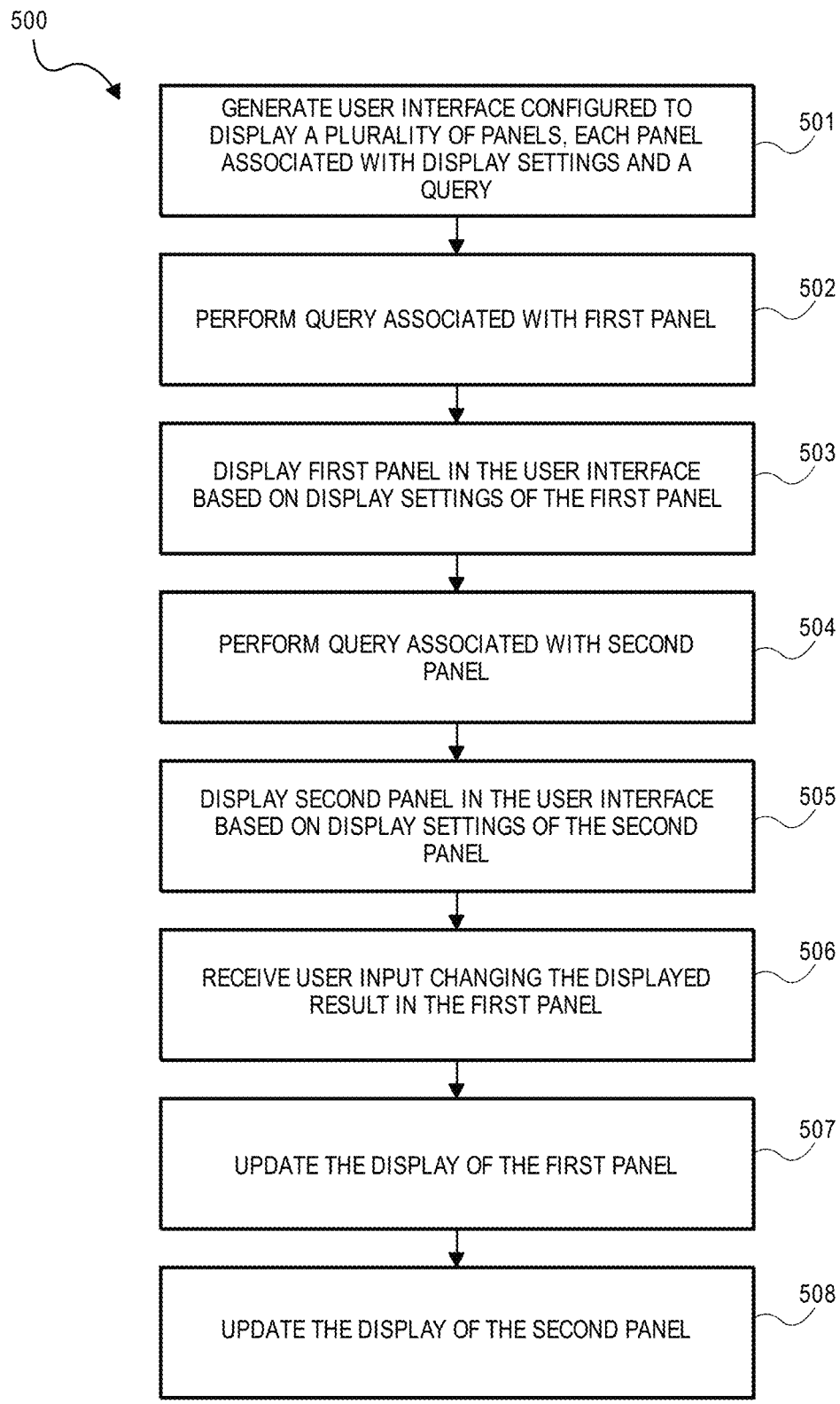
FIG. 5 illustrates a flowchart for creating and displaying dynamic panels in a user interface, according to certain embodiments.

FIG. 5 illustrates a flowchart for creating and displaying dynamic panels in a user interface, according to certain embodiments. The process 500 may be implemented by one or more systems described with respect to FIGS. 3 and 4. For illustrative purposes, the process 500 is explained below in connection with the system 300 in FIG. 3 and the example of FIG. 3A. Certain details relating to the process 500 are explained in more detail with respect to FIGS. 1-4. Depending on the embodiment, the process 500 may include fewer or additional blocks, and the blocks may be performed in an order that is different than illustrated.

At block 501, the system 300 generates a user interface configured to display a plurality of panels, each panel associated with display settings and a query. At block 502, the system 300 performs the query associated with a first panel. The first panel can be panel 310 in FIG. 3A.

At block 503, the system 300 displays the first panel in the user interface based on the display settings of the first panel. The query of panel 310 can be run to obtain the list of teams to display in panel 310. The list of teams can be displayed according to the document CSS of panel 310. One team from the list of teams may be displayed in panel 310 as the default value. For example, panel 310 shows the first team in the list.

Similarly, the system 300 can perform the query associated with panel 320 and display panel 320 in the user interface based on the display settings of panel 320. One season from the list of seasons may be displayed in panel 320 as the default value. For example, panel 320 shows the most current season in the list.

At block 504, the system 300 performs the query associated with a second panel. The second panel can be panel 330 in FIG. 3A.

At block 505, the system 300 displays the second panel in the user interface based on the display settings of the second panel. The query of panel 330 can be run to obtain the list of games to display in panel 330. As explained above, the query of panel 330 obtains the list of games to display for the team selected in panel 310 and the season selected in panel 320. The list of games can be displayed according to the document CSS of panel 330.

At block 506, the system 300 receives user input changing the displayed result in the first panel. For example, the user selects Team 1 from the list of teams in panel 310, and panel 310 is updated to show Team 1 as selected. The user selection is sent to the system 300.

At block 507, the system 300 updates the display of the first panel. If there are any changes to be made to panel 310, the system 300 can refresh panel 310, e.g., by rerunning the query and/or regenerating panel 310 through the template engine 350. In the example of FIG. 3A, panel 310 is a dropdown control, so the system 300 may not have to update panel 310.

At block 508, the system 300 updates the display of the second panel. Since the query of panel 330 links to panel 310, panel 330 is also updated to display games for Team 1 for the season selected in panel 320. For example, the query for panel 330 can be rerun. In this manner, linked panels can be updated dynamically.

Figure 6:
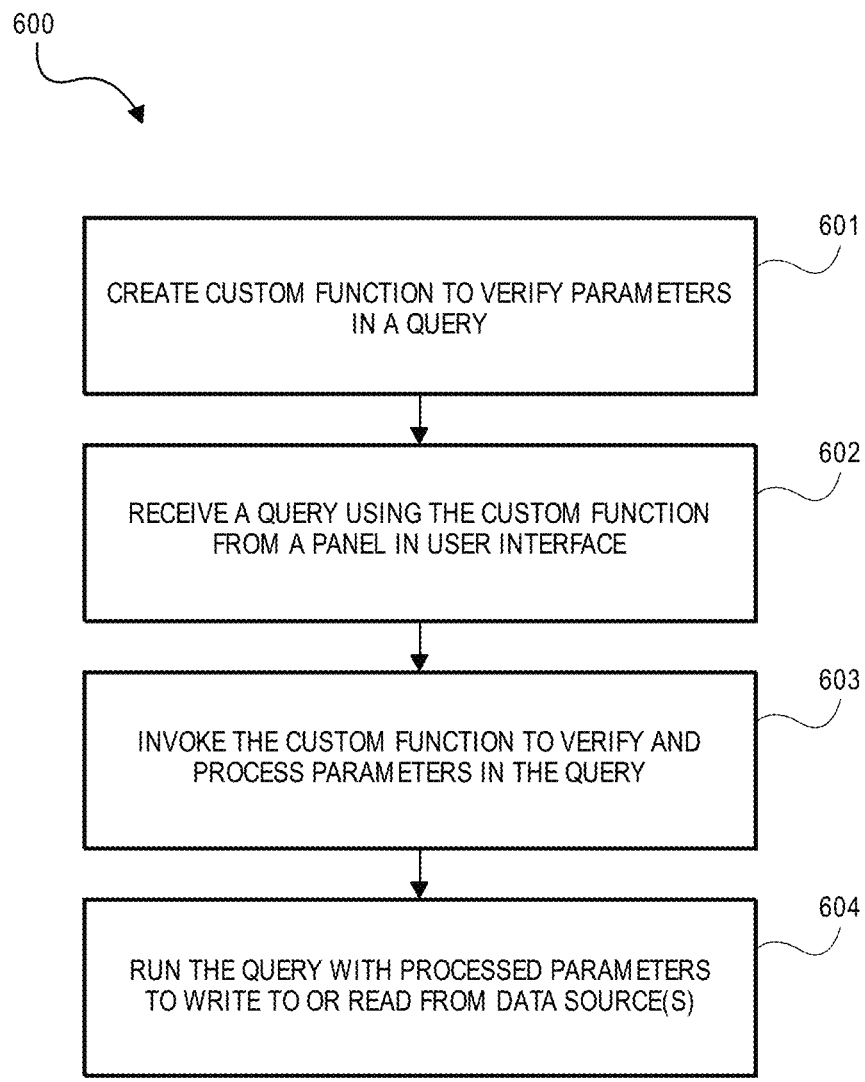
FIG. 6 illustrates a flowchart for writing to data sources using dynamic panels, according to certain embodiments.

FIG. 6 illustrates a flowchart for writing to data sources using dynamic panels, according to certain embodiments. The process 600 may be implemented by one or more systems described with respect to FIGS. 3 and 4. For illustrative purposes, the process 600 is explained below in connection with the system 400 in FIG. 4. Certain details relating to the process 600 are explained in more detail with respect to FIGS. 1-5. Depending on the embodiment, the process 600 may include fewer or additional blocks, and the blocks may be performed in an order that is different than illustrated.

At block 601, the system 400 creates a custom function to verify parameters in a query. The custom functions may be Handlebars helpers explained above, such as param helper, {{esc}} helper, {{#esc}}{{/esc}} block helper, etc.

At block 602, the system 400 receives a query using the custom function from a panel in the user interface. The user writes a query that uses the custom function.

At block 603, the system 400 invokes the custom function to verify and process parameters in the query. In one embodiment, the custom function replaces the parameters with respective placeholders and stores respective values corresponding to the parameters in an array. In another embodiment, the custom function changes respective values corresponding to the parameters to string format.

At block 604, the system 400 runs the query with the processed parameters to write to or read from the data source(s) 410.

FIGS. 7A-7C illustrate various examples of panels and features provided by a dashboard creation system, according to certain embodiments. FIG. 7A illustrates the alignment indicator feature for panels. As the user moves a panel within the user interface, other panels that line up with the panel being moved can be distinguished in the user interface to indicate that they are aligned. For example, the borders of the other panels can be highlighted, displayed in a different color, etc. In one embodiment, one or more guidelines appear to show that the panels are lined up (e.g., at one edge).

FIG. 7B illustrates the auto zoom feature for panels. When the finished user interface pages are displayed in the user interface, the user may resize the window of the user interface. In such case, the document and/or the panels in the user interface pages may be resized based on the width of the window. For example, if the window size is increased, the size of the document and/or the panels in the UI pages increase to fit the width of the window. Or if the window size is decreased, the size of the document and/or the panels in the UI pages decrease to fit the width of the window. This can be different from typical web pages where the content of the web pages remains the same regardless of whether the window of the browser is resized or not.

FIG. 7C illustrates another example of a panel 730. This panel may be referred to as a "card" panel since it includes one or more cards that can be selected. A card panel may refer to visualization of certain information within a card-like display. Either a single card or multiple cards can be selected, and the selections can be linked to other panels. In the example of FIG. 7C, different cards indicate a particular score combination for the outcome of a game. Users may sign up for a particular score combination in order to predict the outcome, and the user names are listed in the card they sign up for.

In certain embodiments, the user login information may be saved as global variables so that they can be accessible within the document. The user login information can include the group, email address, name, etc. of the user. The user login information may be used in queries, for example, to check permissions, etc.

Dashboard Creation Application

The system for providing a plurality of dynamic panels in a user interface as explained above may also be referred to as a "Dashboard Creation Application." The Dashboard Creation Application (DCA) can be an extensible WYSIWYG (What You See Is What You Get) web application for quickly and easily creating interactive, data-driven web pages. For example, the Dashboard Creation Application can easily create interactive dashboards which support lightweight filtering and drill-down operations on top of arbitrary data storage systems or data sources.

In one embodiment, the Dashboard Creation Application enables analysts to author dashboards of visualizations for easy consumption by end users. It will provide a number of panels like charts, tables, and images, in a pluggable architecture so analysts can add custom panels for particular deployments. For example, a standard plug-in structure can be used across systems and products. Panels will be interactive and coordinated, and support filtering/aggregations to create drill-down style analysis. The dashboard author will have fine control over the layout and styling of the panels contained in each Dashboard Creation Application dashboard. The Dashboard Creation Application will be deployable on top of any collection of other products for presentation and dashboarding use cases because it is agnostic to the underlying data store.

In various embodiments, the Dashboard Creation Application may perform one or more of the functions noted below:

Create dashboards which use Elasticsearch or SQL data sources
Add chart, table, text, dropdown, map, multi-select, etc. panels to dashboards
Create custom panels
Create basic links between panels
Move and resize panels via the UI
Edit the query template associated with a panel through the UI
Create/manage new documents through the UI
Flexibility around which portions of a JSON response can be accessed and used as data for the panels
Share a pool of queries/variables across all panels to make it easier to build dashboards
Abstracting out features across backends into the "basic" or "beginner" UI In some embodiments, the Dashboard Creation Application integrates closely with other products so that more use cases can be covered by combining the tools appropriately. The numbers and types of users reached can be increased by improving the usability and expressiveness of the UI available to end users for building dashboards. In various embodiments, the Dashboard Creation Application may implement one or more of the functions noted below:

Expansion of the formatting UI—users can make very specific visual edits to the panels through the UI
Filters and/or panels from other applications or web-based applications can be dropped into and used inside Dashboard Creation Application.

Example Implementation Mechanisms

Figure 8:
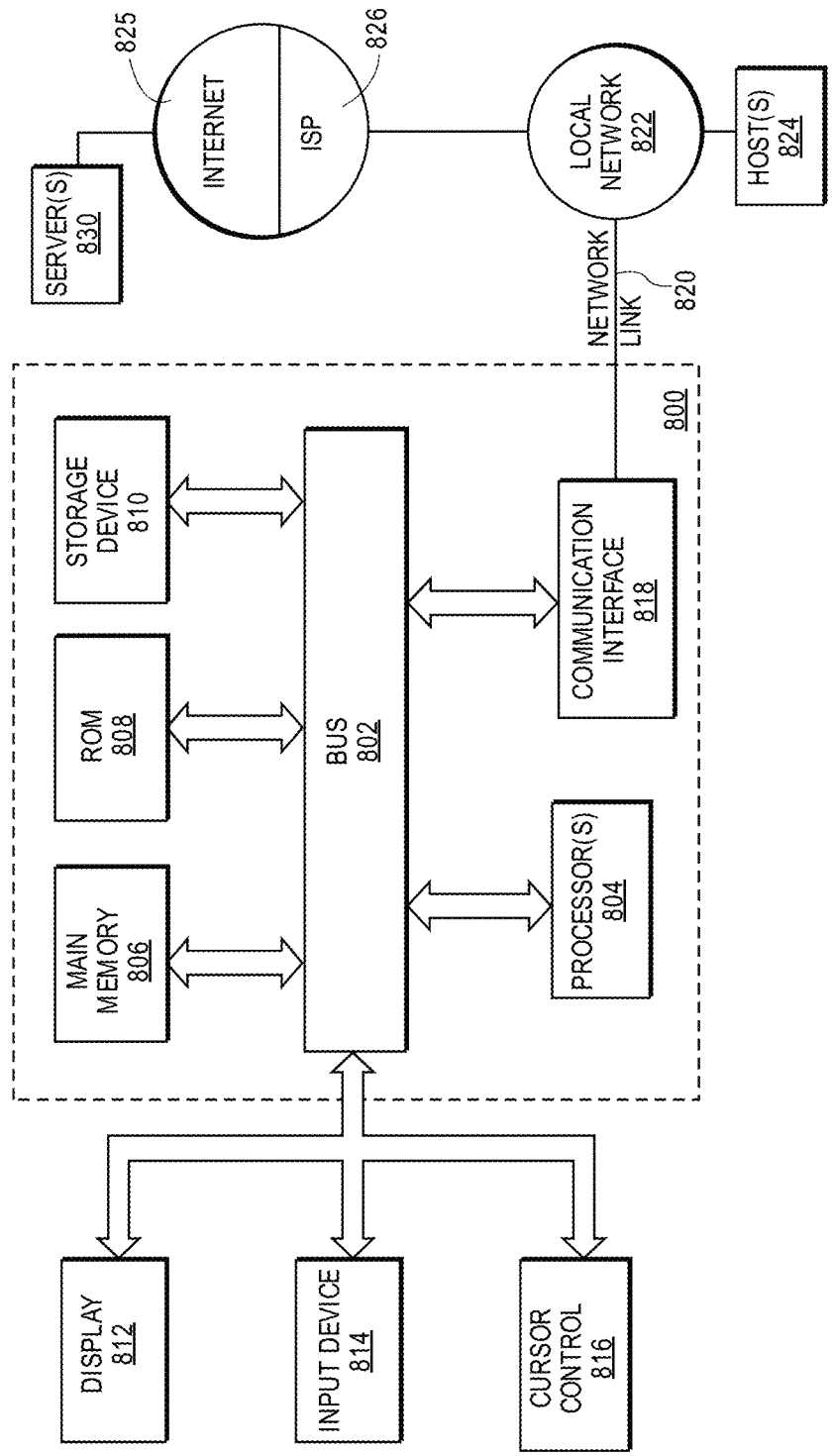
FIG. 8 illustrates a computer system with which certain methods discussed herein may be implemented.

For example, FIG. 8 shows a block diagram that illustrates a computer system 800 upon which an embodiment may be implemented. For example, the computing system 800 may comprise a system for providing a plurality of dynamic panels in a user interface. Other computing systems discussed herein may include any portion of the circuitry and/or functionality discussed with reference to system 800. For instance, the system 300 and/or 400 can each include some or all of the components and/or functionality of the system 800.

Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicate with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 825. Local network 822 and Internet 825 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 825, ISP 826, local network 822 and communication interface 818.

The received code may be executed by processor 804 as it is received, and/or stored in storage device 810, or other non-volatile storage for later execution.

Example Dashboard Creation System

Figure 9:
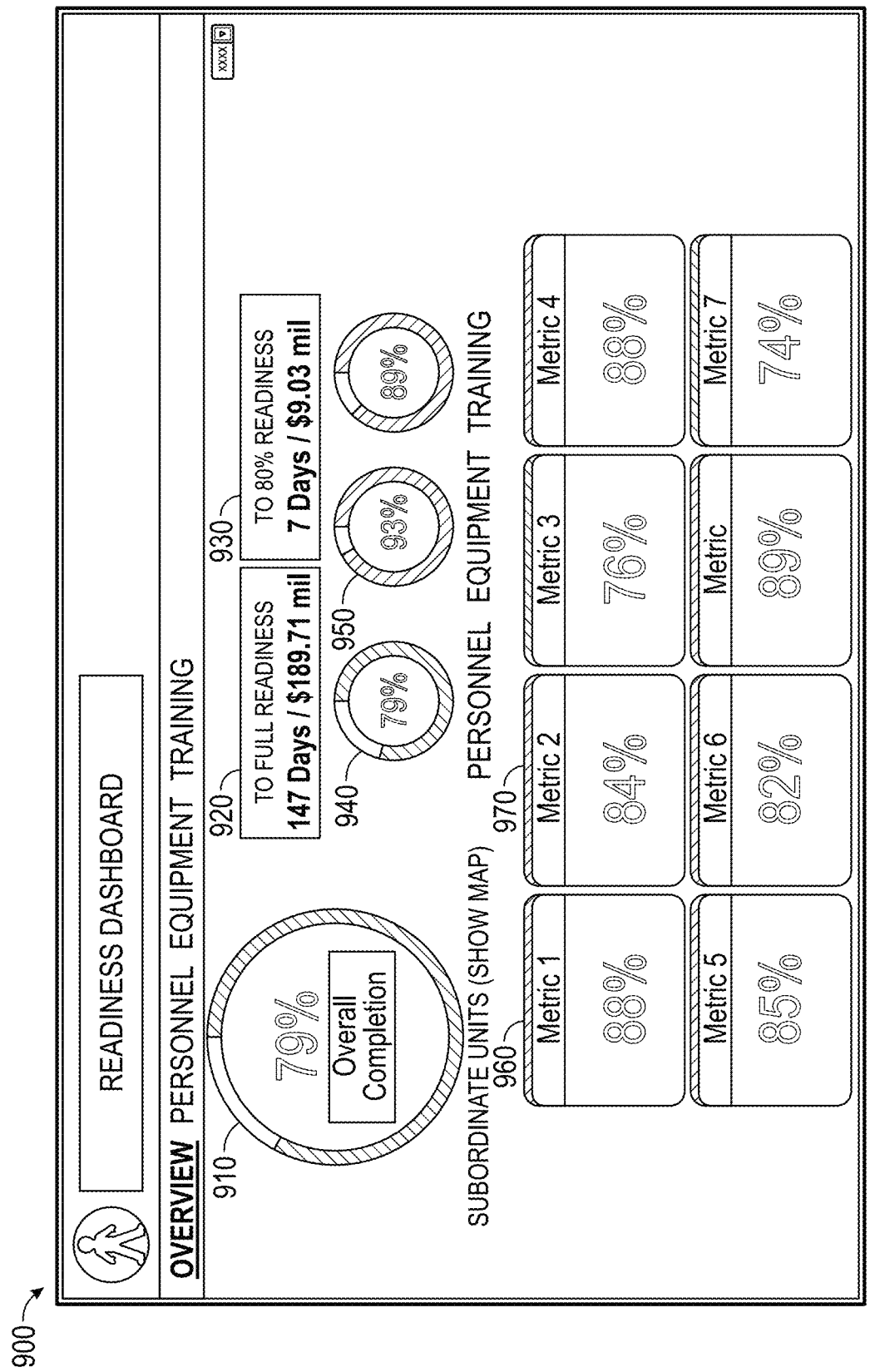
FIG. 9 illustrates one embodiment of a user interface comprising dynamic panels for displaying results of queries performed on one or more data sources.

FIG. 9 illustrates one embodiment of a user interface 900 comprising dynamic panels for displaying results of queries performed on one or more data sources. Panels 910, 920, 930, 940, 950, 960, and 970 are some examples of different types of panels that can be included in the user interface 900. Panels 910, 940, and 950 show progress as a bar and as a percentage. Panels 920 and 930 show countdown progress as a number of days and as budget remaining. Panels 960 and 970 show the progress of certain metrics as percentages.

Like the panels described with respect to FIG. 1, the panels in FIG. 9 can be linked to one or more other dynamic panels. The panels in FIG. 9 can also output data to other panels, are associated with query code for retrieving data, output a visualization based on the queried data and selected display settings, and update when the underlying data changes. Furthermore, in addition to the panels being associated with query code, the panels can use one or more variables, be defined with one or more styles, have a number of HTML or CSS properties, be dependent on data from other panels, or output data used by other dependent panels.

Figure 10:
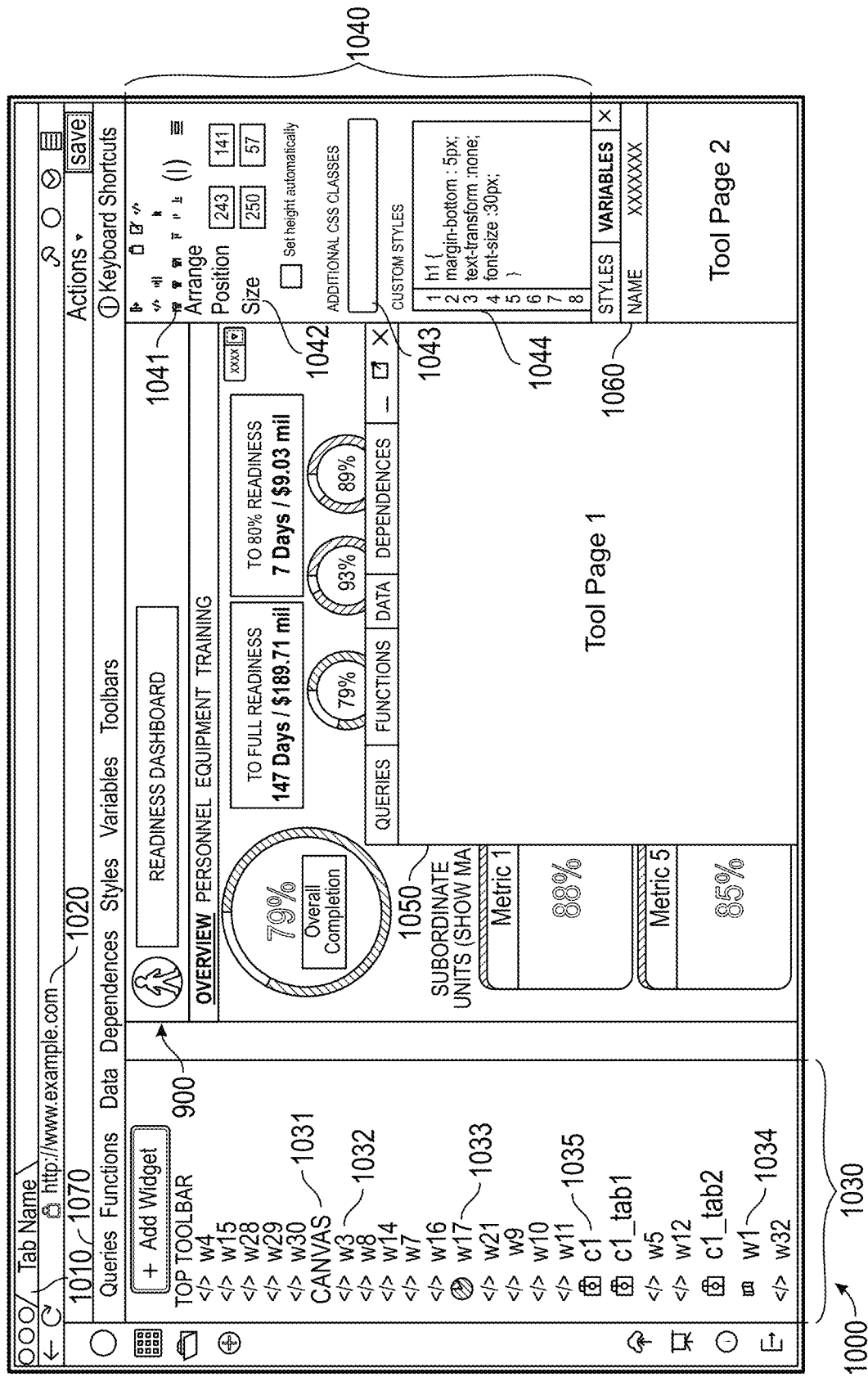
FIG. 10 illustrates one embodiment of a user interface of a dashboard creation system comprising dynamic panels for displaying results of queries performed on one or more data sources with editing tools.

FIG. 10 illustrates one embodiment of a user interface 1000 of a dashboard creation system comprising dynamic panels for displaying results of queries performed on one or more data sources with editing tools. FIG. 10 includes the user interface 900 from FIG. 9 in a dashboard creation system with tool pages 1030, 1040, 1050, and 1060 in a browser 1010. The example embodiment of FIG. 10 shows other embodiments for displaying a number of elements shown and discussed with respect to FIGS. 2A-2D.

The user interface 1000 can be accessed as a through a browser or as a standalone program. As shown in FIG. 10, the example user interface 1000 is accessed in a browser 1010 by accessing a website address 1020. In some embodiments, the user interface 1000 can be accessed through a local program, which can be helpful for using the dashboard creation system when internet access is not available. A toolbar 1070 at the top of the page includes buttons to access tool pages related to queries, functions, data, dependencies, styles, variables, and other toolbars. In some embodiments, the tool pages can be shown as standalone pages or as tool pages overlaid on top of interfaces (for example, FIG. 2B shows a query page 220 while FIG. 2C shows a global variables page 230 as a tool page overlaid on top of main page 210). Although FIG. 10 shows tool pages 1030, 1040, 1050, and 1060 beside or overlaid on user interface 900, different embodiments may also show the tool pages as separate pages.

Tool pages 1050 and 1060 include tabs indicating the type of tool pages that are available. Tool page 1050 includes tabs for queries, functions, data, and dependencies. Tool page 1060 includes tabs for styles and variables.

The user interface 1000 also includes tool pages 1030 and 1040 in column format along the left and right sides of the user interface 900. Tool page 1030 includes a number of selectable interface elements such as layout group 1031, coded element 1032 indicated by a "</>" tag icon, visualization 1033 indicated by a pie chart icon, map 1034 indicated by a map icon, and other types of elements 1035 indicated by other icons. Tool page 1030 can include the structural divisions of main page 900, including structural divisions for the header, body, comments, tables, paragraphs, div, etc., and elements listed in tool page 1030 can be nested to reflect those structural divisions. Tool page 1040 includes multiple icons 1041 for alignment and fields 1042 for arrangement. Tool page 1040 can also include CSS associations 1043 and custom styles 1044 where a style can be defined for any element or group of elements on a page. The icons 1041, fields 1042, CSS associations 1043, and custom styles 1044 can be interacted with to cause properties to change in the coding of the user interface 900, such as in the HTML, CSS, or script coding.

The document of FIG. 9 can be easily created and edited using the interface shown in FIG. 10. Querying documents, interacting with variables, defining styles, formatting element layouts, and displaying queried data can require technical skills including programming in database languages such as SQL and other languages JSON, XML, HTML, CSS, Javascript, as well as graphic design skills. However, the panels provide a template that already incorporates much of the technical backbone so that users do not need in-depth technical skills. Properties of panels manipulated in the tool pages automatically generate the corresponding code, greatly simplifying the document development process. Fields still provide the ability to manipulate panels by code-level edits.

Example Tool Pages

FIGS. 11A-11C illustrates embodiments of user interfaces of a dashboard creation system for creating a dynamic panel. The user interfaces in 11A-11C can be overlaid on top of other interfaces. For example, the user interfaces in 11A-11C, 12-16, and 19-20 can be displayed as tool pages 1050 and 1060 in FIG. 10. In some embodiments, the user interfaces 11A-11C are displayed as standalone pages.

The user interface in FIG. 11A shows a query page 1100 that allows a user to enter and edit a query associated with a panel. Query page 1100 can appear when the user clicks on the query link in the toolbar 1070 of FIG. 10 or on the query link in the toolbar 1101 at the top of the query page 1100 of FIG. 11A. The query page 1100 can display a list of queries 1102. The queries in the list of queries 1102 can be queries that are stored in a database and can be reused across different panels and different documents. A user can select a query from the list of queries or create a new query by clicking a button 1104. The query page 1100 can also include a code section 1106 for entering the query and a preview section 1108. The user may update or delete any query from the query page 1100. Selecting a query from the list of queries 1102 can cause the code section 1106 to show the code associated with that query. Selecting a panel (such as panels 910, 920, 930, 940, 950, 960, and 970 of FIG. 9) can cause the query associated with the selected panel to be displayed in the code section 1106. The query may read from or write to one or more databases that can be selected from database dropdown list 1112, which can auto-populate with a list of available databases and databases referenced by any of the queries in the query list 1102. The example database selection in the database dropdown list is SQL Database 1. A run button 1114 can be clicked to execute the query. In some embodiments, the run button 1114 can execute the query selected in the list of queries 1102 or displayed in code section 1106 along with any dependent queries. A preview section 1108 shows a preview of results of the execution of the query in code section 1106. An update button 1116 can update the query or the output when clicked and also indicated if the query or output is updated. Clicking the update button can also cause variables, panels, widgets, and functions that depend on the edited query to also update. Determining the dependent relationships is further discussed with respect to other figures such as FIG. 12. A button 1118 can also be provided to include partials, which are parts of reusable code.

The user interface in FIG. 11B shows a function page 1140 that allows a user to enter and edit a function. Function page 1140 can appear when the user clicks on the function link in the toolbar 1070 of FIG. 10 or on the function link in the toolbar 1101 at the top of the function page 1140 of FIG. 11B. The function page 1140 can display a list of functions 1142. The functions in the list of functions 1142 can be functions that are stored in a database and can be reused across different queries and different documents. A user can select a function from the list of queries or create a new function by clicking a button 1144. The function page 1100 can also include a code section 1146 for entering the function and a preview section 1148. The user may update or delete any function from the function page 1100. Selecting a function from the list of functions 1142 can cause the code section 1146 to show the code associated with that function. Selecting function code used in a query can provide an option to display the function code in code section 1146. The function shown in the code section 1146 can be written in a template syntax that is different from the language of the query shown in code section 1106. A run button 1150 can be clicked to execute the function. In some embodiments, the run button 1150 can execute the function selected in the list of functions 1142 or displayed in code section 1146 along with any queries that are dependent on the function. A preview section 1148 shows a preview of the function's output. An update button 1152 can update the function or the output when clicked and also shows a checkmark to indicate if the function successfully runs on a page load. An "X" or other indicator can show when the function fails to successfully run.

The user interface in FIG. 11C shows a variables page 1180 that allows a user to view and edit variables, similar to the global variables page 230 of FIG. 2C. Variables page 1180 can appear when the user clicks on the variables link in the toolbar 1070 of FIG. 10 or on the variables link in the toolbar 1182 at the top of the variables page 1180 of FIG. 11C. The function page 1180 can display a list of variables 1184 and the value of the variables. The variables in the list of variables 1142 can be local variables. In some embodiments, the variables in the list of variables 1142 can be global variables that can be reused across different queries. In some embodiments, the variables in the list of variables 1142 can be global variables that can be reused across different documents. A user can create a new variable by clicking a button 1186. Selecting a variable used in a query or function can provide an option to display the variable in variable page 1180.

The tool pages shown in FIG. 11A to 11C provide helpful, code-level editing tools. This way, documents can be edited and scripted at code-level details so that technically skilled document developers are not limited to templated functionalities.

Example Dependency Tool Pages

Figure 12:
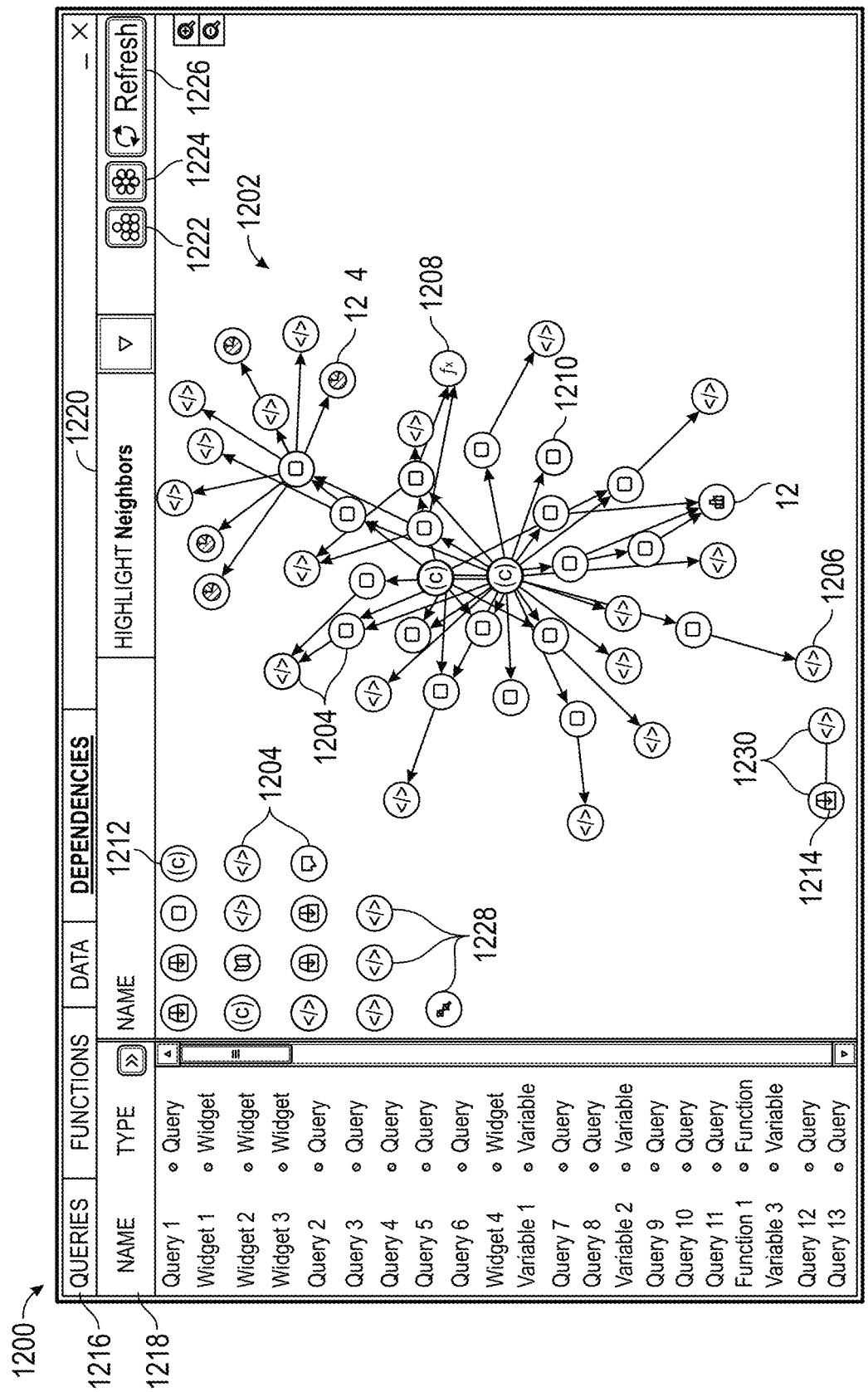
FIG. 12 illustrates one embodiment of a user interface comprising a visual indication of dependencies.

FIG. 12 illustrates one embodiment of a user interface comprising a visual indication of dependencies. The user interface shows a dependency page 1200 that shows visualization 1202 of dependencies of, or relationships among, queries, functions, variables, widgets, and/or the like. As used herein, a first element is "dependent" on a second element if the first element cannot be executed, completed, or known until the second element is known, completed, or executed and provided to the first element. For example, a panel configured to show the sum of a variable value added to a number queried from a database is dependent on both the variable and the query result.

The graphical visualization is shown as a layout of graphical nodes (e.g., icons, shapes, etc.). As used herein, the term "node" is a broad term that encompasses its ordinary and customary meaning, and includes but is not limited to any representation or indication of a data item (e.g., an element) or a group of data items. For example, the term "node" may refer to any type of graphical representation of a data item, e.g., as shown in the visualization 1202. In another example, the term "node" may refer to any type of logical representation of any data item, e.g., a digital representation of a data item as stored in a database or otherwise stored in a computer readable storage medium. The nodes can be connected by one or more edges (which may be directional or not). Accordingly, the visualization 1202 comprises a visual representation of a type of mathematical graph. Thus, the dependency visualization 1202 may also be referred to as a "dependency graph" or simply a "graph."

The nodes in the graph 1202 are represented as icons 1204 with arrows (or edges) indicating the direction of dependencies. As used herein, the term "edge" is a broad term that encompasses its ordinary and customary meaning, and includes but is not limited to any representation or indication of a relationship among two or more nodes (e.g., two or more elements or groups of elements). For example, the term "edge" may refer to any type of graphical representation of a relationship or dependency between two nodes, e.g., as shown in the visualization 1202. In another example, the term "edge" may refer to any type of logical representation of a relationship among two or more nodes, e.g., a digital representation of a relationship among two or more nodes (e.g., data items) as stored in a database or otherwise stored in a computer readable storage medium.

The different icons represent different elements of a document, similar to the icons shown in FIG. 10. The dependency page 1200 in FIG. 12 can include icons for coded elements 1206 such as widgets, functions 1208, queries 1210, variables 1212, and packages 1214. The icons can be color coded. For example, the widget icons 1206 can be blue, the function icons 1208 can be yellow, and the variable icons can be purple. Icons can further be broken down to show subtypes. For example, icon 1206 can be a blue circle with "</>" to show a widget, icon 1232 can be a blue circle with a bar graph to show a bar graph widget, and icon 1234 can be a blue circle with a pie chart to show a pie chart widget. Some elements in a document have neither upstream nor downstream dependency. Several icons 1228 shown in the top left corner have no dependent arrows because the elements underlying the icons are independent and have no downstream dependencies. Some groups of elements in a document can have a separate dependency chain. Icons 1230 show a small dependency chain separate from the main web.

Dependency page 1200 can appear when the user clicks on the dependency link in the toolbar 1070 of FIG. 10 or on the dependency link in the toolbar 1216 at the top of the dependency page 1200 of FIG. 12. The dependency page 1200 can display a list of elements 1218 included in the graphical visualization 1202. The list 1218 can show both the name and type of element. In some embodiments, a user can select an element in either the list 1218 or the visualization 1202 to show or highlight the element in the other of the list 1218 or the visualization 1202. In some embodiments, selecting an element in either the list 1218 or the visualization 1202 will show or highlight the element in a different user interface. For example, selecting a panel in the list 1218 or panel icon in the visualization 1202 can bring up panel 910 for display in the user interface 900 of FIG. 9 or FIG. 10 or bring up a query and query code associated with the selected panel in a query page 1100 of FIG. 11A. As another example, selecting a variable in the list of elements 1218 or a variable icon in the visualization 1202 can cause a variable page 1180 to display or highlight the selected variable. As another example, selecting a query in the list of elements 1218 or a query icon in the visualization 1202 can cause a query page 1100 to display the code of the selected query. As another example, selecting a variable in the list of elements 1218 or a variable icon in the visualization 1202 can cause a query page 1100 to display where in the query the code the selected variable is used.

Figure 13:
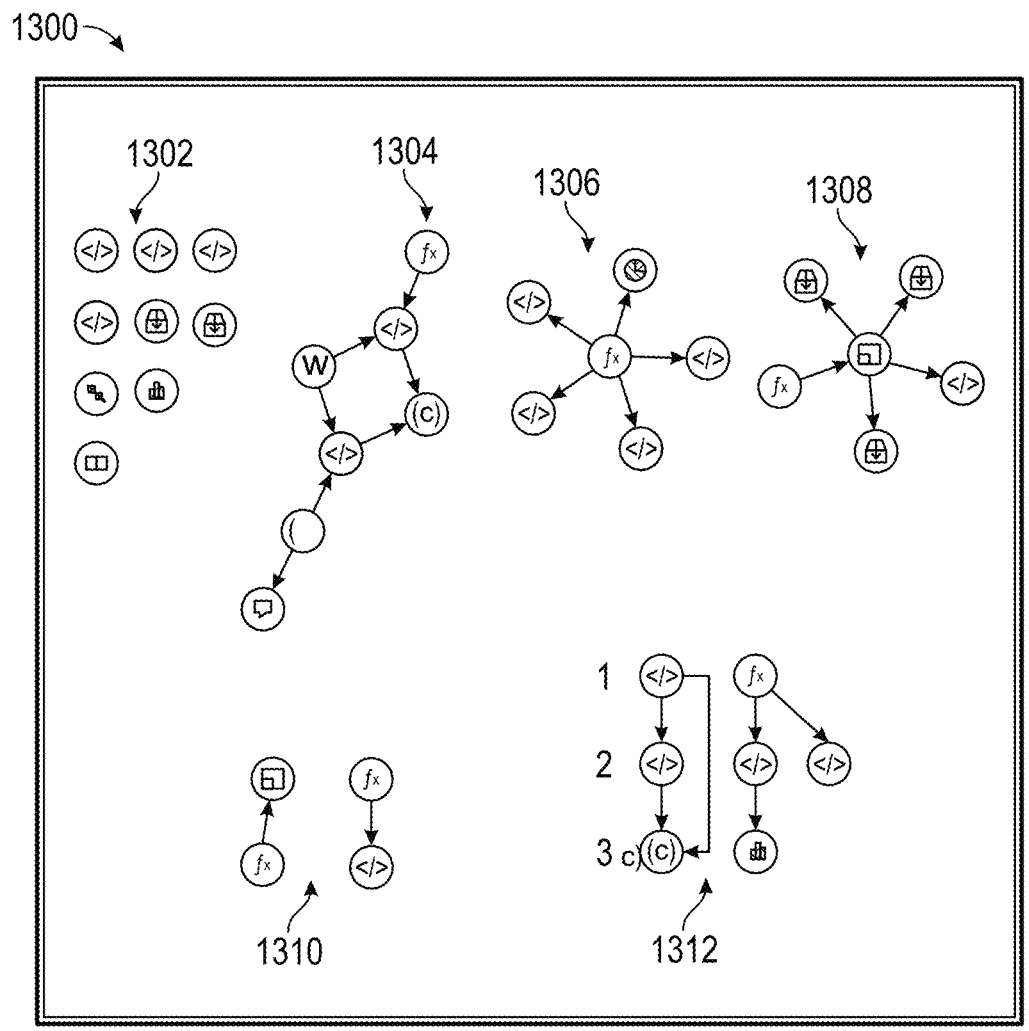
FIG. 13 illustrates embodiments of visual indications of dependencies.

The example dependency page also includes a dropdown menu 1220, a hierarchy view button 1222, a web view button 1224, and a refresh button 1226 along the top. The dropdown menu 1220 allows certain features to be highlighted in the visualization 1202 and is further described with respect to FIGS. 14 and 20. Clicking the hierarchy view button 1222 causes the icons in the visualization 1202 to display in an arrangement according to levels of dependency depth, with independent elements in a first area, elements with one level of dependency in a second area (such as below the first area), and so on. An example hierarchy is shown in FIG. 13. Clicking the web view button causes the icons in the visualization to display in the web-like arrangement shown in FIG. 12. In the web view, icons of the lowest level dependencies extending out as a chain of icons from icons of upstream elements. The refresh button can be clicked to re-determine dependencies and update the visualization 1202.

The visualization 1202 can be generated, at least in part, based on the way that queries are linked to other elements. For example, in some embodiments, variables in a query are coded with a template syntax such as Handlebars or Mustache. A custom function written in the language of the template syntax can be used to link the dependencies, such as a query and a variable. For example, the user creates a query as follows: UPDATE table SET text="newText" WHERE id={{p1.text}}. The function can extract the dependency of the parameter inside of the {{ }} and link the query with p1.text using Handlebar helpers. Accordingly, in some embodiments, a custom Handlebar can be used to determine some dependencies of an underlying language, such as SQL, without needing to execute the underlying SQL code. In some embodiments, the graph is drawn with SVG and managed with D3.js or any library that manages markup. In some embodiments, the layout can be generated as a force directed graph. In some embodiments, the layout or positioning of the nodes uses WebCola and Darge libraries. The dependency information can be stored and updated as the queries, panels, variables, and functions change. This stored dependency information can be used, as described in further detail with respect to other figures, to partially refresh parts of documents affected by changes without needing to refresh parts of documents unaffected by changes. This stored dependency information can also be used to determine options for populating autocomplete fields.

FIG. 13 illustrates embodiments of visual indications of dependencies. Dependency visualization area 1300 shows different arrangements of icons as visualizations of dependencies. Visualization group 1302 shows icons without interconnection arrows because elements underlying the icons have no upstream or downstream dependencies. Visualization groups 1304, 1306, and 1308 show different variations of visualization webs. Visualization group 1310 shows two, two-icon dependency webs. Visualization group 1312 shows a hierarchical view of dependency icons. The icons in the $2^{nd}$ layer of the hierarchy have at least one dependency to an icon in the 1st layer. The icons in the $3^{rd}$ layer have at least one dependency to an icon in the $2^{nd}$ layer.

Figure 14:
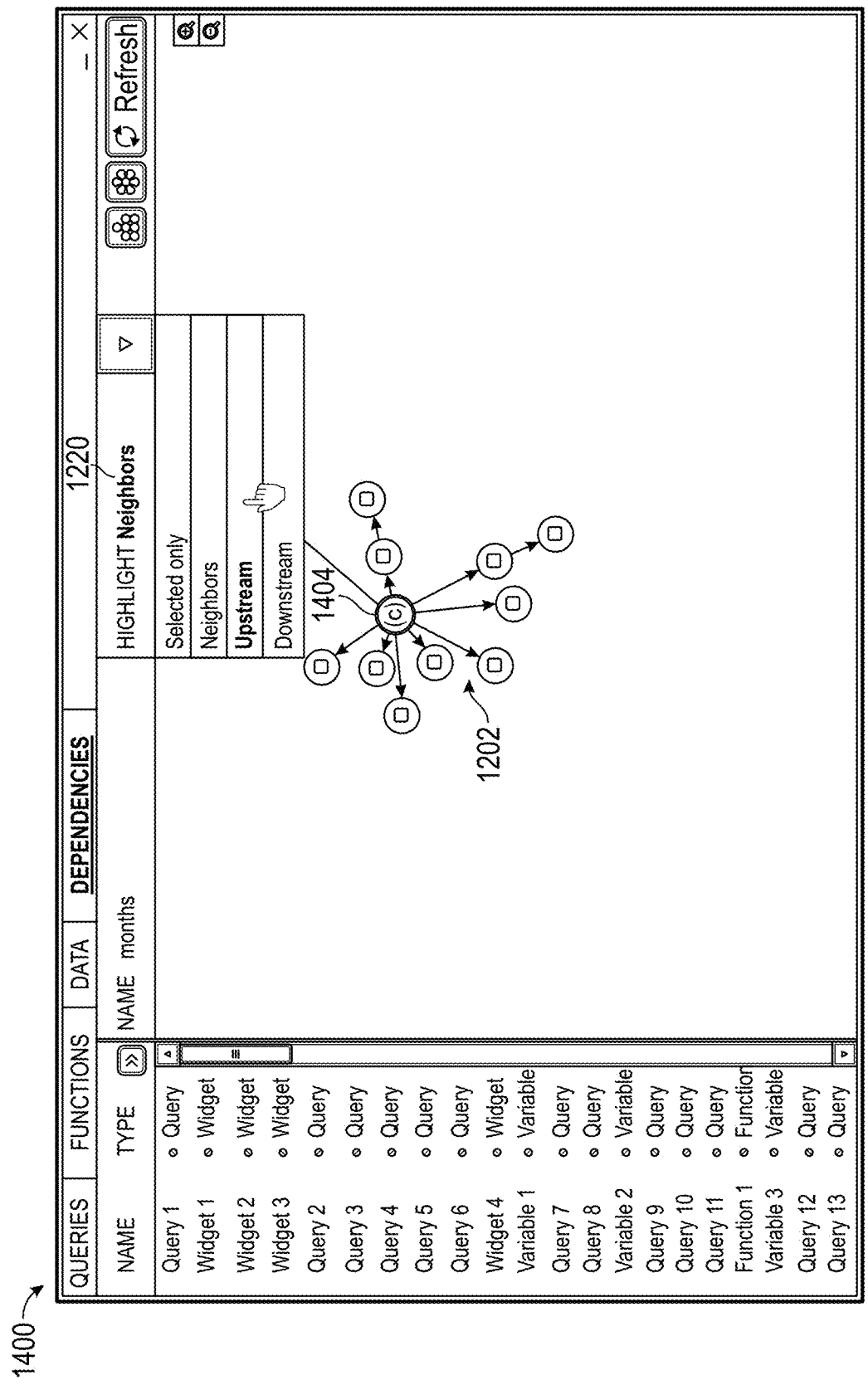
FIG. 14 illustrates one embodiment of a user interface comprising a visual indication of dependencies.

FIG. 14 illustrates one embodiment of a user interface comprising a visual indication of dependencies. FIG. 14 shows the effects of making sub-selections using the dropdown menu 1220 of FIG. 12. The user interface shows a dependency page 1400 that shows visualization 1202 after making a sub-selection of dependencies. Icon 1404 is selected in the visualization 1202. In the dropdown menu 1220, the option "Neighbors" is selected. In response, the visualization updates so that only the icons that are neighbors of the selected icon 1404 are shown. In some embodiments, all of the visualization 1202 is visible, but the neighbors are emphasized or highlighted. Other selections can be made to show or highlight upstream dependencies, downstream dependencies, or only selected icons. Other selections can be made to show only certain types of elements (e.g., only queries and variables).

The dependency visualization can be used to identify the longest dependencies and visualize dataflow. Based on this visualization, dataflow can be restructured so that documents load faster. Long dependency chains can be identified, and code can be rewritten so that elements are loaded in parallel instead of in sequence. The longest loading elements can be prioritized and coded to begin loading earlier. Furthermore, dependency data can be stored as dependency information. The dependency information can be referenced when changes are made to a document and the output of the document is refreshed. By referencing the dependency information, only elements dependent on changes can be refreshed, resulting in faster refresh times.

Example Tool Pages

Figure 15:
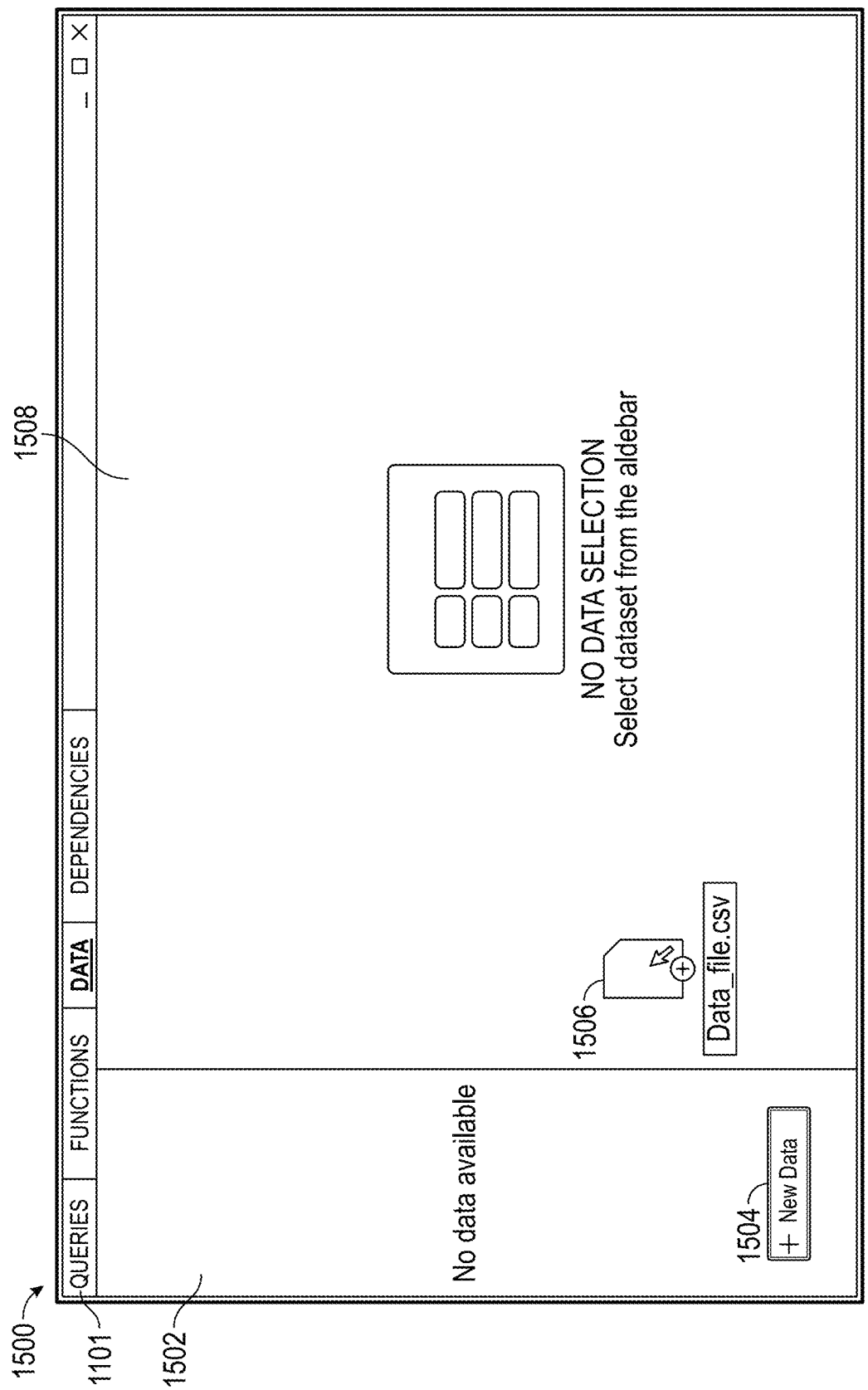
FIG. 15 illustrates one embodiment of a user interface for configuring a dataset.

FIG. 15 illustrates one embodiment of a user interface for configuring a dataset. The user interface in FIG. 15 shows a data page 1500 that allows a user to provide a local dataset. Data page 1500 can appear when the user clicks on the data link in the toolbar 1070 of FIG. 10 or on the data link in the toolbar 1101 at the top of the data page 1500 of FIG. 15. The data page 1500 can display a list 1502 of available datasets. The datasets in the list of datasets 1502 can be datasets that are stored on a local machine instead of being accessed through a network. Accessing a local dataset can allow users to test out code on various datasets without needing to configure a network connection and without needing to access remote databases. This way, a database can continue to be used while local data is experimented with. A user can select a dataset from the list 1502 of datasets or import a new dataset from a file by clicking a button 1504. Users can edit the data using the data page 1500 to see its effect on a user interface, such as user interface 900 of FIG. 9, without needing permissions to write data to or overwrite data on a database and without disturbing the database that might be in use. Alternatively, a user can drag and drop a file 1506 into the data page 1500. The data page 1500 can also include a preview section 1508. The user may update or edit any data from the data page 1100. Selecting a dataset from the list of datasets 1502 can cause the preview section 1508 to show the data contained within the dataset.

When remote databases are accessed, user permissions or authentication can be required. Queries to databases can access databases if appropriate permissions or credentials are configured. Examples of Access Control Lists and ACL features, and systems for generating ACLs as described herein, may be found in U.S. Pat. No. 8,527,461 entitled "CROSS-ACL MULTI-MASTER REPLICATION" filed Nov. 27, 2012, U.S. Pat. No. 8,688,749 entitled "CROSS-ONTOLOGY MULTI-MASTER REPLICATION" filed Mar. 31, 2011, U.S. Pat. No. 9,081,975 entitled "SHARING INFORMATION BETWEEN NEXUSES THAT USE DIFFERENT CLASSIFICATION SCHEMES FOR INFORMATION ACCESS CONTROL" filed Oct. 22, 2012, and U.S. Pat. No. 8,838,538 entitled "TECHNIQUES FOR REPLICATING CHANGES TO ACCESS CONTROL LISTS ON INVESTIGATIVE ANALYSIS DATA" filed Jul. 31, 2013, the entire disclosure of each of which is hereby made part of this specification as if set forth fully herein and incorporated by reference for all purposes, for all that it contains.

FIG. 16 illustrates one embodiment of a dataset shown in a user interface 1600. FIG. 16 shows the data page 1500 after data is loaded from the file 1506. Once imported, queries can be run against the dataset. The list of datasets 1502 includes the first set of imported data. The preview section 1508 shows the data contained within the data file 1506. Add column button 1610 can be clicked to add a column of data to the data set, and the add row button 1612 can be clicked to add a row of data to the data set. The upload button 1614 can be clicked to upload the dataset to the document itself, to a remote computer, or to a remote database. In embodiments where the upload button 1614 is clicked to upload the dataset to the document itself, the dataset can be stored in JSON as part of the document. The refresh button 1616 refreshes the displayed data based on any changes to the underlying source.

In some embodiments, the user interface 1600 can show data retrieved from a database. A name of the data or the database can be listed. When the name is selected, the data can be displayed in the user interface. A list of the available data from databases and from local sources can allow different sources of data to be selected and used. In some embodiments, local data can be edited or renamed, and queries can be directed to execute on the local data or locally edited database data instead of an original target of the query. Data that is locally edited can be uploaded to the document, a database, or a remote server by pressing the upload button 1614. In conjunction with using local data as shown in FIG. 16, the dashboard creation system can be run as an executable or downloaded file instead of being run through a web browser. By using a local executable dashboard creation system and local data files, no internet access is needed.

Figure 17:
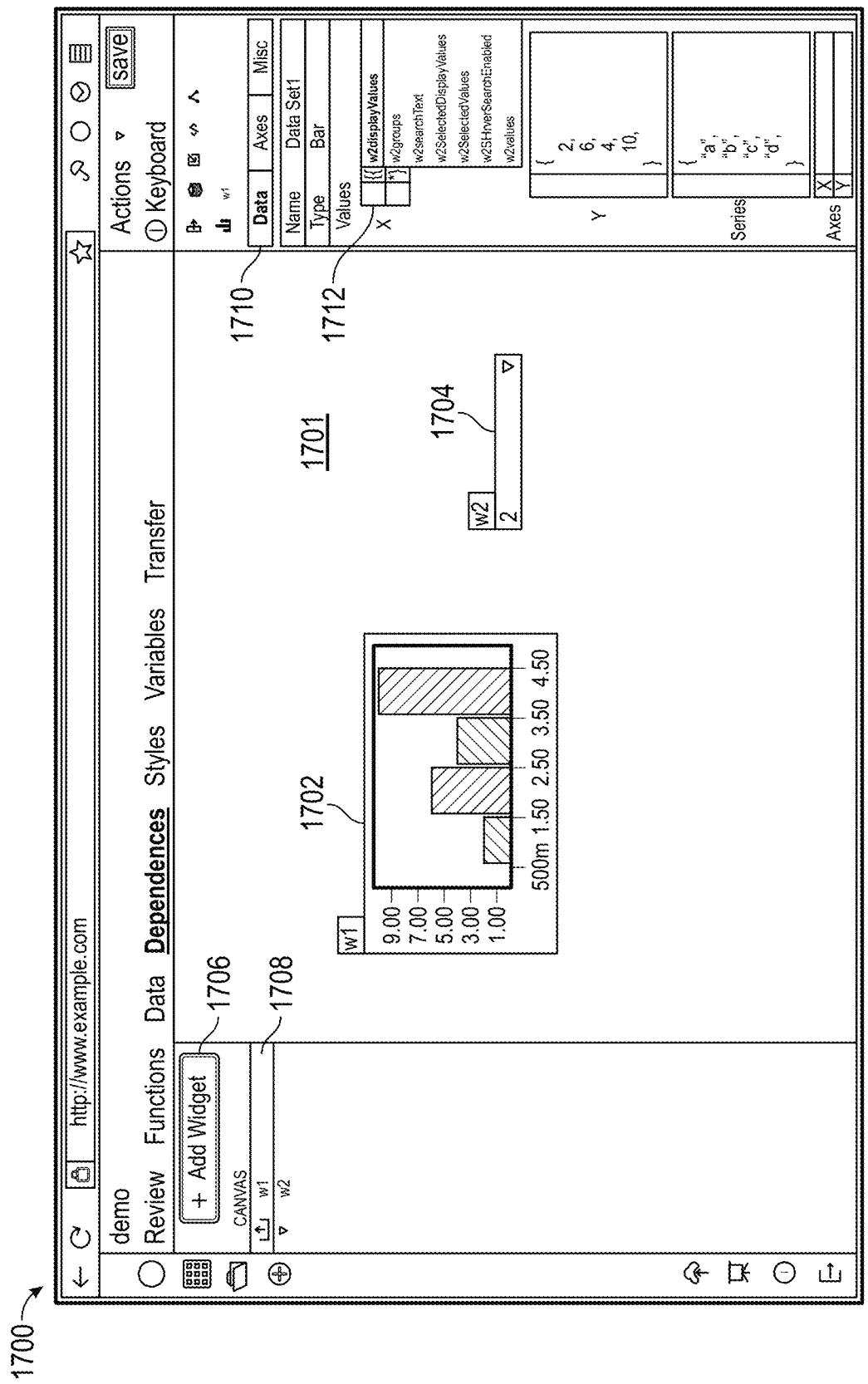
FIG. 17 illustrates one embodiment of a user interface comprising dynamic panels for displaying results of queries performed on one or more data sources with editing tools.

FIG. 17 illustrates one embodiment of a user interface comprising dynamic panels for displaying results of queries performed on one or more data sources with editing tools. The user interface 1700 shows a dashboard creation system with tool pages and a preview of a main page 1701. The main page 1701 includes a first panel 1702 named w1 that shows a bar graph representation of data. The main page 1702 also includes a second panel 1704 named w2 that shows a dropdown menu for a user to select a data source. The selected data source is the data source that is queried by w1 to generate the bar graph.

A tool page along the right side of user interface 1700 includes a number of fields to edit settings of a selected panel, such as w1. Buttons 1701 can be selected to edit the data, axes, or miscellaneous settings of panel w1. Field 1712 allows for code to be written defining the source of the x-axis for panel w1. As a value, such as "w2" is typed into field 1712, a dropdown menu is displayed to provide an autocompleted list of variables, objects, and other properties related to w2 for selection. Widgets can be added to the main page using an add widget button 1706. Tool page 1708 includes a list of selectable elements. In the example of FIG. 17, the list includes w1 and w2.

The field 1712 can populate options in the autocompleted list by referencing the stored dependency information. For example, panel w1 may use, for its x axis, {{SelectedDisplayValues}} of panel w2. This can be stored as a dependency: panel w1 depends on panel w2, which depends on {{SelectedDisplay}}. Accordingly, in the autocomplete list, the option "w2.SelectedDisplayValues" can be determined to be an autocomplete option by looking through data stored in the dependency chain.

Figure 18:
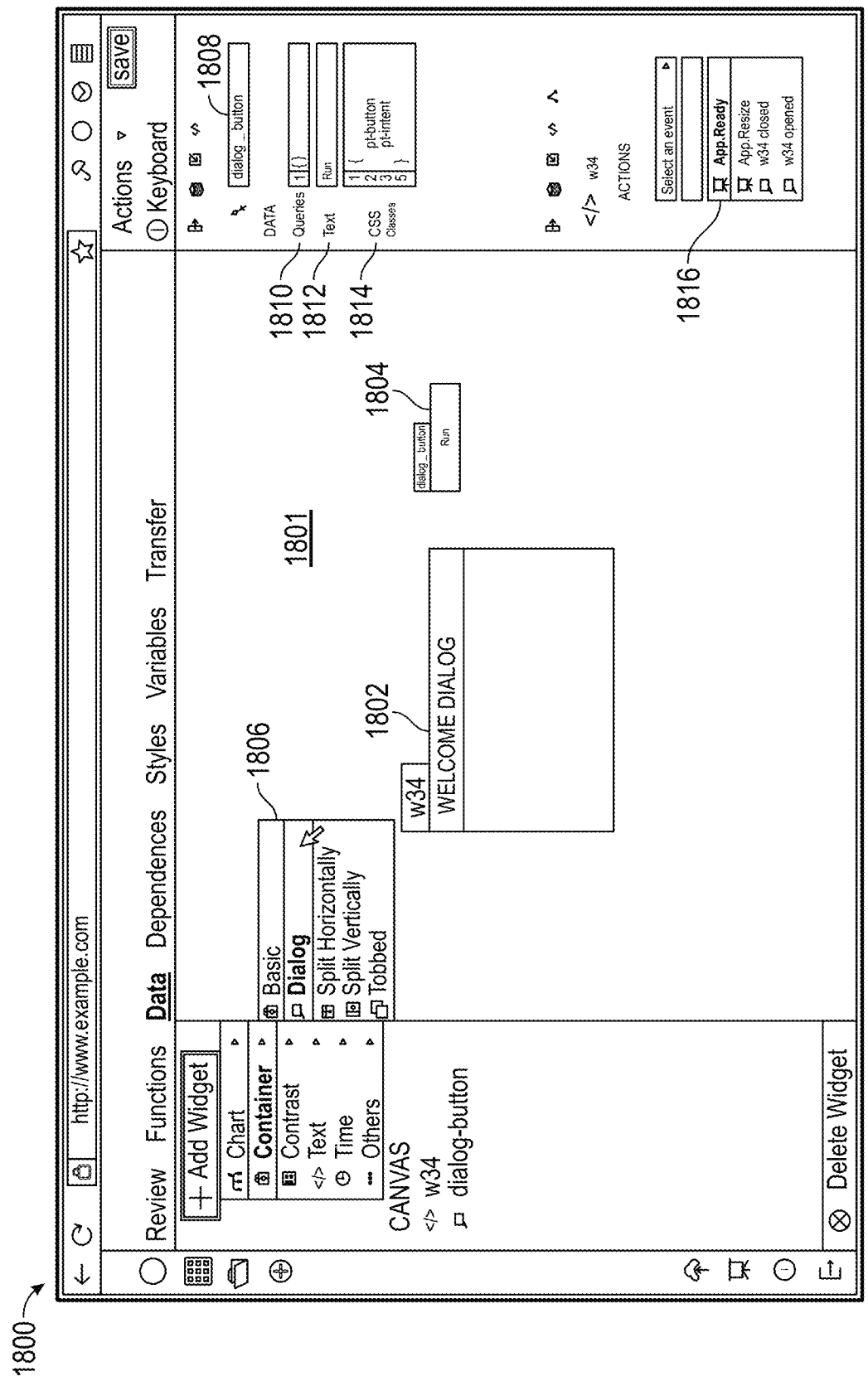
FIG. 18 illustrates one embodiment of a user interface comprising dynamic panels for displaying results of queries performed on one or more data sources with editing tools.

FIG. 18 illustrates one embodiment of a user interface comprising dynamic panels for displaying results of queries performed on one or more data sources with editing tools. The user interface 1800 shows a dashboard creation system with tools pages and a preview of a main page 1801. The main page 1801 includes a first panel 1802 named w34 and a second panel 1804 named dialog_button. The first panel 1802 is configured to display welcome text in a dialog box when the run button 1804 is pressed.

Widgets can be added to the main page 1801 by clicking the add widget button, which then causes a dropdown menu 1806 to display. Different categories of widgets are shown, and a panel type can be selected, dragged, and dropped into a location in the main page. Each widget placed on a main page 1801 can cause HTML, JavaScript, and query code to be coded in the document. Furthermore, tools provide for the entry of query code to be associated with the widget. Accordingly, widgets allow for user-friendly design of documents without needing technical HTML and JavaScript coding skills. In addition, the dashboard creation system provides editable fields to modify and code HTML, JavaScript, query, and other settings so that advanced users are not limited to a widget template.

A tool page along the right side of user interface 1800 includes a number of fields to edit settings of a selected panel, such as the dialog_button. A field 1808 allows the name of the panel to be edited. A query field 1810 allows a query to be written for the dialog button, and is currently shown as a blank set of braces. A text field 1812 causes any entered text to be displayed in the panel 1804. A CSS field 1814 allows a style to be defined for the panel 1804. The panel can refresh the representation of queried data when the text, style, or settings are modified.

An event menu 1816 for dialog panel w34 1802 provides for a selection of events to trigger the execution of one or more queries or other actions related to the dialog panel w34. In some embodiments, a function or query of dialog panel w34 will execute when triggered by the event selected in the event menu 1816. In some embodiments, the panel itself will not display, or will not display a visualization, until the event is triggered. Example events include when the user application is ready, when the user application is resized, when a panel is closed or opened, when a variable is set, when a script or function has started or completed, etc. In the example of FIG. 18, the welcome dialog is set to display when a user clicks the run button.

FIGS. 15 to 18 show additional functionality. Local data can be used where access to remote databases is not available. Local data also allows for data manipulation and experimentation in developing a document when data in the actual database may be in use by another program. For example, local medical data can be manipulated and experimented for designing a document for a hospital because experimenting with a hospital's live database could have undesirable consequences. Having multiple data sources gives document developers flexibility to experiment. The further help with experimenting and document design. Document development tools, such as autocomplete fields and panel displays of queried data, can be determined and shown quickly by partially refreshing elements dependent on changes instead of refreshing entire documents. Changes can also be quickly reflected across different pages by updating dependent elements. The dependencies can be determined by the stored dependency information.

Example Timing Tools

Figure 19:
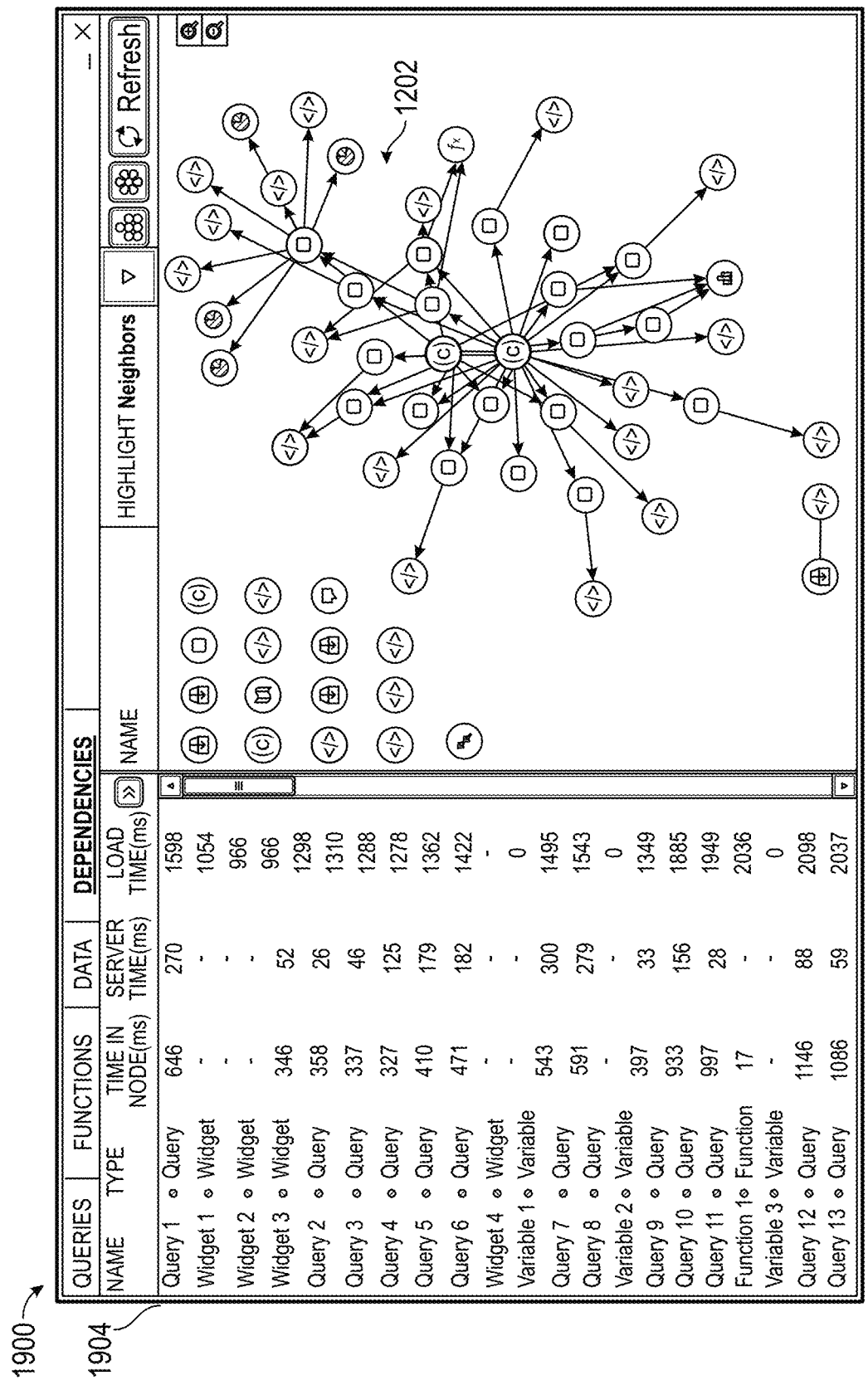
FIG. 19 illustrates one embodiment of a user interface comprising a visual indication of dependencies and a table of execution times.

FIG. 19 illustrates one embodiment of a user interface comprising a visual indication of dependencies and a table of execution times. The user interface shows a dependency page 1900 that shows visualization 1202 of dependencies of queries, functions, variables, and widgets similar to FIG. 12. A timing table 1904 is shown beside the visualization 1202. The timing table 1904 lists the names of the elements shown in the visualization and the type of each element. When a document is loaded, various execution times can be logged and then presented. The timing table lists the time in node for the elements, which includes the time that it took a particular element to load. For example, as shown in FIG. 19, Query 1 took 646 ms to execute. The timing table also lists the server time for a particular element. As part of the 646 ms that it took Query 1 to execute, 270 ms was taken by a server to respond with the data requested by Query 1. The timing table also lists the load time for a particular element. The load time is the total time taken after the document begins loading before an element is completed. For example, Query 1 might not immediately execute when a document is loaded because Query 1 might require other elements to load first due to dependencies. As a result, although Query 1 only took 646 ms to load, it took 1598 ms before Query 1 completed because Query 1 did not start executing during the first 952 ms.

Selecting an element in the timing table 1904 can cause the visualization 1202 to show or highlight the corresponding icon for the selected element, and, in some embodiments, also highlight any dependency chain branches associated with the corresponding icon. The timing table and dependency visualizations can be used in order to quickly identify the elements that take the longest to load and the elements with the longest dependency chains. The table and visualization make it easy to quickly identify the slowest elements.

Figure 20:
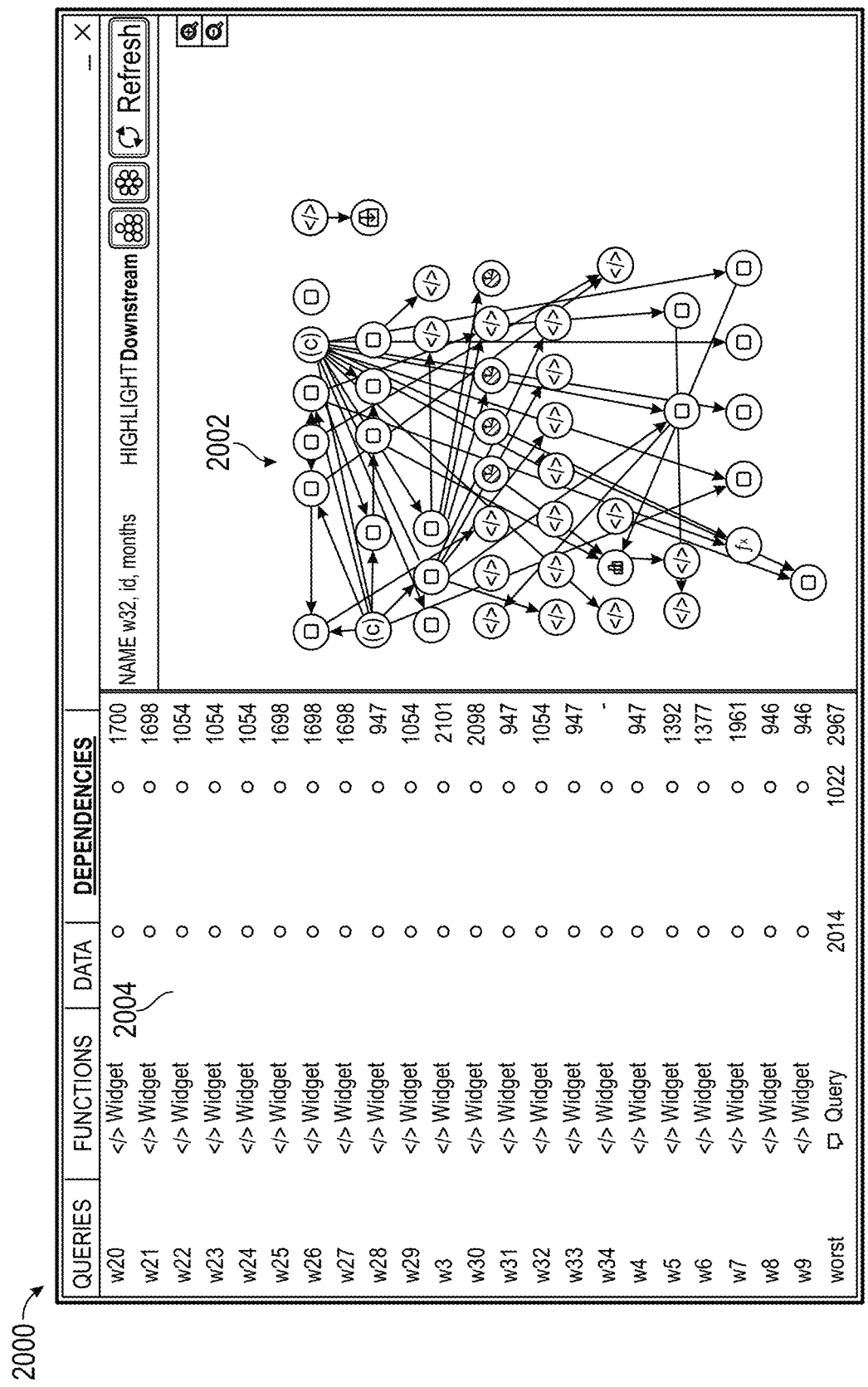
FIG. 20 illustrates one embodiment of a user interface comprising a visual indication of dependencies and a table of execution times.

FIG. 20 illustrates one embodiment of a user interface comprising a visual indication of dependencies and a table of execution times. The user interface shows a dependency page 2000 that shows visualization 2002. Dependency page 2000 shows variations on embodiments of several previously discussed user interfaces. Visualization 2002 shows the dependencies of queries, functions, variables, and widgets similar to visualization 1202 of FIG. 12, but the visualization 2002 is displayed in a hierarchical layout format instead of a web. The timing table 2004 is similar to timing table 1904 of FIG. 19, but the timing table 2004 is rearranged by element name. In some embodiments, the timing table can be arranged to list the elements by speed for any of the time in node, time in server, or load time.

Selecting an element in the timing table 1904 can cause the visualization 1202 to show or highlight the corresponding icon for the selected element, and, in some embodiments, also highlight the dependency chain associated with the corresponding icon. Developers can use the timing table and dependency visualizations in order to quickly identify the elements that take the longest time to load and the elements with the longest dependency chains. The table and visualization make it easy to quickly identify the slowest elements by the highest load time or highest time in node. This can enable certain sections of code be rewritten to remove dependencies or be restructure code so that elements in a document load faster. This can be done, for example, by starting certain slower elements sooner, restricting certain elements to execute in parallel, breaking certain elements into smaller elements, prioritizing the execution of elements from which a lot of other elements depend, etc. To speed up a document completion time, the element with the highest completion time can be coded to execute faster or start executing sooner.

Figure 21:
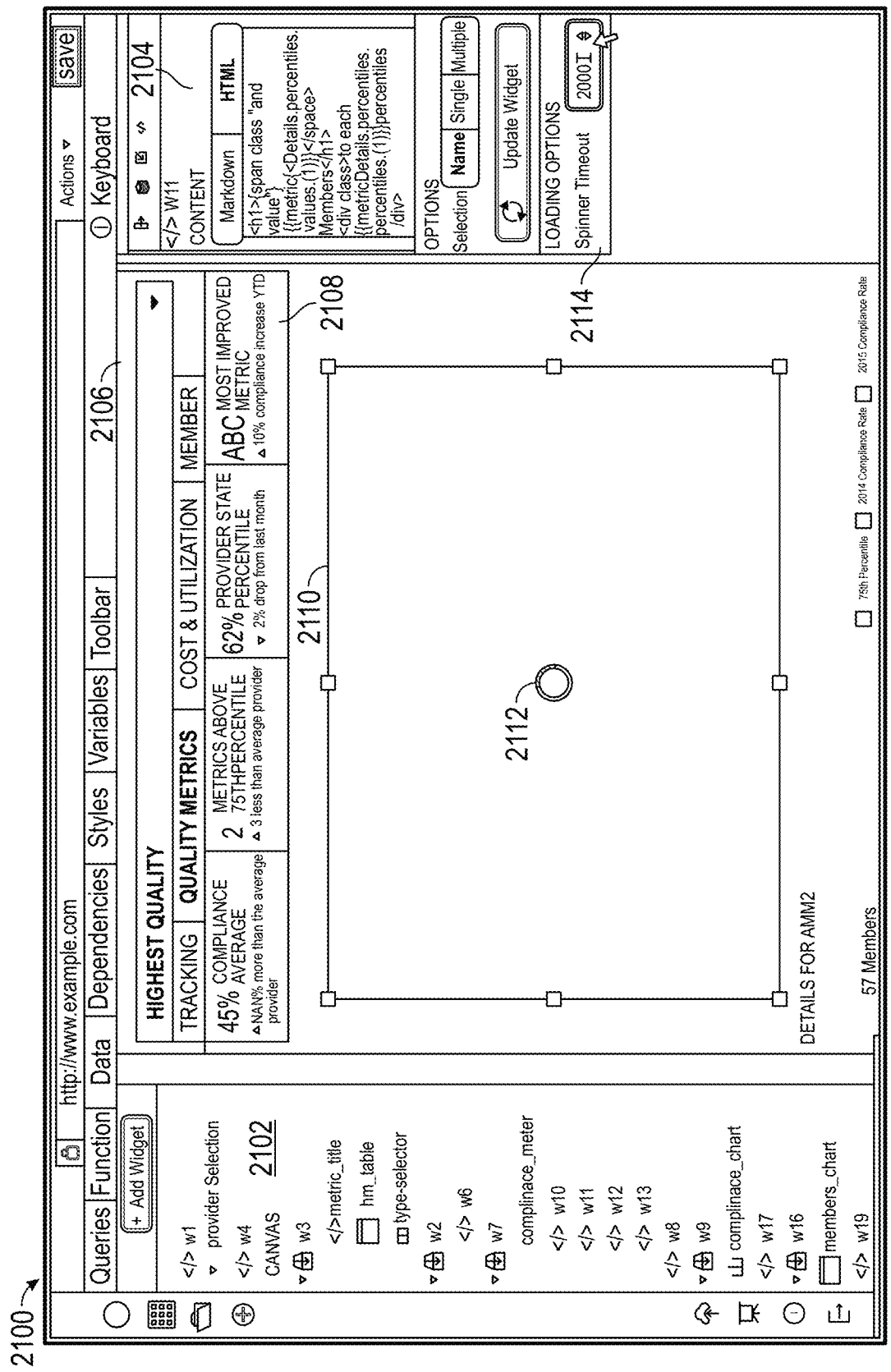
FIG. 21 illustrates one embodiment of a user interface comprising dynamic panels for displaying results of queries performed on one or more data sources with a placeholder visual.

FIG. 21 illustrates one embodiment of a user interface comprising dynamic panels for displaying results of queries performed on one or more data sources with a placeholder visual. User interface 2100 shows a dashboard creation system with tool pages 2102, 2104 and a main page 2106 that includes a plurality of panels such as panel 2108 and panel 2110.

The main page 2106 is being loaded as an end user would see it when trying to access the main page 2106 without tool pages. Some panels, such as 2108, acquire all dependent elements, execute queries, receive query data, and generate an output representation of the queried data. Other panels, such as panel 2110, may still be executing or waiting for dependent data. Because long dependency chains, complex queries, and times for retrieving information from databases can add up to incur significant delays, it can be helpful to indicate in the main page that an element is not finished loading by use of a loading graphic such as loading wheel 2112. Otherwise, without the loading graphic, a blank space might confuse a user into thinking that no panel is present when the panel is actually present but still loading. For the selected panel 2110, a toolbar 2104 shows editable settings such as HTML and Javascript code associated with the panel.

Another toolbar 2114 shows loading options associated with the panel, such as the time (in ms) that the panel can take to complete before a loading graphic appears. For brief amounts of time, no loading graphic might be necessary. In FIG. 21, 2000 ms is selected as the time before the loading graphic appears. In some embodiments, a panel has a default time before the loading graphic appears. In some embodiments, the time before the loading graphic appears can be determined by a computer system based, at least in part, on the timing data collected for a simulated or loaded document. For example, loading times can be set for panels based on the average load time, average time in node, average time in server, an percentage of the max load time, within a few standard deviations of the average load time, or other statistical measurement based on the timing data. In some embodiments, a spinner can be shown when a panel takes an abnormally long time to load. For example, if a panel with a spinner timeout of 2000 ms normally takes 50 ms to load, a spinner can nonetheless load if the panel (perhaps due to querying a database that happens to be busy at the moment) takes 2, 5, or 10 times longer to load. In these instances, the spinner might display at 100 ms, 250 ms, or 1000 ms despite the 2000 ms spinner timeout.

Figure 22:
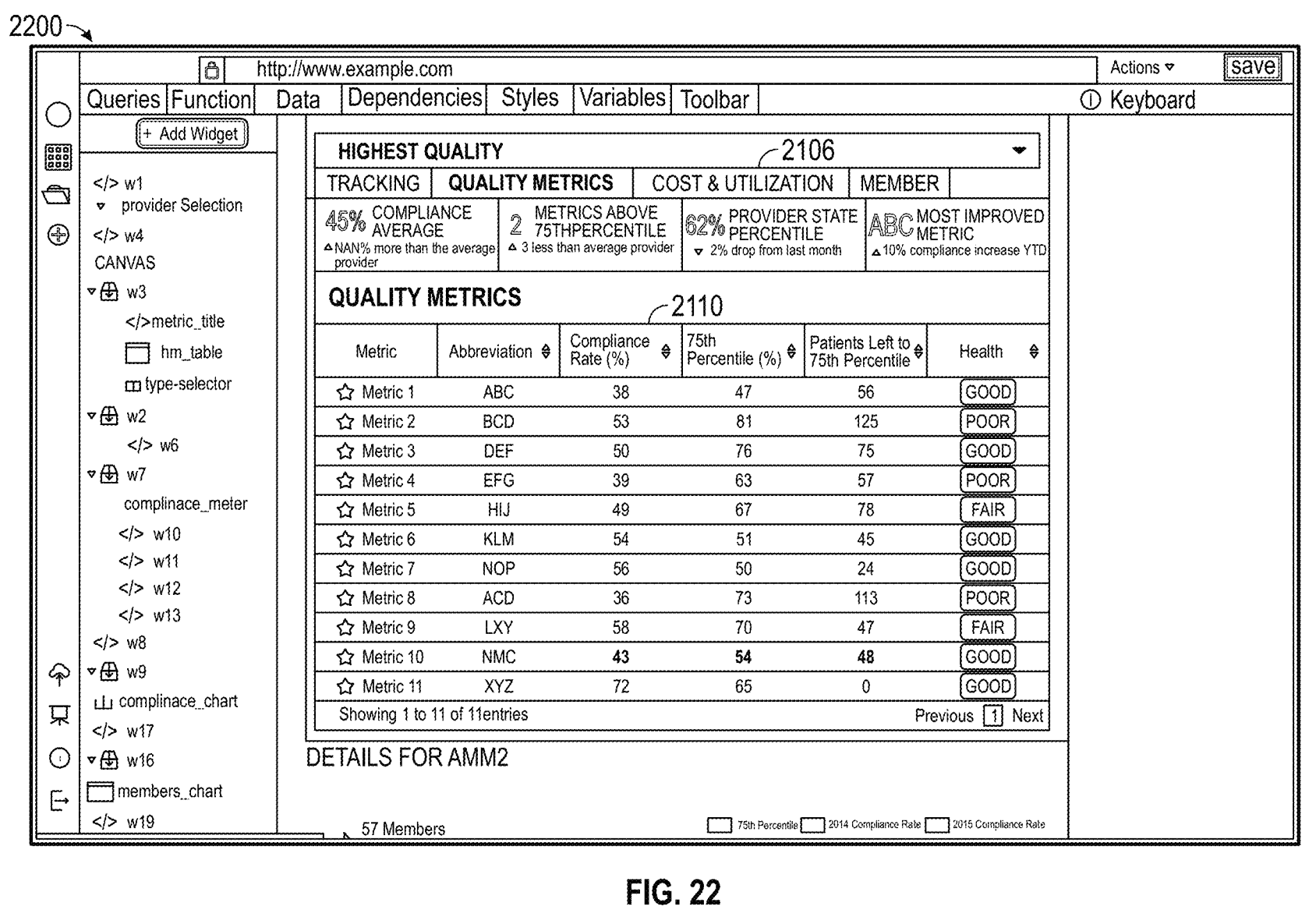

FIG. 22 illustrates one embodiment of a user interface comprising dynamic panels for displaying results of queries performed on one or more data sources. The user interface 2200 shows the same main page 2106 as in FIG. 21, except that in FIG. 22, the panel 2110 has finished loading. In FIG. 22, panel 2110 shows a representation of queried data instead of the loading graphic.

Figure 23:
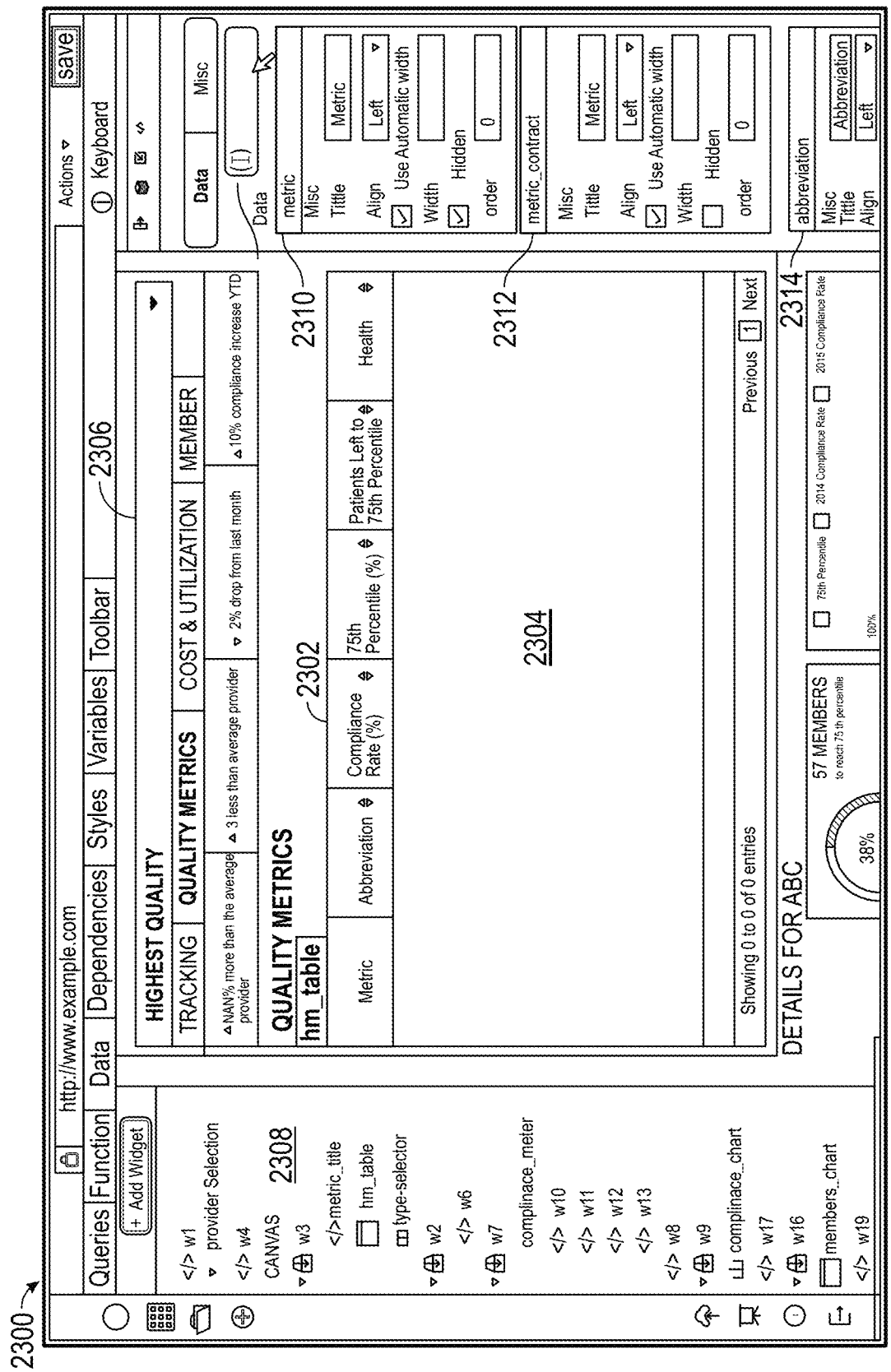
FIG. 23 illustrates one embodiment of a user interface comprising dynamic panels for displaying results of queries performed on one or more data sources while being edited.

FIG. 23 illustrates one embodiment of a user interface comprising dynamic panels for displaying results of queries performed on one or more data sources while being edited. The user interface 2300 shows a main page 2306 that includes panel 2302. Panel 2302 includes an area 2304 for displaying a representation of queried data, but area 2304 can be blank before the queried data is available to the panel 2302. Tool page 2308 includes a list of a number of selectable interface elements. Tool page 2310 includes display formatting options associated with a panel, such as a title, alignment, and width. Tool page 2311 provides a field for data for a selected panel. As data or a data source is entered, the panel associated with the data field will update to render the data. Downstream dependent elements of the panel can also update and refresh as data is entered. The downstream dependent elements can be determined with respect to the stored dependency information. Tool page 2312 includes display formatting options associated with a different panel. Tool page 2314 includes formatting options such as a title and alignment associated with yet another panel.

The timing tools can be used to determine the slowest loading elements. Elements can be selected in the timing tables and their corresponding dependency chains can be viewed, allowing long dependency chains to be identified and restructured. Long loading elements can be indicated to end users by loading graphics. The loading timeouts can be set, adjusted, or automatically populated based on the timing data, and the loading timeouts can be change based on normal and abnormal behaviors.

Example Diff Tools

Figure 24:
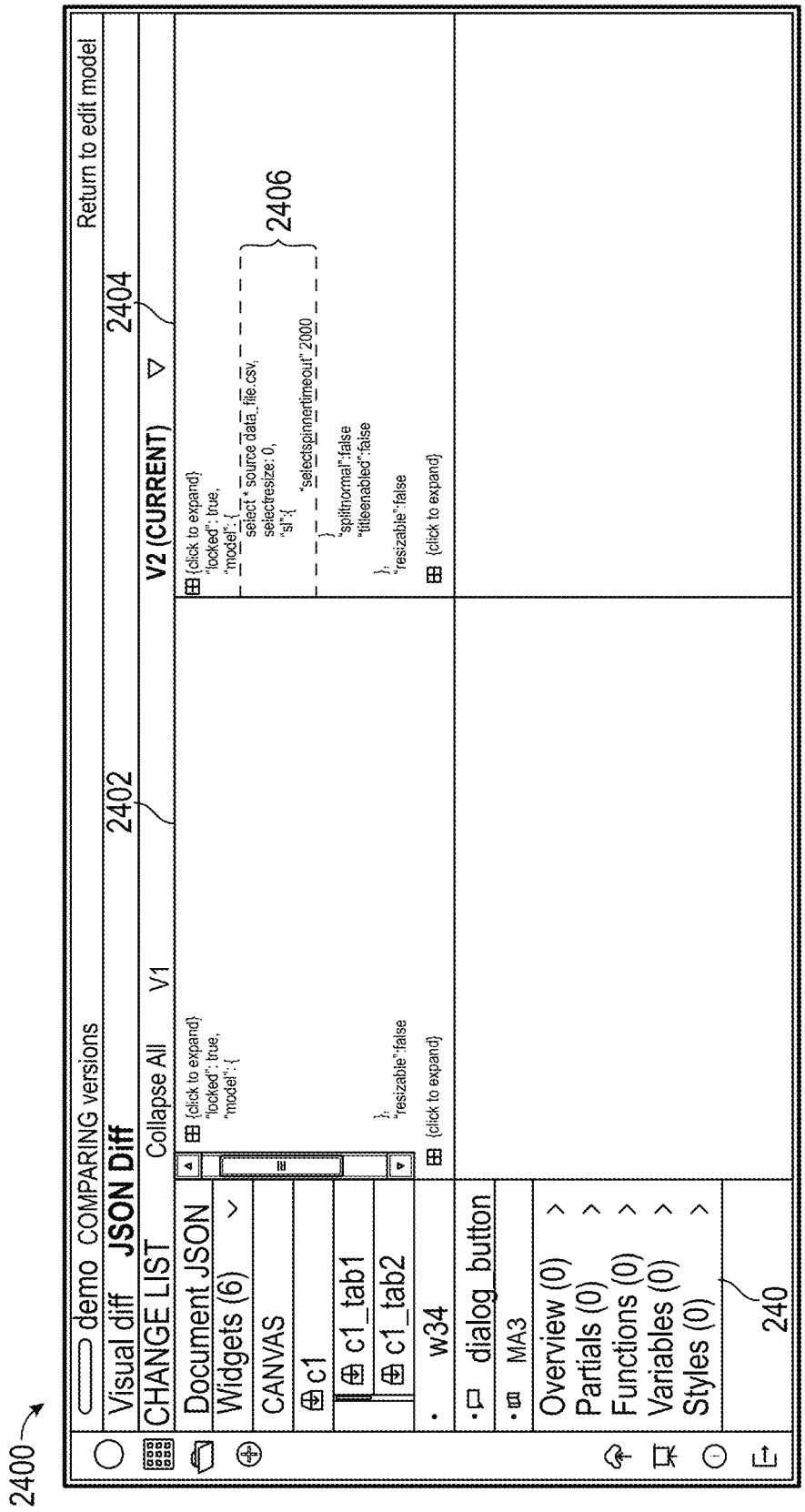
FIG. 24 illustrates one embodiment of a side-by-side difference comparison of query code.
Figure 25:
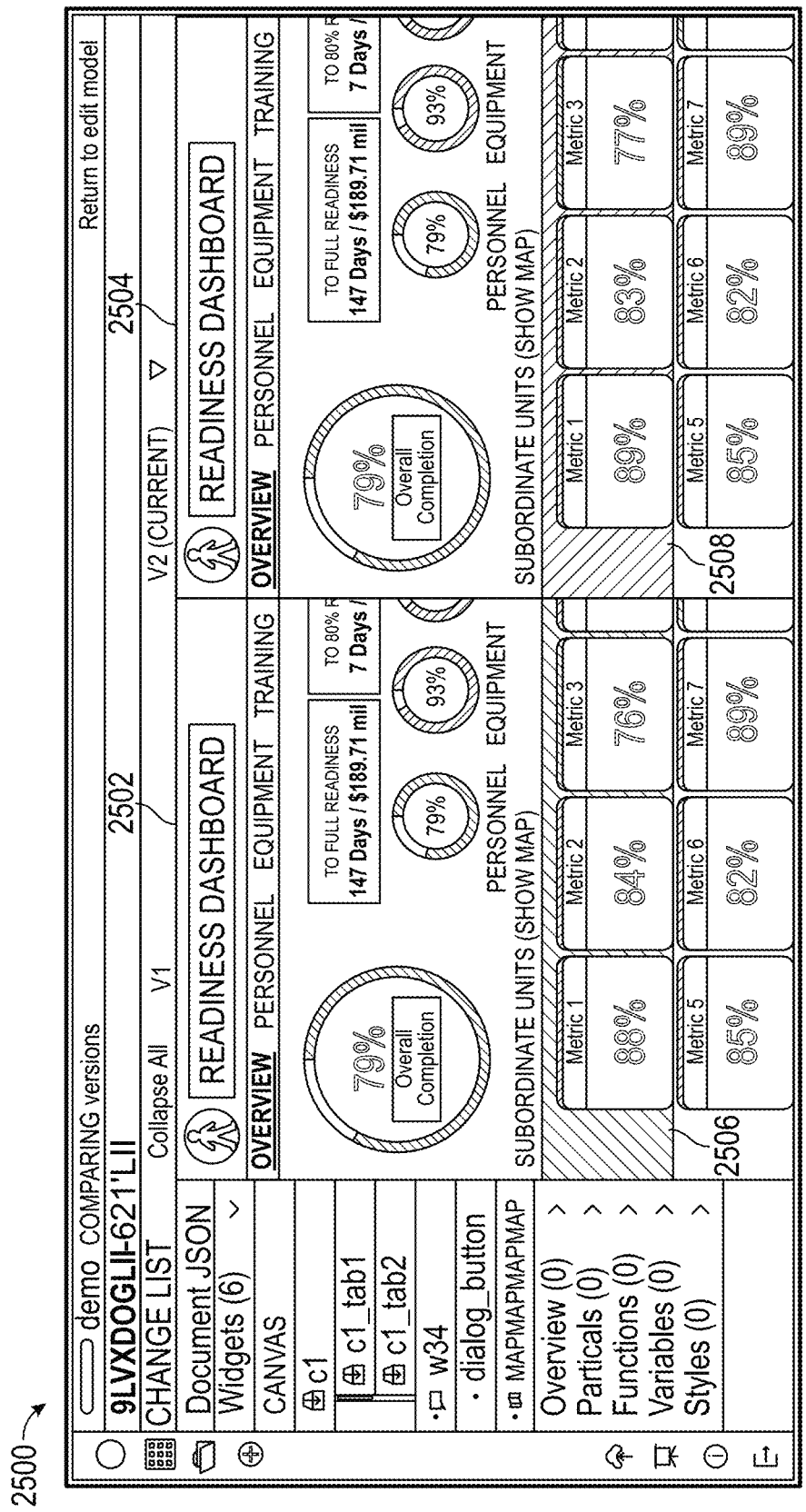
FIG. 25 illustrates one embodiment of a side-by-side difference comparison of a user interface comprising dynamic panels for displaying side-by-side results of different queries performed on one or more data sources.

FIG. 24 illustrates one embodiment of a side-by-side difference comparison of query code. The user interface 2400 shows a side-by-side comparison of two code sections 2402, 2404. The code sections can display query code, JSON code, function code, etc. Code section 2402 can show an original version of code, and code section 2404 can show an updated version of code. A diff script is run to show the differences in the code. The differences between the two version of code are visually indicated 2406. In response to the updated code, the dashboard creation system can also update and show comparisons of the panel outputs affected by the updates to the code. Each code section 2402, 2404 is associated with a version of code. As shown in the example of FIG. 24, code section 2402 is associated with a first version and code section 2404 is associated with a second, more recent version. Different version histories can be selected for comparison in a dropdown menu. The version can be tracked, and the changes in different versions can be approved or checked in. This can be done, for example, by integrating various software versioning or revision history functionality from tools such as Subversion, Revision Control System, Concurrent, Vault, Integrity, git, iManage, etc. A sidebar 2408 provides a number of viewing and organizational tools. At the top of sidebar 2408, an option is provided to view the code diff (shown as JSON diff in FIG. 24) or to view the visual diff (for example, as shown in FIG. 25). A change list can be expanded to display a list of changes for selection, which causes code sections 2402 and 2404 to jump to the line of code relating to the selected change. Widgets and document elements can also be selected to jump to lines of code relating to the widget or document element.

FIG. 25 illustrates one embodiment of a side-by-side difference comparison of a user interface comprising dynamic panels for displaying side-by-side results of different queries performed on one or more data sources. The user interface 2500 shows the WYSIWYG view of user interfaces before and after the code updates described in FIG. 24. Main page 2502 shows the WYSIWYG output based on code section 2402, and main page 2504 shows the WYSIWYG output based on updated code section 2404. Resulting differences in the output can be highlighted or visually indicated as shown by 2506, 2508. Updating the main page outputs can be performed by referencing the stored dependency information to determine dependencies and updating the elements dependent on code changes. Elements not affected by the code changes do not need to be refreshed.

The side-by-side comparisons shown in FIGS. 24 and 25 improve group collaboration when updating code. Sometimes, group members may make branched edits or changes to code. When the branches are being merged, it can be confusing to remember and determine the individual effects of each branched change. The side-by-side comparisons, by showing both the changes in code and then changes in the panel outputs, makes it easier to see the effect of code changes so that groups can determine how to merge in code changes. As highlighted changes are approved or rejected, the panel outputs can correspondingly update to reflect the approvals or rejections.

The diff tools allow for a comparison of different versions of code. Differences in document outputs that result from code differences are also similarly shown. This allows groups to work on different versions of code that can be easily coordinated and merged together. The preview of document changes can be quickly rendered by changing dependent elements instead of refreshing entire documents.

Example Methods

Figure 26:
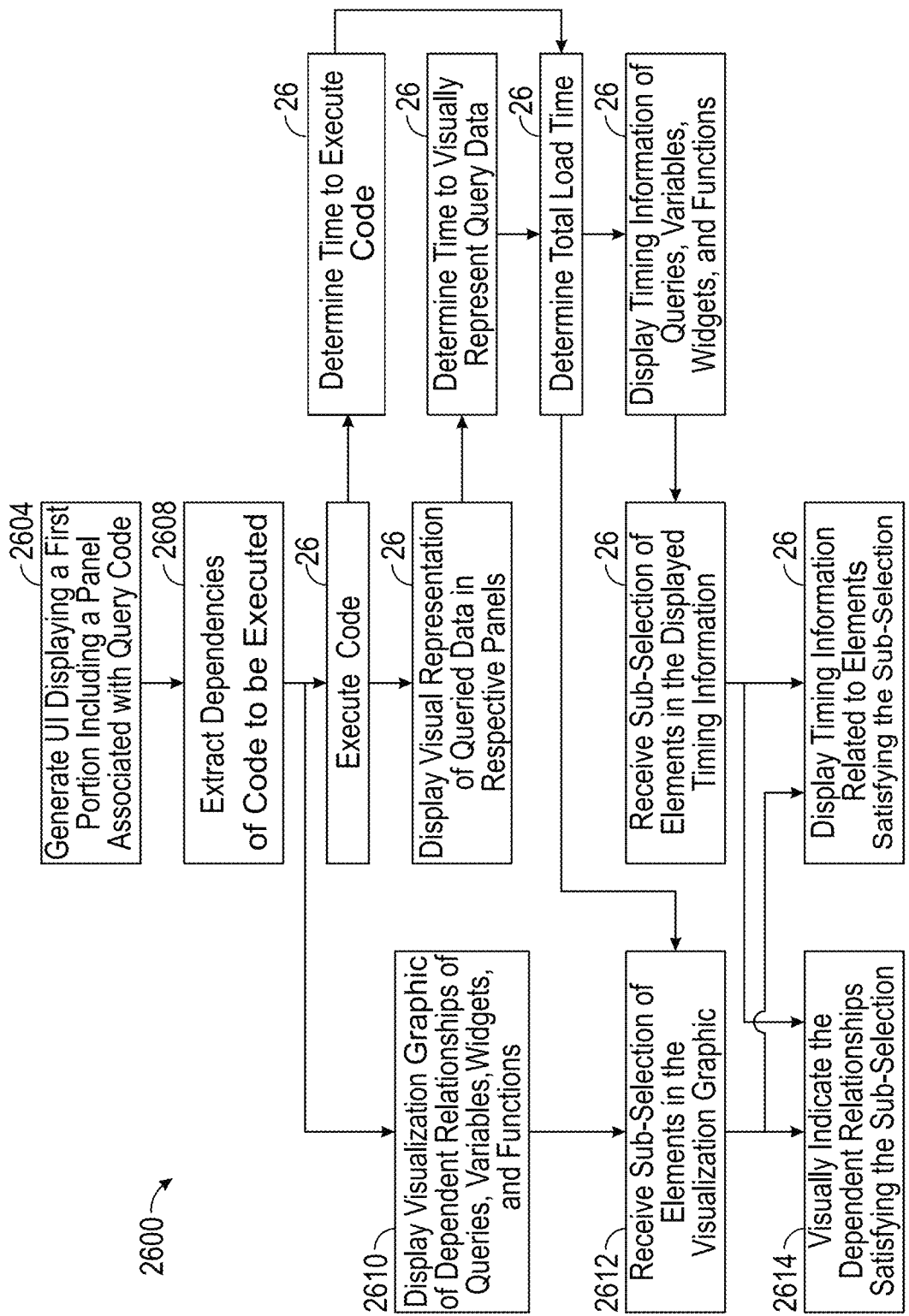
FIG. 26 illustrates a flowchart for creating and displaying a visualization of dependency information and timing data, according to certain embodiments.

FIG. 26 illustrates a flowchart 2600 for creating and displaying a visualization of dependency information and timing data, according to certain embodiments.

At block 2604, a user interface is generated. The user interface displays a first portion that includes a panel associated with query code.

At block 2608, dependencies of code to be executed are extracted. The dependencies can be stored as a hashtable of hashsets. Using the stored dependency information, the dependencies can be determined for queries, variables, widgets, and functions. In some embodiments, for each node (the key node) in the hashtable of hashsets, there are a hash set of nodes that depend on the key node.

At block 2610, a visualization graphic of dependent relationships of queries, variables, widgets, and functions can be displayed. For example, FIGS. 12, 13, 14, 19, and 20 show example visualization graphics.

At block 2612, a sub-selection of elements in the visualization graphic can be received. In some embodiments, icons or arrows in a graphic can be selected by a user. In some embodiments, a sub-selection can be made by selecting a category of elements in the visualization graphic such as neighbors, upstream dependencies, and downstream dependencies.

At block 2614, dependent relationships satisfying the sub-selection made in block 2612 can be visually shown in the visualization graphic. This can be done, for example, by highlighting those relationships that satisfy the sub-selection, or by showing only those relationships.

At block 2616, timing information related to the elements satisfying the sub-selection made in block 2612 can be displayed. In some embodiments where a table of timing elements is presented, the timing information of the elements satisfying the sub-selection made in block 2612 can be highlighted. In some embodiments, the timing information shown in block 2616 is determined, in part, during blocks 2618 to 2626.

At block 2618, code can be executed. In some embodiments, dependent queries, functions, or code can be executed and dependent variables can be defined. In some embodiments, the entire document can be executed instead of just dependent elements.

At block 2620, the execution time of the code can be determined. This measurement is the time in node. The execution time of queries, functions, variable definitions, time in server, and other events depending from the executed code can also be determined. During block 2620, for any action related to a server, the time used by the server can be determined.

At block 2622, a visual representation of queried data in is displayed in respective panels. In some embodiments, this is refreshed for the dependent panels while panels independent of the executed code can but do not need to be refreshed.

At block 2624, the time that it took to visually represent the query data is determined. In some embodiments, this can be the execution time of block 2622.

At block 2626, a total load time is determined for the executed code. In some embodiments, this can be measured from the start of document execution until the code finishes executing. In some embodiments where a first element depends on a second element, the load time for the first element can be calculated by adding the first element's time in node to the load time of the second element's load time. In some embodiments, the load time can be determined for elements depending from the first element as well.

At block 2628, the timing information of queries, variables, widgets, and functions can be displayed. Blocks 2620, 2624, and 2626 can provide information displayed as part of block 2628. The timing information can be used in blocks 2616 and 2628.

At block 2628, the timing information of queries, variables, widgets, and functions can be displayed. For example, the timing information can be displayed in the form of a table as shown in FIG. 19 and FIG. 20.

At block 2630, a sub-selection of elements in the displayed timing information can be received. For example, one or more elements can be selected in a timing table along with a selection of all upstream elements.

At block 2616, timing information can be displayed for the sub-selection made in 2630. In some embodiments, the timing information, if already displayed, can be highlighted.

At block 2614, the visualization graphic can show or highlight the elements satisfying the sub-selection of block 2630.

Figure 27:
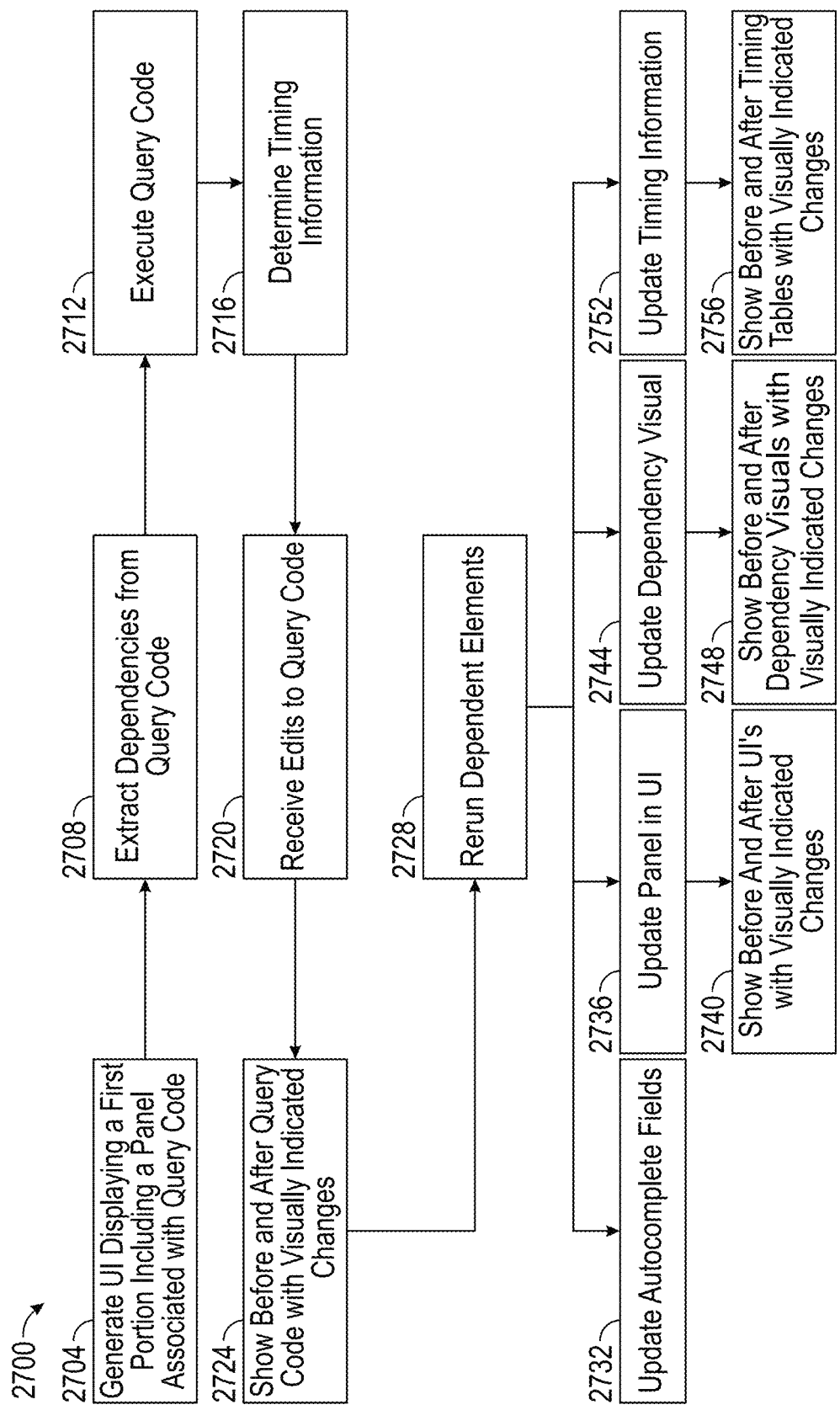
FIG. 27 illustrates a flowchart for creating, updating, and displaying dynamic panels in a user interface, according to certain embodiments.

FIG. 27 illustrates a flowchart 2700 for creating, updating, and displaying dynamic panels in a user interface, according to certain embodiments. Although the example in FIG. 27 relates to query code, it should be understood that the techniques and concepts can apply to any coded element including functions, variables, and panels.

At block 2704, a user interface is generated. The user interface displays a first portion including a panel associated with query code.

At block 2708, dependencies are extracted from the query code, for example, as described with respect to FIG. 12.

At block 2712, the query code is executed. Code dependent on the query code can also be executed.

At block, 2716, timing information relating to the executed code is determined. This can include a time in node, a server time, and a load time.

At block 2720, edits to the query code are received.

At block 2724, code is shown with visually indicated changes to show the query code before and after the edits in block 2720. This can be done, for example, using redline changes, proofreading marks, or as a side-by-side comparison.

At block 2728, the dependent elements can be rerun or executed.

At block 2732, autocomplete fields can be updated. As an example, field 1712 of FIG. 12 can be updated to reflect new elements and their settings. Options in the autocomplete field can be determined based on dependencies and with reference to the stored dependency information.

At block 2736, the panel in the user interface can be updated. The panel's representation of queried data can change after executing the updated query code. In some embodiments, panels dependent on the edits to the query code are updated while panels independent of the query code do not need to be refreshed.

At block 2740, a comparison is shown of user interfaces before and after the panel updates. Changes in panel representations of query data are visually indicated, such as by highlighting.

At block 2744, the dependency visual is updated. The dependency visual can be, for example, the visual indication of dependencies shown in FIGS. 12, 13, 14, 19, and 20.

At block 2748, a comparison is shown of dependency visuals before and after the dependency visual update. Changes in the dependency visuals are visually indicated, such as by highlighting.

At block 2752, timing information can be updated. The timing information can be, for example, timing information shown in FIGS. 19 and 20.

At block 2756, a comparison is shown of timing information before and after the updated timing information. Changes can be visually indicated, such as by highlighting.

Figure 28:
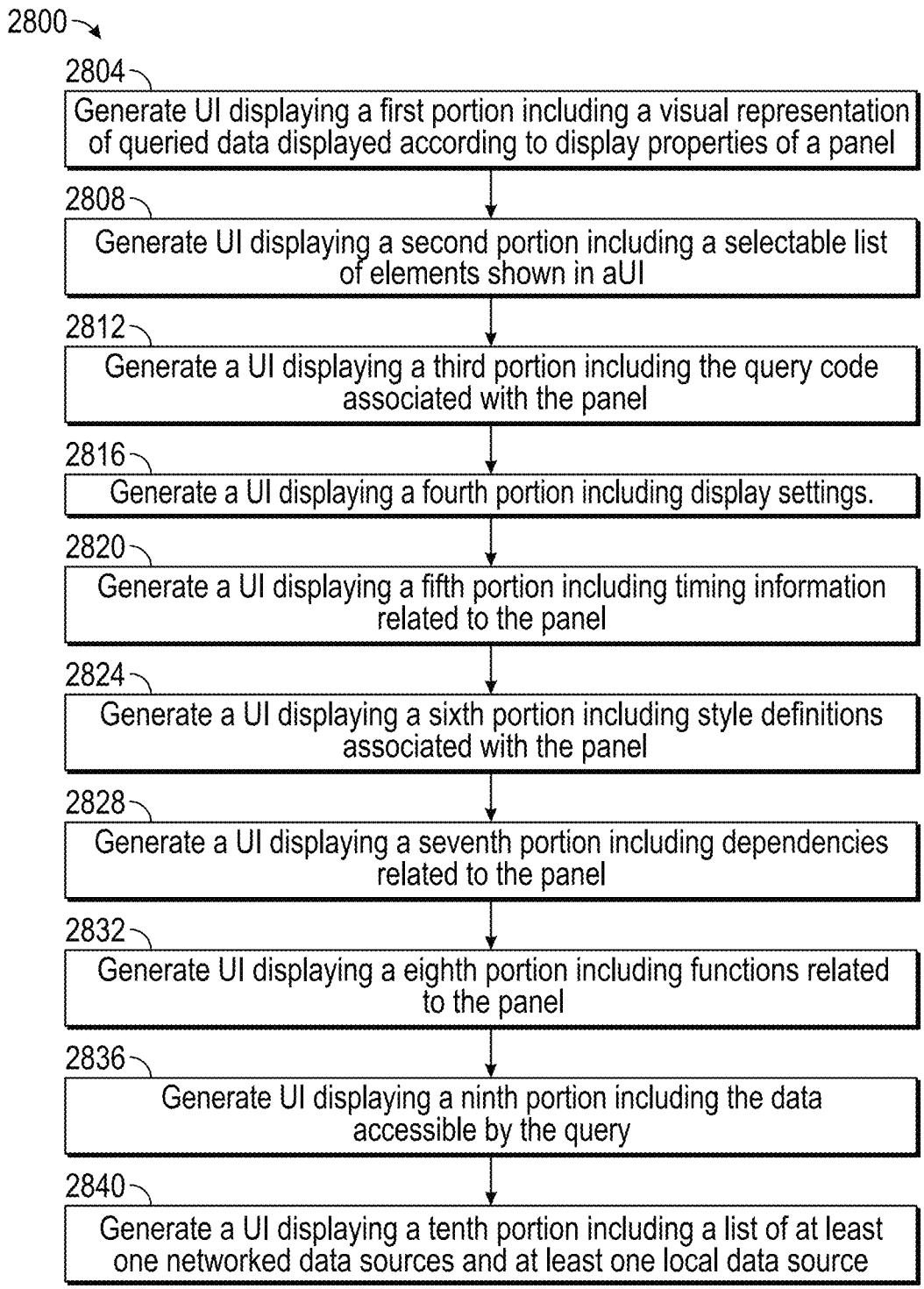
FIG. 28 illustrates a flowchart for creating, updating, and displaying dynamic panels in a user interface, according to certain embodiments.

FIG. 28 illustrates a flowchart 2800 for creating, updating, and displaying dynamic panels in a user interface, according to certain embodiments.

At block 2804, a first user interface is generated. The first user interface displays a first portion including a visual representation of queried data displayed according to display settings of a panel. For example, FIGS. 1, 2, 3, 7, 9, 10, 17, 18, 21, 22, 23, and 25 show user interfaces with portions including visual representations of queried data displayed according to display settings of a panel.

At block 2808, a second user interface is generated. The user interface displays a second portion including a selectable list of elements shown in the first user interface. For example, FIG. 10 shows a second user interface with a selectable list of elements of the user interface in FIG. 9. As another example, FIG. 2 also shows a second user interface with a selectable list of elements of another user interface. As another example, FIG. 22 also shows a second user interface with a selectable list of elements of another user interface. The selectable elements shown in a user interface in can include, for example, queries, widgets, text blocks, HTML structures, etc.

At block 2812, a third user interface is generated. The third user interface displays a third portion including the query code associated with the panel. For example, FIGS. 2, 10, 11, and 24 show query code associated with a panel.

At block 2816, a fourth user interface is generated. The fourth user interface displays a fourth portion including display settings of a panel. The properties can affect how a panel displays queried data. For example, FIGS. 2, 10, 17, 18, 21, and 23 show interfaces including display settings of a panel.

At block 2820, a fifth user interface is generated. The fifth user interface displays a fifth portion including timing information relating to the panel. For example, FIGS. 10, 19, and 20 show timing information related to a panel.

At block 2824, a sixth user interface is generated. The sixth user interface displays a sixth portion including style definitions associated with a panel. The style definitions can include, for example, CSS or custom style definitions. For example, FIGS. 2, 10, and 18 show interfaces including style definitions associated with a panel.

At block 2828, a seventh user interface is generated. The seventh user interface displays a seventh portion including dependencies related to the panel. For example, FIGS. 10, 12, 13, 14, 19, and 20 include portions showing dependencies.

At block 2832, an eighth user interface is generated. The eighth user interface displays an eighth portion including functions related to the panel. For example, FIGS. 10 and 11 show portions including functions.

At block 2836, a ninth user interface is generated. The ninth user interface displays a ninth portion including data accessible by the query associated with the panel. For example, FIGS. 10 and 16 show portions including data accessible by a query.

At block 2840, a tenth user interface is generated. The tenth user interface displays a tenth portion including a list of at least one networked data sources and at least one local data source. For example, FIGS. 10 and 16 show portions listing data sources.

Figure 29:
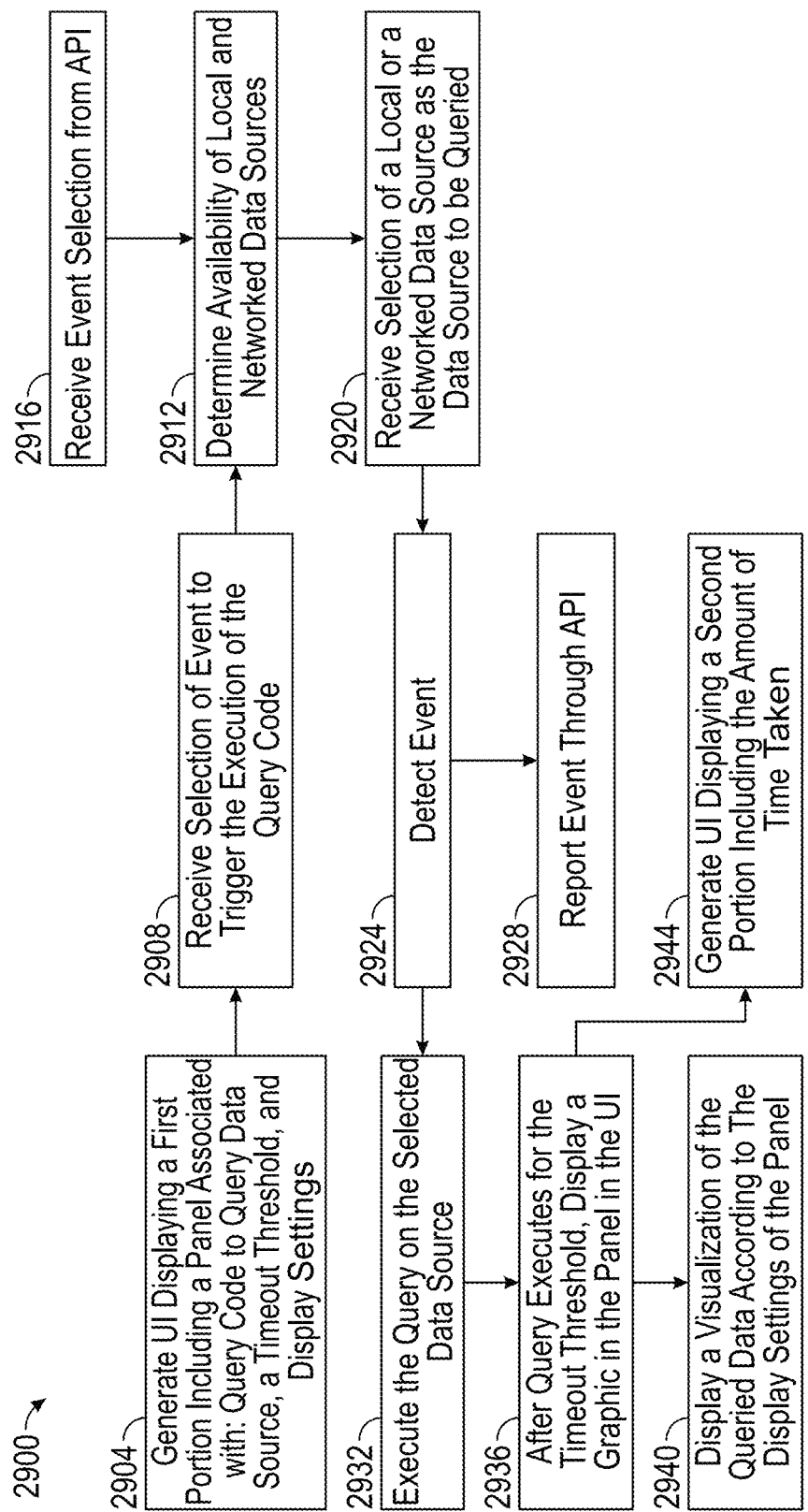
FIG. 29 illustrates a flowchart for creating, triggering, and displaying dynamic panels in a user interface, according to certain embodiments.

FIG. 29 illustrates a flowchart 2900 for creating, triggering, and displaying dynamic panels in a user interface, according to certain embodiments.

At block 2904, a user interface is generated. The user interface can display a first portion that includes a panel. The panel can be associated with query code to query data from a data source such as a database or a local data file. The panel can also be associated with a timeout threshold and display settings.

At block 2908, a selection of an event to trigger the execution of the query code is received. In some embodiments, an event selection can be received through an API in block 2916. The API can be part of a back end Javascript code used for document object model manipulation.

At block 2912, the availability of local and networked data sources is determined. Checking the availability of data sources can include providing authentication credentials to access the data sources. When remote databases might not be accessible, for example due to lack of internet access, due to lack of authentication or privileges, or from being in use, then local data can be provided and used.

At block 2920, a selection of a local or networked data source to be queried is received. This can be a selection, for example, by toggling a button. Alternatively, the selection can be made by changing the names of one or more databases to be queried or by selecting the data source from a list or menu.

At block 2924, an event can be detected. At block 2928, the event can be reported through the API. The event can be the type of event selected in block 2908. By receiving and reporting events through the API, back end document object model manipulation functionality can be brought to the front end. This helps to reduce the technical abilities (e.g., JavaScript coding) required by designers.

At block 2932, the query can execute on the selected data source.

At block 2936, after the query executes for a timeout threshold, a panel in the user interface can display a graphic. The graphic can indicate that the panel is busy executing, but the panel has not completed yet.

At block 2940, a visualization of the queried data can be displayed according to display settings of the panel. When the panel has obtained the data and generated a representation of the data, then the visualization can replace the graphic indicating that the panel is busy.

At block 2944, a user interface can be generated. The user interface can display a second portion including an amount of time taken. The amount of time can be the time to execute the query, the time used by a data source in response to the query, or a load time.

Example Ways to Query Data

A system can be configured in different ways to respond to different formats of data queries. The different configurations can improve the query response speed in different cases. A first format of query can retrieve a dataset more quickly from a data store for some datasets. A second format of query can retrieve datasets more quickly from a cache database other datasets. For example, for fewer numbers of queries on smaller datasets, the system may respond faster if the system is configured to provide the dataset from a data store in response to queries of a first query format (e.g., SparkSQL). For larger numbers of queries on larger datasets, the system may respond faster if the system is configured to provide the dataset from a cache database in response to queries of a second query format (e.g., PostgreSQL). In some embodiments, when making fewer numbers of queries that edit smaller datasets located on a data source, the system may respond faster if the system is configured to written back the edits via an API such that the edited data can be reflected without synchronization. In some embodiments, when making larger numbers of queries in a second format that concurrently edit larger datasets, the system can respond faster if the system is configured to edit the dataset using a cache database in response to queries of the second format.

The system can have a first response to a query in first format of (e.g., a SparkSQL query) to retrieve a dataset from a first database such as a data store. The data store, in response to receiving the first format of query, can process the first format of query and provide the queried dataset to the user. This can include, using one or more application programming interfaces (APIs) such as JDBC to handle the query by acting as a translation layer for the data sources to format the query data, checking permissions for the dataset according to an access control list (ACL), retrieving the dataset from a data store, and then providing the queried data back to the user.

The system can have a second response to a query in a second format (e.g., PostgreSQL). The second format of query is provided to a cache database that can be different from the data store. For example, the cache database can be, for example, a PostgreSQL database. The cache database provides the dataset in response to the second format of query.

The cache database can be created and used as a "hot cache" for datasets queried by the user. The datasets in the cache database can be a duplicate of datasets from the data store, including permissions for the data. The cache database can be used in addition to the data store, instead of the data store, and/or be formed as a part of the data store. In some embodiments, the cache database can be implemented as separate service and separate storage that sits on a different physical or virtual machine/server than the data store. In some embodiments, the cache database can be created through a software implementation. In some environments, the cache databases can have its own host that is configured to communicate with a dashboard creation system.

A synchronizer causes the datasets in the cache database to synchronize with the datasets in the data store. A browser also allows users to browse ACL permissioned datasets that is available in the data store and in the cache database. The user can also see the synchronization status of the datasets and manually perform synchronizations. The synchronizer can provide a synchronization status of datasets in a query.

In some embodiments, the WYSIWYG editor provides panels that use one format of query as a default format (e.g., a PosgtgreSQL format) that will query the cache database. However, programmdoers of sufficient skill level can write custom queries of another format (e.g., a SparkSQL query, or a parameterized query that prevents SQL injection) that will query the data store. This way, a default query can be easily used, even by developers of lower computer programming skill. However, more highly skilled computer programmers familiar have the ability to run custom queries that can be in any format of query, depending on the judgement of the highly skilled computer programmer, for faster response speeds. In some embodiments, a default format can be automatically determined by the WYSIWYG editor based on an availability of a cached dataset that is being queried (e.g., format the query for the cache if the dataset is available in the cache), or based on speed (e.g., format the query for whichever response will return the dataset faster).

Example First Query Format and Access to Data Source

Figure 30:
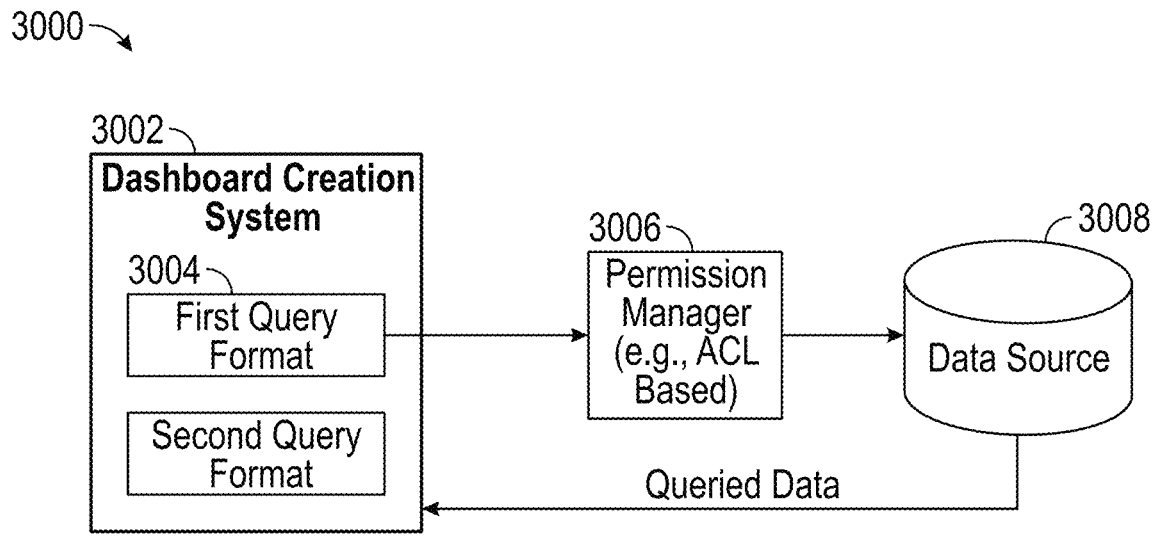
FIG. 30 is a data flow diagram illustrative of an interaction between a dashboard creation system and a data store, according to one embodiment.

FIG. 30 is a data flow diagram 3000 illustrative of an interaction between a dashboard creation system and a data store, according to one embodiment. FIG. 30 shows a dashboard creation system 3002, a query of a first query format 3004, a permission manager 3006, and a data source 3008.

The dashboard content creation system 3002 can be, for example, a dashboard content creation system such as described with respect to FIG. 3 and FIG. 4.

The dashboard content creation system 3002 can be used to generate a query of a first query format. The first query format can be any format that is different than the second query format. For example, in some embodiments, the first query format can be SparkSQL or a parameterized query of any query language. Parameterized queries are discussed above. The second query format can be, for example, PostgreSQL.

The permission manager 3006 can check if a user is authorized to access the queried data. This can include determining the read/write access permissions of the queried data from an access control list (ACL). The ACL can manage permissions at one or more levels such as a data source level, a document level, a group level, an individual level, etc. Accordingly, the permission manager can provide fine grain access control of data. Query requests sent through the permission manager 3006 to a data source 3008 can be checked by the permission manager 3006 for appropriate permissions. In some embodiments, when a query is directly sent to the data source 3008, then user tokens can be provided in an API call to the data source 3008. In some embodiments, updates to the data source 3008 can automatically cause an update to be provided to the permission manager 3006 to keep permissions synchronized.

The query with the first query format (e.g., SparkSQL) can be an API call to a data proxy of the data source 3008. The queried data is then provided to the dashboard creation system 3002.

Queries made in the first query format can have better performance for some tasks than other tasks. For example, the first query format might have lower performance when querying for large amounts of data and higher performance when querying for small amounts of data. As another example, the first query format might have lower performance when a large number of queries are made in rapid succession and better performance when the queries are spread out over time or a smaller number of queries are made in succession. This can occur if the data source uses a data proxy and framework engine configured for large-scale data computations (such as Spark, MapReduce, etc.) and can be caused, at least partially, by initial overhead times for transactions. The initial overhead times may be relatively small for large scale data computations but can add significant delays to processing multiple, smaller data transactions.

Example Second Query Format and Access to Cache Database

Figure 31:
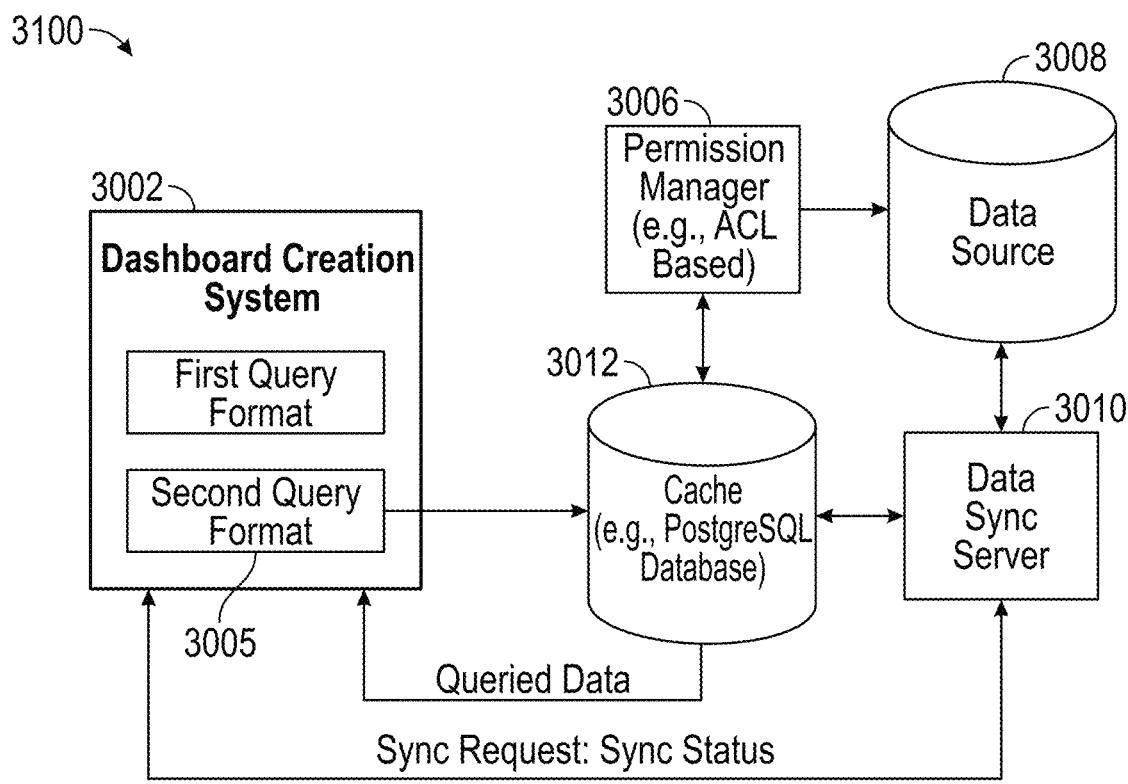
FIG. 31 is a data flow diagram illustrative of an interaction between a dashboard creation system and a network system, according to one embodiment.

FIG. 31 is a data flow diagram 3100 illustrative of an interaction between a dashboard creation system and a network system, according to one embodiment. FIG. 31 shows a dashboard creation system 3002, a query of a second query format 3005, a permission manager 3006, a data source 3008, a data synchronization server 3010, and a cache 3012.

The dashboard content creation system 3002, permission manager 3006, and data source 3008 can be similar to those described with respect to FIG. 30.

The dashboard content creation system 3002 can be used to generate a query of a second query format 3005. The first query format can be any format that is different than the second query format. Query formats can include, for example, SparkSQL, a parameterized query of any query language, PostgreSQL, etc. In some embodiments, PostgreSQL queries can be processed by a template system (e.g., Handlebar) when accessing the data source 3008 using a single access account system. In some embodiments, SparkSQL queries can be provided to the permission manager 3006 without processing by the template system, and security can be provided through a multipass access account system. In some embodiments, PostgreSQL queries can be provided to the cache database without processing by the template system, and the cache database can check with the permission manager 3006 for query calls.

The data synchronization server 3010 synchronizes the data source with any caches 3012. The data synchronization server 3010 can receive synchronization requests from the dashboard creation system 3002. The synchronization requests can specify what datasets in the data source 3008 should be synchronized with the cache 3012. The synchronization can be one way (e.g., data source to cache), one way in the other direction (e.g., cache to data source), and/or bi-directional. In response to the synchronization request to cache a dataset, the data synchronization server 3010 can cause a dataset to be copied into cache 3012 so that the dashboard creation system queries for the dataset can hit in the cache 3012. Other synchronization requests can include, for example, synchronizing the data source 3008 with a more recent version of a dataset in the cache 3012. The data synchronization server can log the status of synchronization events, including what dataset was synchronized between which data sources, and whether or not the synchronization was successful.

The dashboard creation system 3002 can send synchronization status inquiry requests to the data synchronization server 3010 to inquire about the synchronization of datasets between the data source 3008 and the cache 3012. In response to the synchronization status inquiry, the data synchronization server 3010 can provide the dashboard creation system 3002 information about which datasets are synchronized. The information can be shown, for example, as further discussed below with respect to FIGS. 32-34.

A cache 3012 can be implemented in external data sources that are separate from the data source 3008. For example, the cache 3012 can be a PostgreSQL database. In some embodiments, a cache 3012 can be stored in a new data source that has lower communication latency with the dashboard creation system 3002 than the communication latency between the dashboard creation system 3002 and the data source 3008. The cache can be in a different server and/or different data storage devices from the data source. In some embodiments, different caches 3012 can be used to store different datasets that are requested by different users. The cache is 3012 is a remote network location from the end user's (e.g., a document developer's) personal computer.

The permission manager 3006 can extend the permissions of the datasets in the data source 3008 to datasets in the cache 3012. The permission manager can make the permissions and/or an ACL of the dataset in the cache 3012 the same as the permissions and/or ACL of the dataset in the data source 3008.

The query with the second query format (e.g., PostgreSQL) can be sent to the cache. The cache (e.g., a PostgreSQL database) can determine if the query is authorized to access the dataset (e.g., based on an ACL) and, if so, provide the queried data to the dashboard creation system.

Queries made with the second query format to the cache can have better performance for some tasks than other tasks. For example, the second query format to the cache might have higher performance when querying for large amounts of data (e.g., over 10,000 rows) and lower performance when querying for small amounts of data. As another example, the second query format to the cache might have higher performance when a large number of queries are made in rapid succession and lower performance when the queries are spread out over time or a smaller number of queries are made in succession.

Example Synchronization Interface

Figure 32:
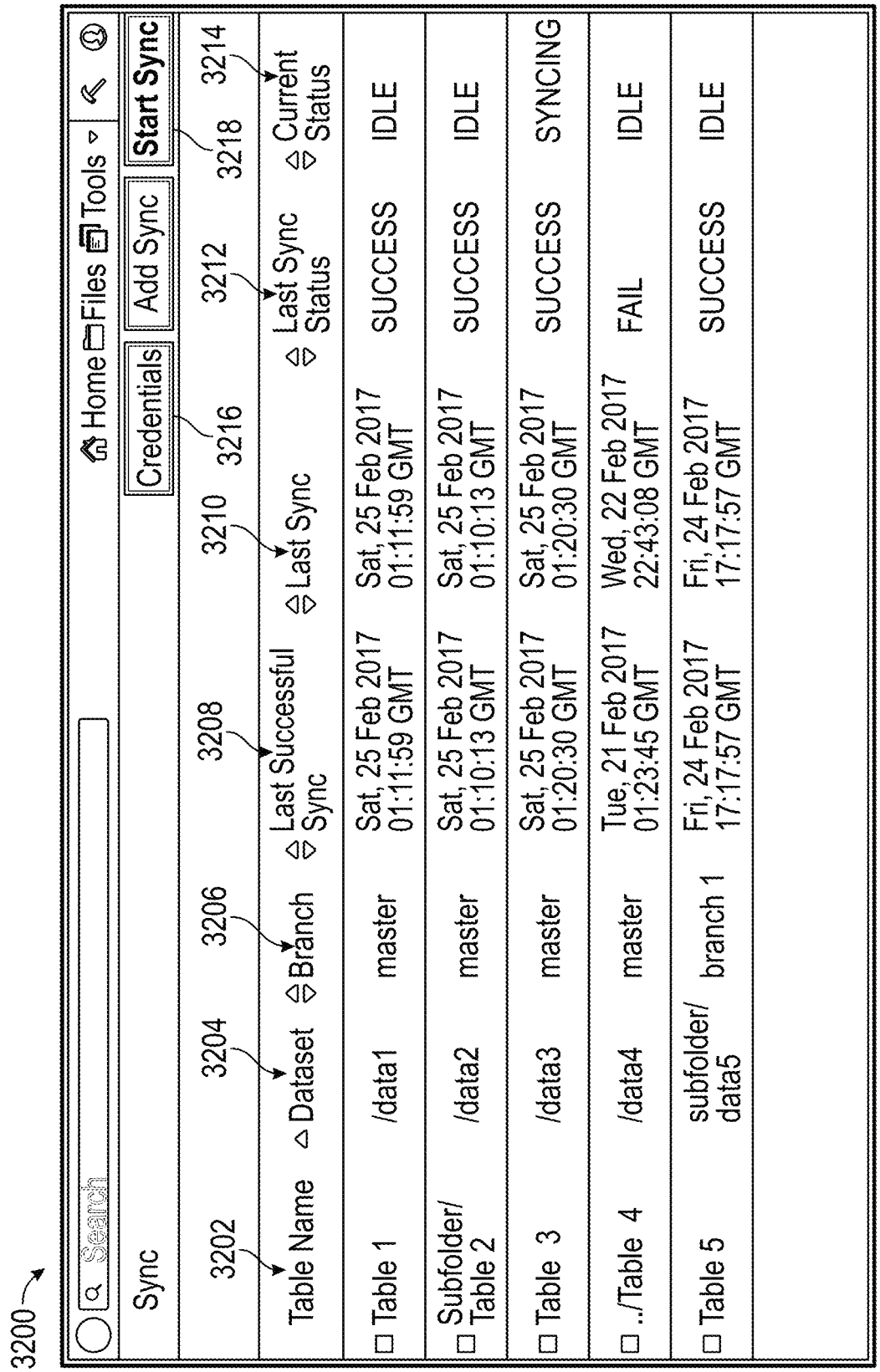
FIG. 32 illustrates one example of a user interface for displaying the synchronization status of datasets.

FIG. 32 illustrates one example of a user interface 3200 for displaying the synchronization status of datasets. The user interface includes a first column 3202 listing table names, a second column 3204 listing dataset locations, a third column 3206 listing version branches, a fourth column 3208 listing a last successful synchronization, a fifth column 3210 listing a last synchronization event, a sixth column 3212 listing a last synchronization status, a seventh column 3214 listing a current status, a credentials button 3216, and a start synchronization button 3218.

In some embodiments, a user can click the credentials button 3216 to enter in credentials (e.g., a username and password, a key). The user credentials can be used in order to determine what a user has permission to access. For example, the dashboard creation application (such as 3002 in FIG. 31) can request, from a cache (such as cache 3012 in FIG. 31) information about everything that a user has permission to access. The cache can, after verifying permissions, provide the requested information. The information can be presented through the user interface 3200. In some embodiments, users can be given access to synchronize at a dataset level.

The first column 3202 lists data tables by name and can include a path. The data tables can be data tables in a cache that a particular user has permission to access.

The second column 3204 lists datasets by name and can include a path. The datasets can be datasets in a cache (such as cache 3012 in FIG. 31) that a particular user has permission to access.

The third column 3206 lists a branch version. In some embodiments where revision control is implemented, the branch, revision, or version of the dataset can be indicated. In some embodiments, the version can be tracked with a date and/or timestamp.

A fourth column 3208 lists a last successful synchronization time that the dataset synchronized with the data source (e.g., data source 3008 in FIG. 31).

A fifth column 3210 lists a last synchronization event where synchronization between a cache and a data source was attempted.

A sixth column 3212 lists a last synchronization status, which can indicate if the last synchronization event was successful, failed, had a specific error, completed partially, etc.

A seventh column 3214 lists a current status 3214. The current status can indicate, for example, if the dataset is being synchronized, being read, being written, having permissions checked or updated, idle, etc.

A start synchronization button 3218 can be selected in order to start a synchronization event. A user can select one or more datasets or data tables. An interaction with the start synchronization button 3218 can cause a synchronization request to be generated by the dashboard creation system and communicated to the data synchronization server (such as data synchronization server 3010 of FIG. 31). The data synchronization server can communicate the synchronization status and logs of synchronization status to the dashboard creation system for display in the user interface 3200. Some data, such as the accessible tables and datasets, can be communicated by the cache and/or the permission manager.

In some embodiments, modifications to datasets through the dashboard creation system, in the cache, and/or in the data source can be automatically synchronized across all locations. The data synchronization server can track the modifications and cause any stale repositories to synchronize.

In some embodiments, the synchronization can be manually requested. This can happen, for example, when a user wants to ensure the latest dataset is accessible. A manual request can also be made when a new dataset is made available in a data source and not yet cached anywhere in order to cause the new dataset to be cached. A manual request can also be made, for example, when a first user creates a dataset and wants the dataset to be quickly available to others. A manual request can also be made in order to cause downstream dependent datasets to synchronize when a modification is made to an upstream dataset. A manual request can also be made in order to synchronize downstream dependent data that may have been affected by changes in upstream data. A synchronization request can also be programmed or scheduled by a user. For example, a user can start an application that will take a long time to execute and build or modify datasets, and then schedule a synchronization event after the application completes.

FIG. 33 illustrates one example of a user interface 3300 for displaying the synchronization options for datasets. The synchronization options can be shown in response to a user interaction with the start synchronization button 3218 for one or more selected datasets.

A first interface 3302 can display cache destinations that the selected dataset can be synchronized in. The first interface can also show a synchronization status for each cache destination, including whether a synchronization is in progress, when a synchronization was last attempted, if the last attempt failed, whether the data is synchronized and/or available at the cache destination, further synchronization details, etc. An option can be provided to enable access for synchronizing a dataset in a cache destination. Although the user interface 3200 shows cache destinations that a dataset is available in, some embodiments can alternatively or additionally show users, projects, groups, documents, dashboard creation systems, etc. that can have access to a dataset.

Selecting the option to enable access for synchronizing a selected dataset with a cache destination can cause a second interface 3304 to display. The second interface can provide a confirmation of intent to synchronize the selected dataset in the cache destination.

A third interface 3306 can indicate an updated status of the cache destinations, such as by indicating that the selected dataset is currently being synchronized with a cache destination.

Once the synchronization completes, a fourth interface 3308 can update to show when the synchronization event completed for each cache destination and/or any other synchronization status indicators.

Example Interfaces Showing Datasets

Figure 34:
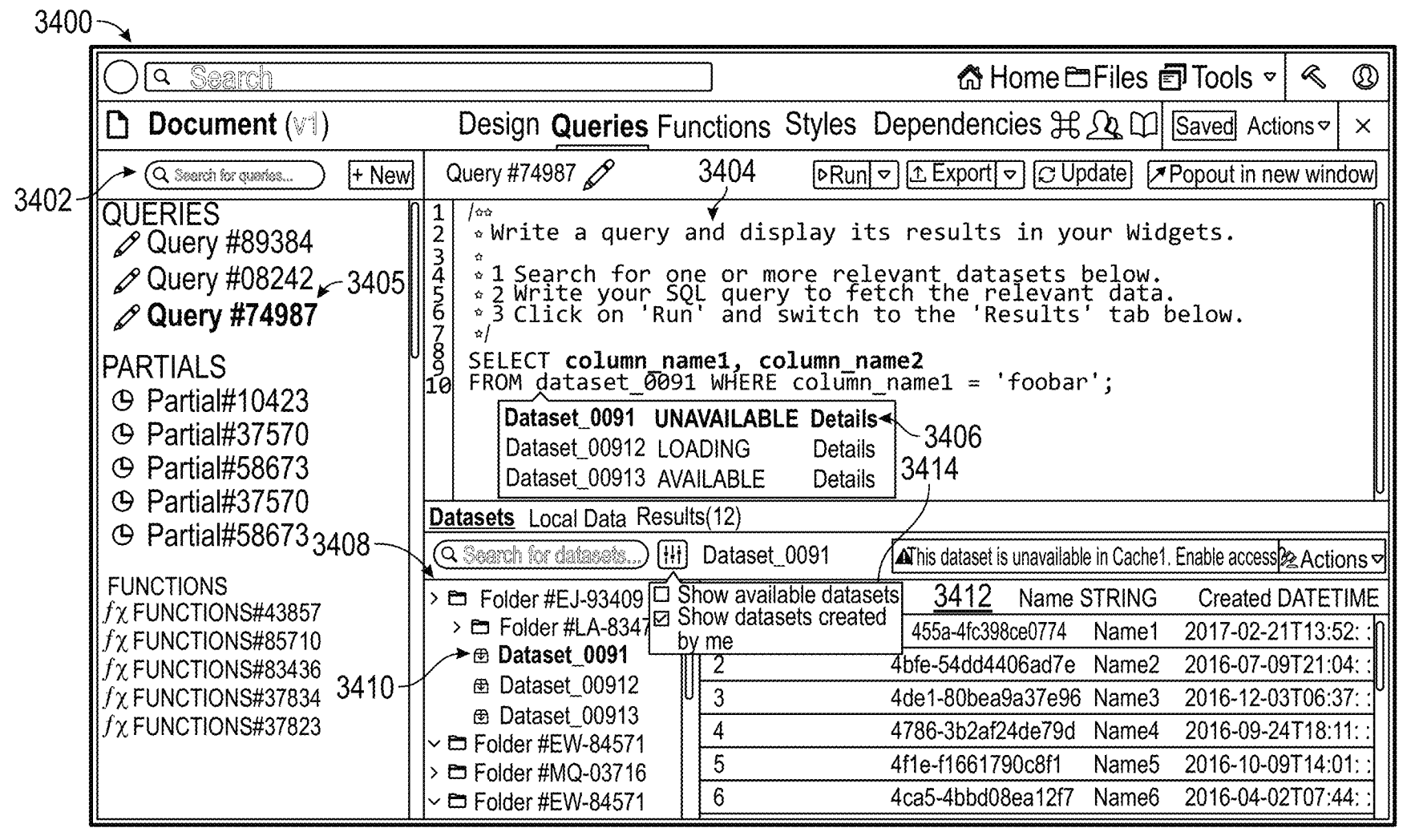

FIG. 34 illustrates one example of a user interface 3400 for displaying datasets. FIG. 34 shows section 3402, code section 3404, selected query 3405, dataset helper menu 3406, section 3408, selected dataset 3410, section 3412, and filter menu 3414.

Section 3402 on the left side of the user interface 3400 can list queries, partials, and functions. Status symbols, such as those shown in FIG. 35, can indicate a status of a query, partial, or function such as if a query is executing, if the code has errors, etc. In section 3402, a user can select, from the list, a query, partial, or function. A selected query 3405 can be highlighted or indicated as selected in response to a user selection. A search menu in section 3402 allows a user to search for queries, partials, and functions by name.

The code of the selected query 3405 can be shown in code section 3404 of the user interface. The code section 3404 can use syntax tools to assist with coding. Code section 3404 can also include comments with helpful instructions for writing the type of code selected. The comments can be different for queries, partials, and functions. If a query does not already include comments with instructions, then the comments with instructions can be automatically generated and added to the query so that a developer can see the comments. In the code section 3404, a query can be written in any format. For example a query can be written in as a PostgreSQL query or a SparkSQL query. The query can be a parameterized query as discussed above.

A dataset helper menu 3406 can be displayed. The dataset helper menu can suggest correct spellings of datasets, auto-complete spellings of datasets, indicate the status of datasets and provide an option to display details of the dataset, such as in section 3412. The status of a dataset can include for example, an availability of a dataset in a cache (e.g., available, unavailable due to permission reasons, unavailable in a cache due to a cache miss but available in a data source, unavailable for other reasons) or whether the dataset currently syncing or loading into the cache. In various embodiments, unavailability for different reasons can be indicated differently. The autocomplete feature can similarly be used when suggesting names of datasets for panel queries. The dataset helper menu 3406 can be displayed, for example, when a user hovers over a dataset name. The dataset helper menu can also be displayed automatically when the name of a dataset does not match any available dataset. This can help a developer correct a misspelling, find an available dataset, or know that permissions to access the dataset are lacking. The datasets shown in the dataset helper menu 3406 can be selected to insert the selected dataset in to the query code, which can be inserted as an auto-correct or auto-complete the current query code.

Section 3408 can list datasets that a user has permission to access. A status indicator can indicate the status of the dataset. The datasets can be listed by name and organized in a hierarchy or file structure. A search menu allows for datasets to be searched for by name. The search function can search for all datasets in any networked cache or data store that a user has access to. In some embodiments when a search is performed, a permission manager such as permission manager 3006 of FIG. 31 may process the search according to an ACL and return search results that exclude datasets for which the searcher has insufficient permissions. In section 3408, a selected dataset 3410 can be indicated. The selection of a dataset can be made, for example, by clicking on the dataset in section 3408, by clicking on a dataset in section 3404, or by clicking on a dataset in dataset helper menu 3406. Section 3408 can also indicate a synchronization status of the datasets in the list. The indicators can include icons (e.g., colored icons, an "X," a checkmark) that indicate a synchronization status of the dataset in a cache. The synchronization status indicators in section 3408 can be the same or different indicators from the indicators in the dataset helper menu 3406.

In some embodiments, section 3408 lists the fastest accessible dataset. In some embodiments, section 3408 can list all copies of a dataset and include the cache and/or data store that the dataset is located in.

In some embodiments, the lists of datasets shown in the dataset helper menu 3406 and/or section 3408 can be automatically determined by the dashboard creation system. The dashboard creation system can send out an inquiry requesting information about what datasets are available and what the synchronization status is of those datasets. The inquiry can be sent, for example, to a data synchronization server. In some embodiments, the dashboard creation system can send an inquiry request to a cache to determine what datasets are available in the cache. The inquiry requests can include credentials. Based on the response of data synchronization server and/or cache, the dashboard creation system can display the list of datasets and the statuses of those datasets.

Section 3412 can display data included in the selected dataset 3410. The dataset can be retrieved from a networked cache, such as cache 3012 in FIG. 31, or from a data source, such as data source 3008 in FIG. 31. Selecting a dataset can cause a query to retrieve the dataset and be displayed in section 3412.

A filter menu 3414 can display filter options to limit the datasets that are shown. Filter options can include, for example, filtering datasets created by a particular user, synchronized at a cache, available for particular projects, have certain ACL authorizations, etc.

Figure 35:
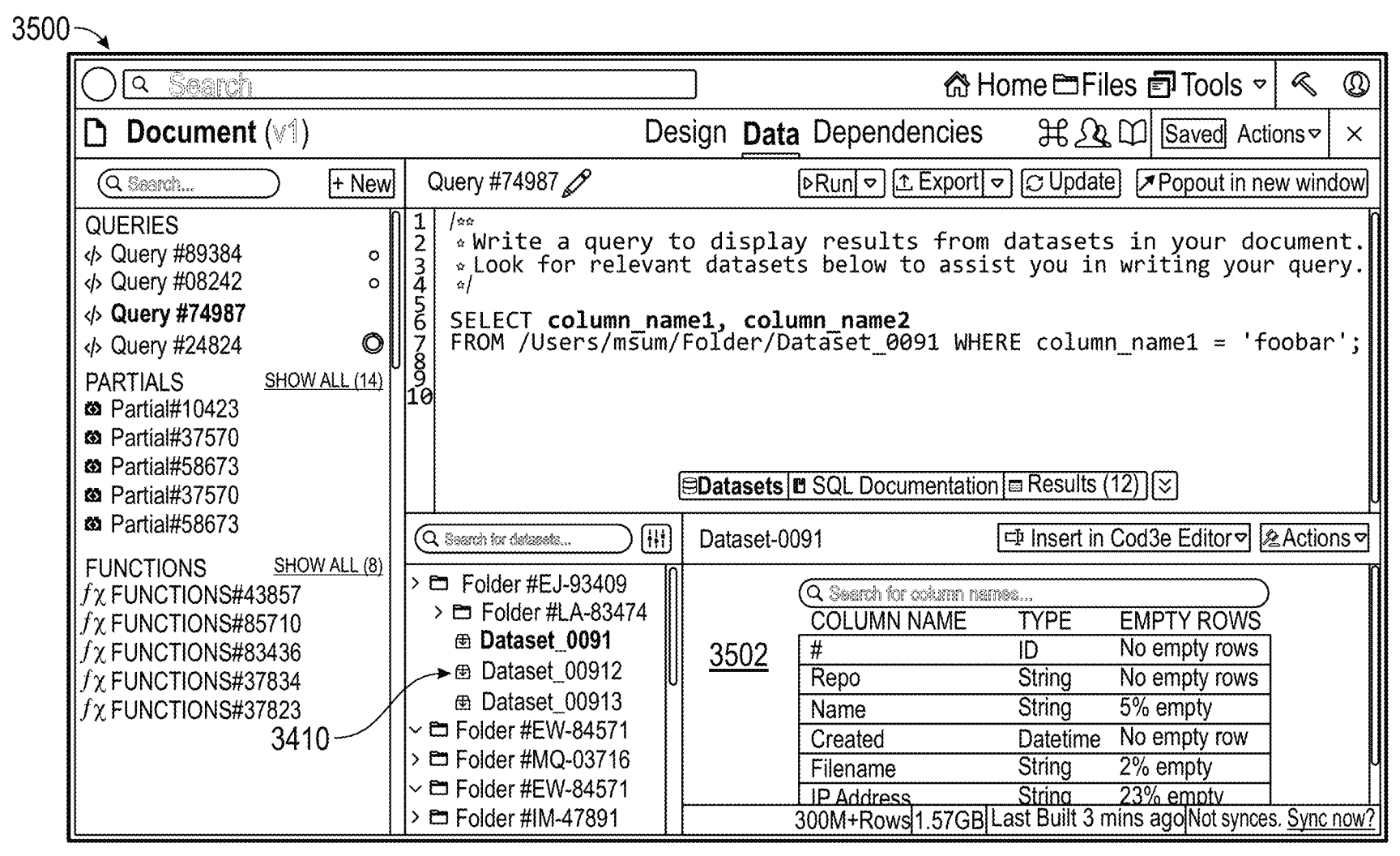

FIG. 35 illustrates one example of a user interface for displaying datasets. Section 3502 shows metadata for a selected dataset 3410. The metadata can include, for example, column names, type, and an amount of empty rows. The metadata can also include, for example, a number of rows, a size of the dataset, when the dataset was last built, and a synchronization status of the dataset. A search bar is provided to search within the dataset, such as for column names, rows, keys, etc.

Example Method

Figure 36:
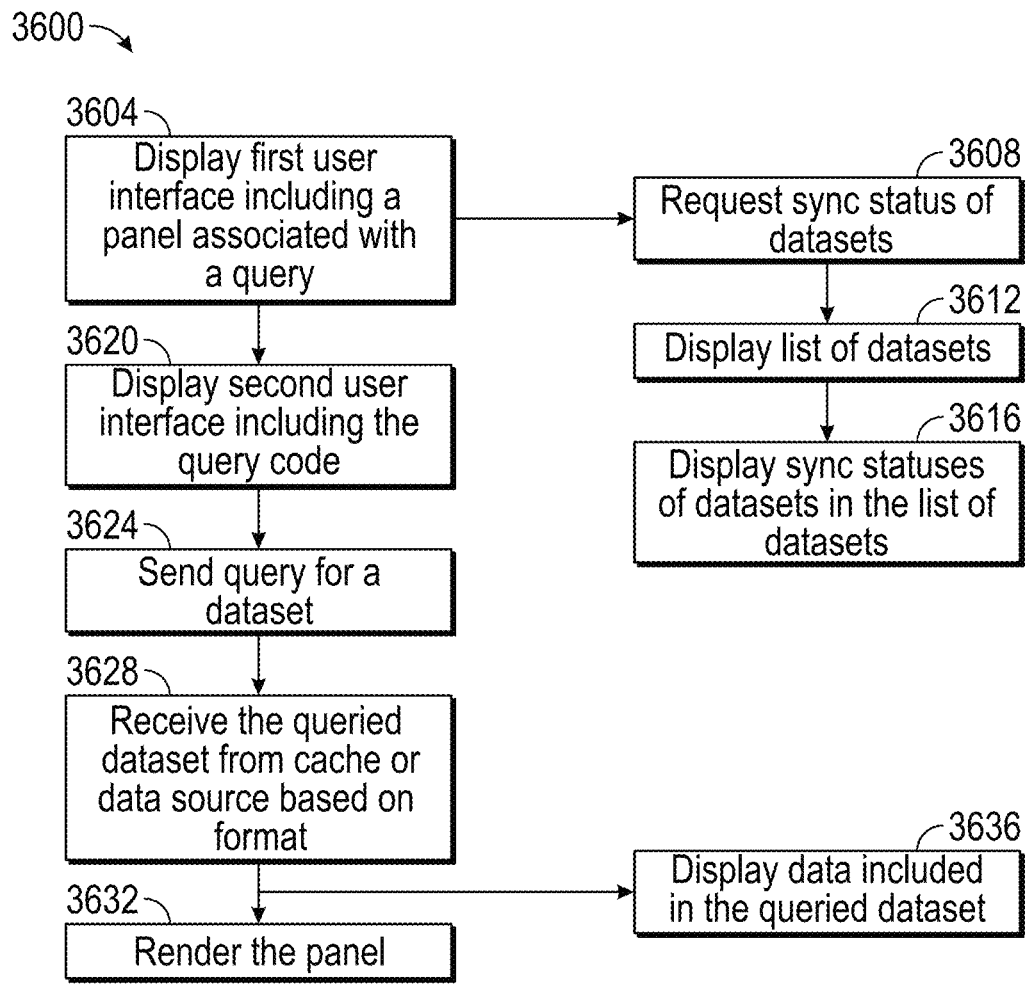
FIG. 36 illustrates a flowchart for querying data, according to certain embodiments.

FIG. 36 illustrates a flowchart 3600 for querying data, according to certain embodiments.

At block 3604, a first user interface is displayed. The first user interface includes a panel associated with a query. Some examples of user interfaces showing panels associated with queries are shown in FIGS. 1, 2A, 2C, 2D, 3A, 7A-7C, 9, 10, 17, 18, 21-23, and 25.

At block 3608, a request can be sent to determine synchronization statuses of one or more datasets. The synchronization can be between a cache and a data source. This can include, for example, a request to determine if a specific dataset is available in a cache. This can include, for example, a request to identify all available datasets in a cache. The request can be sent to a cache and/or a data synchronization server.

At block 3612, a list of datasets can be displayed.

At block 3616, the synchronization statuses of datasets in the list of datasets can be displayed. Examples of synchronization status are shown and discussed, for example, with respect to FIGS. 32-34.

At block 3620, a second user interface can be displayed. The second user interface can include the code of the query that is associated with the panel.

In some embodiments, the list of datasets and the synchronization statuses of datasets in the list of datasets can be displayed in the second user interface. In some embodiments, the list of datasets and the synchronization statuses of datasets in the list of datasets can be displayed in separate interfaces or popout windows.

At block 3624, the query for a dataset can be sent. The query can be in a first format or a different format. The format of the query can be coded in the user interface. In some embodiments, the query has a default format that can be re-coded in the second user interface.

At block 3628, the queried dataset can be received. In some embodiments, whether the queried dataset is received from a cache or from a data source can depend on the format of the query.

At block 3632, the panel can be rendered to visualize the queried data according to display settings.

At block 3636, data from the queried dataset can be displayed. For example, FIG. 34 shows partial data from a dataset being displayed. In some embodiments, metadata about the queried dataset can be additionally or alternatively displayed. FIG. 35 shows an example of metadata about a dataset.

Additional Graphical Visualizations

A graphical visualization, such as those shown in FIG. 12, FIG. 13, FIG. 14, FIG. 19, and FIG. 20, can also be generated to show relationships between datasets and documents, including dependencies. The visualization can be generated as a force directed graph. A filter can be applied, for example, to show which documents use which datasets. Another filter can be applied to show which datasets are used in which documents. Other filters can include filters users, ACL's, projects, for upstream or downstream dependencies, etc. The filters can also include a time element. For example, the visualization can be filtered to show which documents are currently accessing or accessed a dataset within a recent time frame. The visualization can also indicate which datasets are in a cache or data store.

Events

An event framework can be implemented in order to enable additional features and simplify certain tasks that would otherwise be more difficult. Backend Javascript code provides an API that allows user to write code to manipulate document object models. As part of the API, an event framework can be brought to a front end. The event framework can allow more complex events and actions, control of circular events, and allows users to create non-linear chains of events and actions. In some embodiments, events can be implemented as a service.

Without the event framework, it can be difficult to perform certain types of tasks. For example, opening a dialog window in response to a button click event can be implemented with JavaScript, but can be difficult or impossible to implement by editing a template system (e.g., Handlebars) in a query without Javascript access.

A graphical user interface can provide a menu of event conditions for a user to select and actions to be taken in response to the selected event condition. In response to a selection of an event condition and an action through the GUI, the system automatically generates formats the selected event and actions in JavaScript and causes JavaScript code to be written in the document.

Variables, panels, widgets, and functions can interact with each other. For example, as shown in FIG. 1, widget 130 may execute a query depending on variables set in widgets 110 and 120. With an event framework, Variables, panels, widgets, functions, can further interact with events, webpages, and browsers. For example, the widget 130 of FIG. 1 can resize, disappear, or perform some other action in response to a JavaScript event such as resizing a browser window. As another example, hovering a mouse over, clicking, or selecting areas or parts of a browser can be events that trigger actions.

In some embodiments, the relationships between variables, panels, widgets, functions, and events can be shown in a dependency graph such as the dependency graph shown in FIG. 12. A distinct icon could be used to distinguish events, and another distinct icon can be used to show actions. In some events, the dependency graph in FIG. 12 can show relationships between a first panel and a second panel if the second panel performs an action in response to an event relating to the first panel. In some embodiments, a different visual indicator, such as a different line color, can be used to show panels that have an event dependent relationship. In some embodiments, a graph similar to the dependency graph shown in FIG. 12 can display an event-viewing graph that includes triggering events and actions. In some embodiments, the event-viewing graph can be read only. In some embodiments, the event-viewing graph can be used to select icons representing an event or action, receive user input modifying the selected event or action, and automatically modify and/or generate corresponding JavaScript code in response.

With an event framework, non-linear events can be chained. For example, one event may trigger a first action, which triggers two different actions, and so on, causing actions to propagate in an exponential manner. As another example of non-linear events, a first event may trigger either a first or a second action based on the number of times that the first event has already occurred, and also based on whether or not a second event has occurred. As another example, circular events can also be implemented. For example, a bar graph panel 150 shown in FIG. 1 could be configured to display a bar graph of data in response to a mouse event selecting a row in table panel 130. The table 130 might be configured to perform an update in response to a mouse event selecting a portion of the chart 150. Table 130 can track chart 150, and chart 150 can track table 130 through events. These circular events can be implemented by code generated in response to event selections in a graphical user interface. Otherwise, having the two panels track each other could be implemented by coding an angular watch. Circular events can be detected, for example, in a dependency graph (e.g., as shown in FIG. 12) where two nodes dependent on each other. In some embodiments, the dependency graph can be configured to highlight or otherwise visually indicate circular dependencies. A circular dependency can be implemented via events that trigger opposite to the one another's actions. A circular dependency can also be implemented and managed with an intermediary event that acts as a state storage and manages the actions between two or more widget interaction and monitors the state of the widget changes.

Flex Containers

Figure 37:
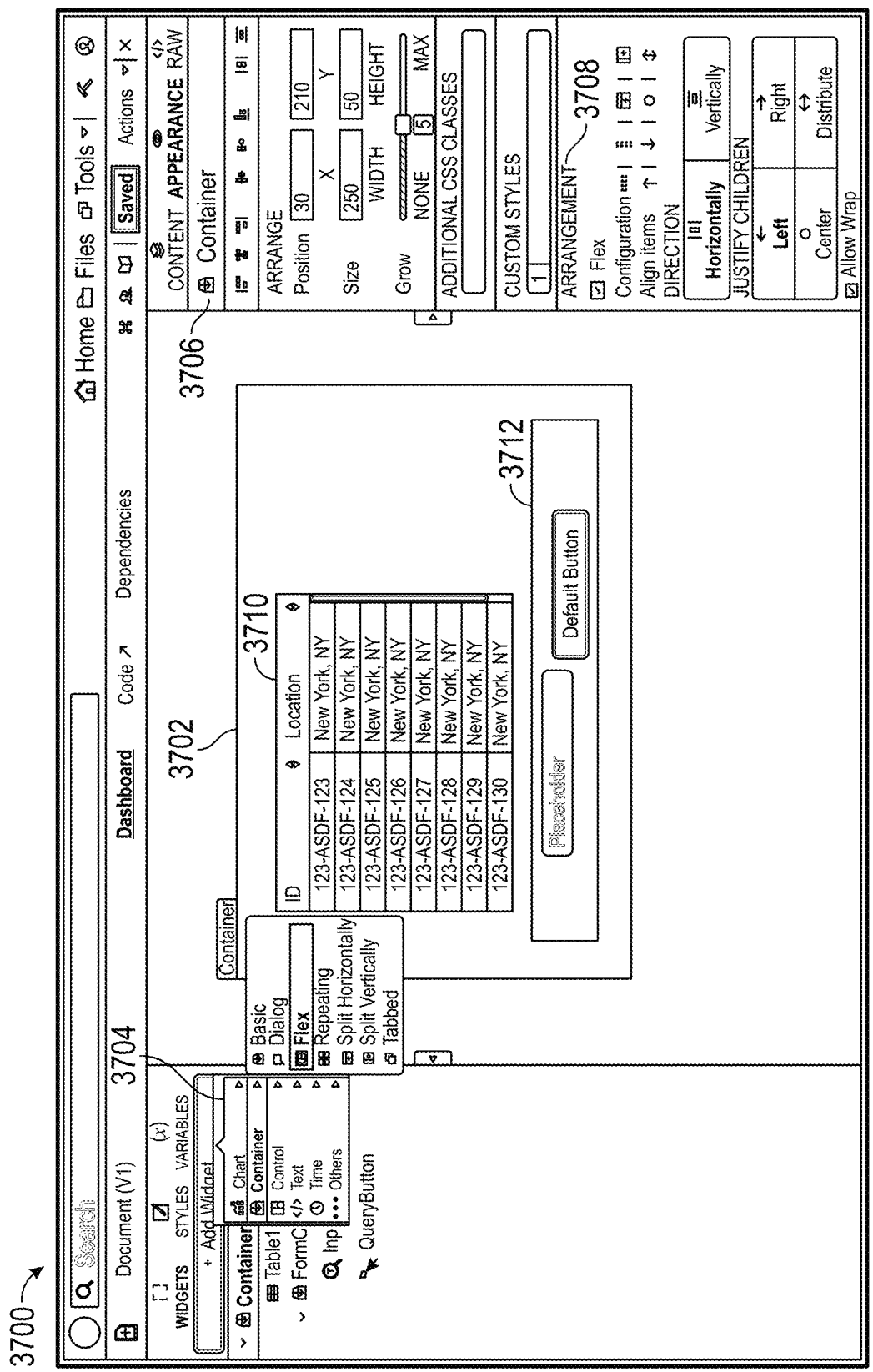
FIG. 37 illustrates one embodiment of a user interface comprising a flex container.

FIG. 37 illustrates one embodiment of a user interface 3700 comprising a flex container 3702. The user interface also shows widget menus 3704, flex container options menu 3706, flex container arrangement menu 3708, a first widget 3710, and a second widget 3712.

The flex container 3702 is a tool that developers can use to create a flexible boundary within which panels, text, and other GUI elements can be arranged. The flex container 3702 can automatically resize, for example, based on the size of a browser window, such as to fill a width, height, or a portion of a width or height of a browser window. In some embodiments, the rate at which the flex container changes size in response to changes in browser size can be adjusted using the "Grow" slider option in the container menu 3706. In some embodiments, the flex container 3702 can have a defined size. A flex container can be added to a page by selecting a flex container through the widget menu 3704.

Inside a flex container, additional GUI elements such as panels 3710 and 3712, text, buttons, pictures, etc. can be added. The GUI elements can be arranged, aligned, justified, wrapped, split, and/or distributed by clicking on the corresponding icons in the container options menu 3706 and flex container arrangement menu 3708. For example, selecting a horizontal arrangement without wrapping would cause the widgets 3710 and 3712 to be displayed in a row within the flex container 3702. The widgets 3710 and 3712 can be dynamically and proportionally resized to fit within the width of the flex container 3702. Additional CSS classes can be used or imported to apply a style to the flex container, and further custom styles can be coded for the flex container.

In some embodiments, flex containers can be placed within other flex containers to form a nested flex container. Each nested flex container would be arranged, aligned, justified, and/or distributed based on the settings of the flex container that includes the nested flex container.

GUI elements can be configured to be repeated. In some embodiments, the GUI elements can be configured to be repeated within a flex container.

Figure 38:
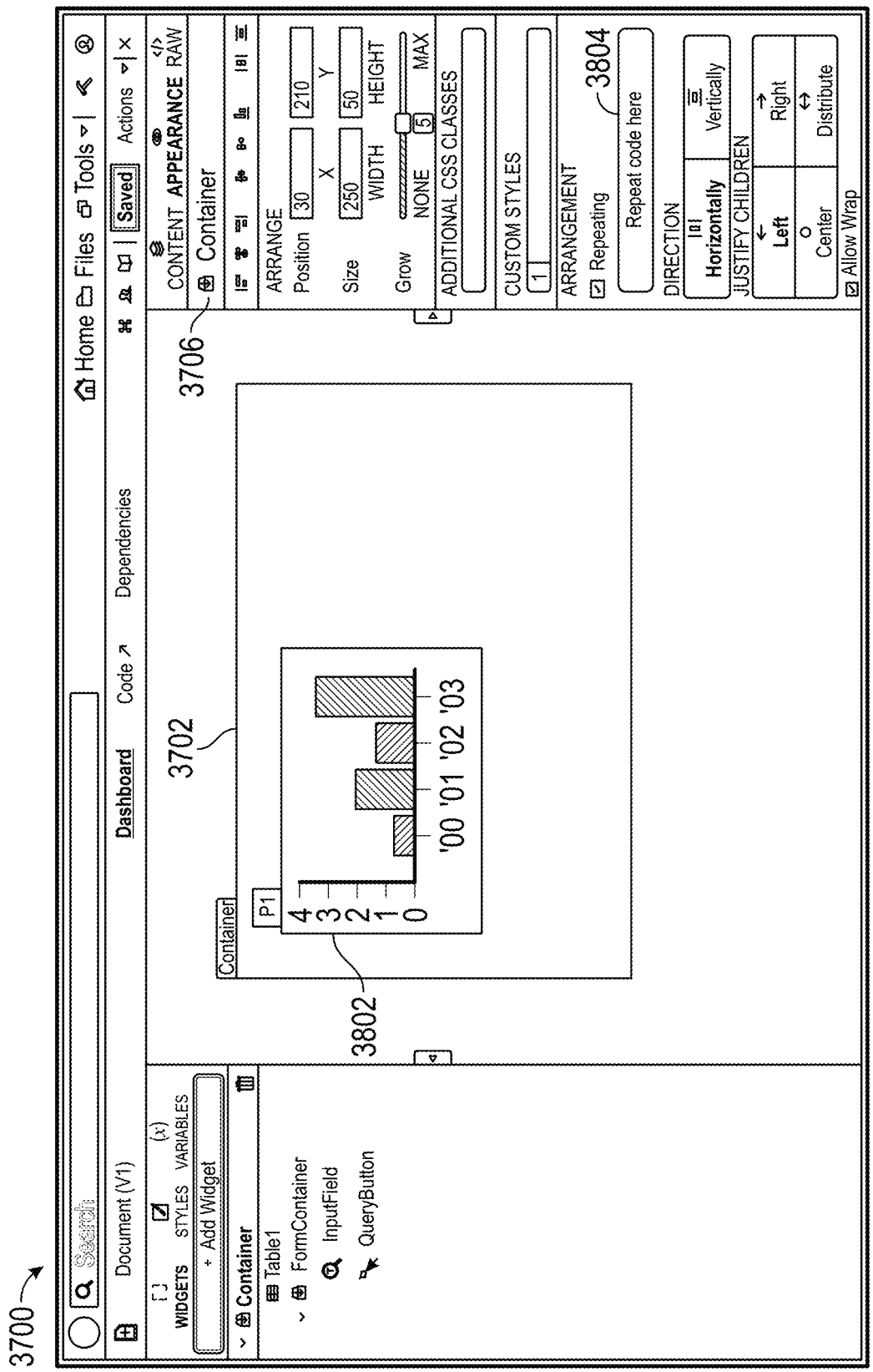
FIG. 38 illustrates one embodiment of a user interface comprising a flex container with a repeating panel.

FIG. 38 illustrates one embodiment of a user interface 3700 comprising a flex container 3702 with a repeating panel 3802. For panel 3802, a menu option 3804 to repeat the graph is checked. Menu option 3804 provides an option to write additional code specifying additional parameters about how the repetitions will be performed. The additional code can include, for example, how many times the repetitions will be performed, either as a hardcoded number or with reference to a variable. For example, a panel can be configured to repeat based on a number of states that are retried from a query to a database. The additional code can include, for example, one or more variables of panels to change with each repetition. In some embodiments, the variables can be coded using a template language.

One example embodiment includes graphing data such as population growth for each state. Panel 3802 graphs a percent change in population for a first state, such as Alabama. The panel is named p1 and is configured to generate a bar graph based on a variable "y_values" that is queried from a database. The additional code section can indicate 50 repetitions of the graph 3802. The additional code section can also indicate that, for each repetition, the {{p1.y_values}} is to be queried for the next state in a list of states. This way, when the panel is repeated a second time for Alaska, the y_values will be set to population growth data for Alaska instead of for Alabama.

In some embodiments, a developer view shows the container 3702 and the coded panel 3802. The developer mode does not render the results. To see the document that would be rendered, the developer can switch to a preview mode.

Figure 39:
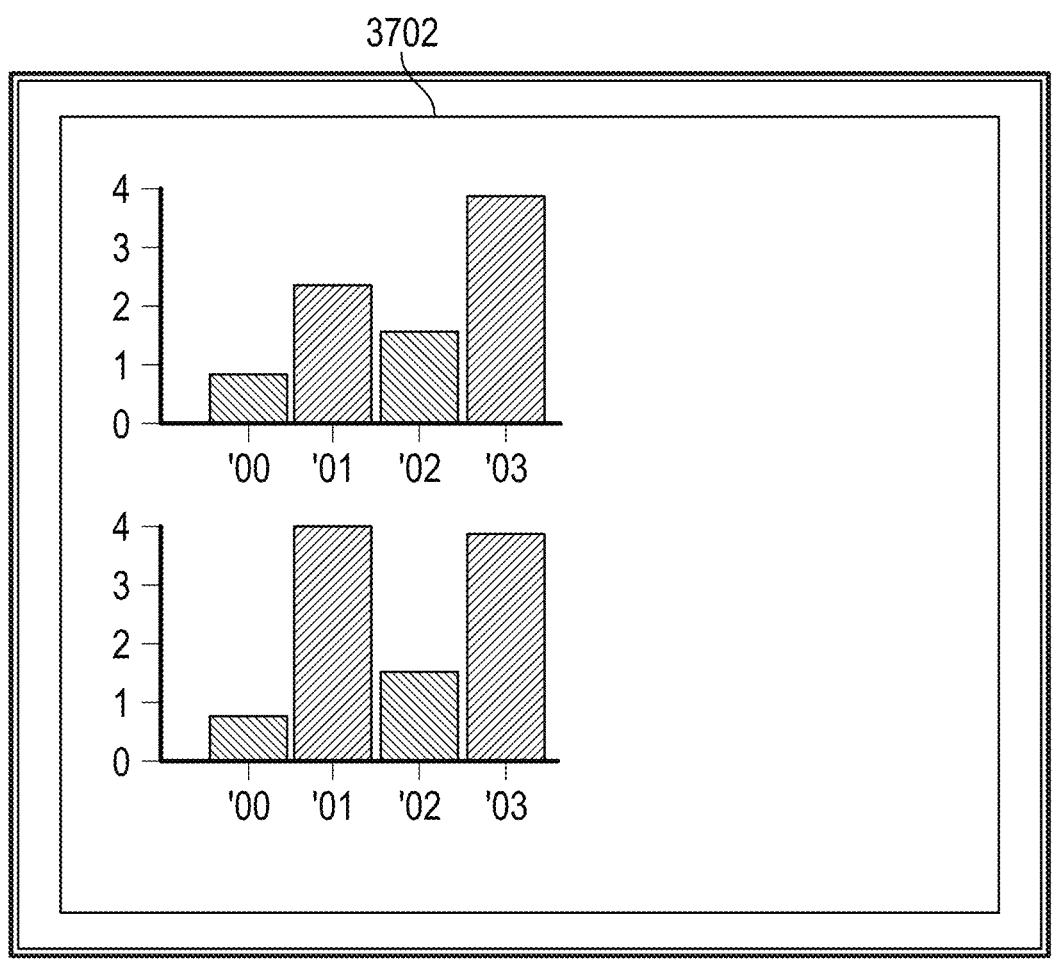
FIG. 39 illustrates one embodiment of a user interface comprising a flex container with a repeating panel in preview mode.

FIG. 39 illustrates one embodiment of a user interface comprising a flex container with a repeating panel in preview mode. The panel 3802 is shown as repeating a second time. In some embodiments, the boundaries of the flex container 3702 are not shown in preview mode. In the example embodiment of FIG. 39, the flex container 3702 is configured to left align and wrap panels without resizing the panels. Additional panels (e.g., for the other 48 states) are hidden because they do not fit within the flex container. In embodiments where the panel size is tied to a browser size, a user would be able to enlarge the browser, causing the flex container to also increase in size and show the bar graphs of population growth for the other 48 states.

In some embodiments, documents are configured to be displayed in web browsers. The document will render repeated elements for an actively viewed tab. Background tabs in a browser may have code to repeatedly generate panels or other elements in a flex container. In some embodiments, the code to repeatedly generate the panels (and query code associated with each repeated panel) and/or other elements is not executed until a background tab is selected to be viewed. This can save processing power and improve the rendering speed of an actively loaded browser tab.

ADDITIONAL IMPLEMENTATION DETAILS AND EMBODIMENTS

Accordingly, various embodiments can provide panels coded to query a database and display the queried data according to one or more display settings. The panels can be used to create online documents without needing the same depth of technical skill, and edits to the panels through tool pages cause corresponding document code to change. Documents can be created to load faster by using timing tables and dependency visualizations to identify the slowest loading elements and elements with the longest dependency chains. Then, the document can be restructured to load faster. Elements taking a long time to load can be indicated by a loading graphic that can have a timeout set by a user, by default, or based on timing information. When code or settings are changed, a preview of panel outputs of display representations of queried data can quickly change in response by executing code dependent on changes without needing to refresh entire pages. Document versions can be controlled for and diffs can be run to see differences at the code level and at the document output level.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
one or more processors configured to execute code to cause the computer system to:
display a user interface comprising:
a first panel and a second panel;
a first menu of event conditions for a user to select;
a second menu of actions for the user to select, wherein the actions are to be taken in response to a selected event condition; and
an event-viewing graph that displays visual indications of relationships between event conditions and actions;
receive a user selection of a first event condition, from the first menu of event conditions, associated with the first panel and the second panel;
receive a user selection of a first action, from the second menu of actions, to be taken in response to the first event condition;
generate code corresponding to the first event condition and the first action;
add the generated code to the user interface in relation to the first panel and the second panel; and
update the event-viewing graph to include a visual indication of a relationship between the first event condition and the first action.

2. The computer system of claim 1, wherein:
the user interface further comprises a dependency graph,
the dependency graph includes a visual indication of an event-dependent relationship between the first panel and the second panel, and
the one or more processors configured to execute code to further cause the computer system to:
receive a user input, via the dependency graph, selecting an icon representing the first event condition or the first action and modifying at least one of the first event condition or the first action; and
modify the generated code or generate code corresponding to the modifying of the at least one of the first event condition or the first action.

3. The computer system of claim 1, wherein the one or more processors configured to execute code to further cause the computer system to:
receive a user selection of a second action, from the second menu of actions, to also be taken in response to the first event condition; and
generate code corresponding to the first event condition and the first and second actions.

4. The computer system of claim 3, wherein either first action or the second action is triggered in response to a number of times that the first event condition has occurred.

5. The computer system of claim 4, wherein either first action or the second action is triggered further in response to whether or not a second event has occurred.

6. The computer system of claim 1, wherein the one or more processors configured to execute code to further cause the computer system to:
receive a user selection of a second event condition, from the first menu of event conditions, associated with the second panel;
receive a user selection of a second action, from the second menu of actions, to be taken in response to the second event condition;
generate code corresponding to the second event condition and the second actions; and
add the generated code to the user interface in relation to the second panel,
wherein:
the first action is associated with the second panel, and the second action is associated with the first panel, creating a circular dependency between the first panel and the second panel.

7. The computer system of claim 6, wherein the circular dependency is implemented, in the generated code, by at least one of: a watch function, events that trigger opposite to one another's actions, an intermediary event that acts as a state storage.

8. The computer system of claim 6, wherein:
the user interface further comprises a dependency graph, and the dependency graph includes a visual indication of the circular dependency between the first panel and the second panel.

9. The computer system of claim 8, wherein the one or more processors configured to execute code to further cause the computer system to:
receive a user input, via the dependency graph, selecting an icon representing the first event condition or the first action and modifying at least one of the first event condition or the first action; and
modify the generated code or generate code corresponding to the modifying of the at least one of the first event condition or the first action.

10. A computer-implemented method comprising:
displaying a user interface comprising:
a first panel and a second panel;
a first menu of event conditions for a user to select;
a second menu of actions for the user to select, wherein the actions are to be taken in response to a selected event condition; and
an event-viewing graph that displays visual indications of relationships between event conditions and actions;
receiving a user selection of a first event condition, from the first menu of event conditions, associated with the first panel and the second panel;
receiving a user selection of a first action, from the second menu of actions, to be taken in response to the first event condition;
generating code corresponding to the first event condition and the first action;
adding the generated code to the user interface in relation to the first panel and the second panel; and
updating the event-viewing graph to include a visual indication of a relationship between the first event condition and the first action.

11. The computer-implemented method of claim 10, wherein:
the user interface further comprises a dependency graph,
the dependency graph includes a visual indication of an event-dependent relationship between the first panel and the second panel, and
the computer-implemented method further comprises:
receiving a user input, via the dependency graph, selecting an icon representing the first event condition or the first action and modifying at least one of the first event condition or the first action; and
modifying the generated code or generate code corresponding to the modifying of the at least one of the first event condition or the first action.

12. The computer-implemented method of claim 10 further comprising:

receiving a user selection of a second action, from the second menu of actions, to also be taken in response to the first event condition; and
generating code corresponding to the first event condition and the first and second actions.

13. The computer-implemented method of claim 12, wherein either first action or the second action is triggered in response to a number of times that the first event condition has occurred.

14. The computer-implemented method of claim 13, wherein either first action or the second action is triggered further in response to whether or not a second event has occurred.

15. The computer-implemented method of claim 10, wherein computer-implemented method further comprises:
receiving a user selection of a second event condition, from the first menu of event conditions, associated with the second panel;
receiving a user selection of a second action, from the second menu of actions, to be taken in response to the second event condition;
generating code corresponding to the second event condition and the second actions; and
adding the generated code to the user interface in relation to the second panel,
wherein:
the first action is associated with the second panel, and the second action is associated with the first panel, creating a circular dependency between the first panel and the second panel.

16. The computer-implemented method of claim 15, wherein the circular dependency is implemented, in the generated code, by at least one of: a watch function, events that trigger opposite to one another's actions, an intermediary event that acts as a state storage.

17. The computer-implemented method of claim 15, wherein:
the user interface further comprises a dependency graph, and
the dependency graph includes a visual indication of the circular dependency between the first panel and the second panel.

18. The computer-implemented method of claim 17 further comprising:
receiving a user input, via the dependency graph, selecting an icon representing the first event condition or the first action and modifying at least one of the first event condition or the first action; and
modifying the generated code or generate code corresponding to the modifying of the at least one of the first event condition or the first action.

* * * * *